(12) United States Patent
Ramot et al.

(10) Patent No.: US 11,107,352 B2
(45) Date of Patent: Aug. 31, 2021

(54) ROUTING BOTH AUTONOMOUS AND NON-AUTONOMOUS VEHICLES

(71) Applicant: VIA TRANSPORTATION, INC., New York, NY (US)

(72) Inventors: Daniel Ramot, New York, NY (US); Oren Shoval, Jerusalem (IL); Shmulik Marcovitch, Kfar Saba (IL); Erin Abrams, New York, NY (US)

(73) Assignee: VIA TRANSPORTATION, INC., New York, NY (US)

( * ) Notice: Subject to any disclaimer, the term of this patent is extended or adjusted under 35 U.S.C. 154(b) by 33 days.

(21) Appl. No.: 16/750,679

(22) Filed: Jan. 23, 2020

(65) Prior Publication Data
US 2020/0160709 A1    May 21, 2020

Related U.S. Application Data

(63) Continuation of application No. PCT/US2018/043644, filed on Jul. 25, 2018.
(Continued)

(51) Int. Cl.
*G08B 23/00* (2006.01)
*G08G 1/127* (2006.01)
(Continued)

(52) U.S. Cl.
CPC .............. *G08G 1/127* (2013.01); *B60L 53/66* (2019.02); *B60W 60/00253* (2020.02); *G01C 21/343* (2013.01); *G01C 21/3438* (2013.01); *G01C 21/3469* (2013.01); *G06F 16/29* (2019.01); *G06N 5/04* (2013.01); *G06Q 10/02* (2013.01); *G06Q 10/047* (2013.01); *G06Q 10/06312* (2013.01); *G06Q 10/06315* (2013.01); *G06Q 10/109* (2013.01); *G06Q 30/0205* (2013.01);
(Continued)

(58) Field of Classification Search
None
See application file for complete search history.

(56) References Cited

U.S. PATENT DOCUMENTS 10,156,848 B1 *  12/2018  Konrardy ............ B60R 16/0234
2004/0158483 A1   8/2004  Lecouturier
(Continued)

FOREIGN PATENT DOCUMENTS

WO    WO 2014/106617    7/2014

OTHER PUBLICATIONS

International Search Report and Written Opinion dated Nov. 27, 2018, received in corresponding International Application No. PCT/US2018/043644 (15 pages).

*Primary Examiner* — Julie B Lieu
(74) *Attorney, Agent, or Firm* — Pearl Cohen Zedek Latzer Baratz LLP

(57) ABSTRACT

The present disclosure relates to systems and methods for managing and routing ridesharing vehicles. In some implementations, the systems and methods may count the number of passengers entering a ridesharing vehicle, distribute vehicles in need of charge to charging stations based on predicted future demand, manage a fleet of petrol and electric ridesharing vehicles, route autonomous and non-autonomous vehicles, automatically adjust drop-off locations based on safety constraints, and preschedule a rideshare with an unknown pick-up location.

19 Claims, 26 Drawing Sheets

Related U.S. Application Data

(60) Provisional application No. 62/537,155, filed on Jul. 26, 2017, provisional application No. 62/614,558, filed on Jan. 8, 2018.

(51) Int. Cl.

| | |
|---|---|
| *G01C 21/34* | (2006.01) |
| *G06Q 10/02* | (2012.01) |
| *G06Q 50/30* | (2012.01) |
| *G08G 1/00* | (2006.01) |
| *H04W 4/024* | (2018.01) |
| *G06F 16/29* | (2019.01) |
| *G06Q 10/04* | (2012.01) |
| *G06Q 10/06* | (2012.01) |
| *G06Q 10/10* | (2012.01) |
| *G06T 7/215* | (2017.01) |
| *B60W 60/00* | (2020.01) |
| *G07C 5/00* | (2006.01) |
| *B60L 53/66* | (2019.01) |
| *G06N 5/04* | (2006.01) |
| *G06Q 30/02* | (2012.01) |
| *G01S 19/42* | (2010.01) |

(52) U.S. Cl.
CPC ............ *G06Q 50/30* (2013.01); *G06T 7/215* (2017.01); *G07C 5/008* (2013.01); *G08G 1/20* (2013.01); *G08G 1/202* (2013.01); *H04W 4/024* (2018.02); *G01S 19/42* (2013.01); *G06T 2207/30242* (2013.01)

(56) References Cited

U.S. PATENT DOCUMENTS

| | | |
|---|---|---|
| 2008/0195428 A1 | 8/2008 | O'Sullivan |
| 2013/0238167 A1 | 9/2013 | Stanfield et al. |
| 2014/0180773 A1 | 6/2014 | Zafiroglu et al. |
| 2016/0356615 A1 | 12/2016 | Arata et al. |
| 2017/0153714 A1 | 6/2017 | Gao et al. |
| 2017/0284819 A1* | 10/2017 | Donnelly ............... B60R 16/037 |
| 2017/0300053 A1* | 10/2017 | Wengreen ............... G08G 1/202 |
| 2018/0290610 A1* | 10/2018 | Zych ....................... G06Q 50/30 |
| 2020/0160705 A1* | 5/2020 | Chase ..................... G06Q 50/30 |
| 2020/0361406 A1* | 11/2020 | Zych ....................... B60R 16/037 |

* cited by examiner

1400

```
┌─────────────────────────────────────────────────────┐
│ RECEIVE A FIRST RIDE REQUEST FROM A FIRST USER, THE │──1401
│ FIRST RIDE REQUEST INCLUDING INFORMATION RELATED    │
│ TO A PICK-UP LOCATION AND A DESIRED DESTINATION OF  │
│ THE FIRST USER                                      │
└─────────────────────────────────────────────────────┘
                          ↓
┌─────────────────────────────────────────────────────┐
│ RECEIVE A SECOND RIDE REQUEST FROM A SECOND         │──1403
│ USER, THE SECOND RIDE REQUEST INCLUDING             │
│ INFORMATION RELATED TO A PICK-UP LOCATION AND A     │
│ DESIRED DESTINATION OF THE SECOND USER              │
└─────────────────────────────────────────────────────┘
                          ↓
┌─────────────────────────────────────────────────────┐
│ RECEIVE CURRENT BATTERY-CHARGE DATA FOR THE         │──1405
│ PLURALITY OF ELECTRICALLY-POWERED VEHICLES          │
└─────────────────────────────────────────────────────┘
                          ↓
┌─────────────────────────────────────────────────────┐
│ RECEIVE CURRENT VEHICLE LOCATION DATA FOR A         │──1407
│ PLURALITY OF VEHICLES, THE PLURALITY OF VEHICLES    │
│ INCLUDE A PLURALITY OF ELECTRICALLY-POWERED         │
│ VEHICLES AND A PLURALITY OF PETROL-POWERED          │
│ VEHICLES                                            │
└─────────────────────────────────────────────────────┘
                          ↓
┌─────────────────────────────────────────────────────┐
│ ELECTRONICALLY ASSIGN THE FIRST USER TO A FIRST     │──1409
│ VEHICLE AND THE SECOND USER TO A SECOND VEHICLE     │
│ BASED ON THE FIRST AND SECOND DESIRED               │
│ DESTINATIONS, THE CURRENT BATTERY-CHARGE DATA,      │
│ AND THE CURRENT VEHICLE LOCATION DATA               │
└─────────────────────────────────────────────────────┘
                          ↓
┌─────────────────────────────────────────────────────┐
│ TRANSMIT INSTRUCTIONS TO DIRECT THE FIRST VEHICLE   │──1411
│ TO THE FIRST PICK-UP LOCATION AND THE SECOND        │
│ VEHICLE TO THE SECOND PICK-UP LOCATION              │
└─────────────────────────────────────────────────────┘
```

FIG. 14

ROUTING BOTH AUTONOMOUS AND NON-AUTONOMOUS VEHICLES

CROSS REFERENCES TO RELATED APPLICATIONS

This application is a continuation of PCT International Application No. PCT/US2018/043,644, filed Jul. 25, 2018, which claims the benefit of priority of U.S. Provisional Patent Application No. 62/537,155, filed Jul. 26, 2017, and U.S. Provisional Patent Application No. 62/614,558, filed Jan. 8, 2018. All of the foregoing applications are incorporated herein by reference in their entirety.

BACKGROUND

I. Technical Field

The present disclosure generally relates to the field of vehicle ridesharing and systems and methods for routing ridesharing vehicles and for ridesharing management.

II. Background Information

Recent years have witnessed increasing interest and development in the field of vehicle sharing, where one or more riders may share the same vehicle for a portion of their rides. Ridesharing may save ride costs, increase vehicle utilization, and reduce air pollution. A rider may use a ridesharing service through a ridesharing service application accessed by the rider's mobile device.

SUMMARY

Embodiments consistent with the present disclosure provide systems and methods for vehicle ridesharing and for managing a fleet of ridesharing vehicles. For example, consistent with the disclosed embodiments, the fleet of ridesharing vehicles may include more than 10 ridesharing vehicles, more than 100 ridesharing vehicles, or more than 1000 ridesharing vehicles that pick up multiple users and drop them off at locations proximate but other than their desired destinations.

In one embodiment, a ridesharing vehicle may include a vehicle body, a communications interface within the vehicle body for wirelessly communicating with a remote server configured to electronically receive shared-ride requests from a plurality of users, at least one sensor associated with the vehicle body and configured to detect entry of passengers from the ridesharing vehicle, and at least one processor within the vehicle body. The at least one processor within the vehicle body may be programmed to receive, via the communications interface, information about passengers to be picked up, the received information including a pick-up location and a scheduled number of passengers expected to be picked up at the pick-up location, after arriving at the pick-up location, receive from the at least one sensor a number of passengers actually picked up at the pick-up location, compare the actual number of passengers picked up at the pick-up location with the scheduled number of passengers, and initiate a remedial action when a difference exists between the scheduled number of passengers and the actual number of passengers as detected by the at least one sensor.

In one embodiment, a method for method for counting a number of passengers entering a ridesharing vehicle may include receiving from a remote server information about passengers to be picked up, the received information including a pick-up location and a scheduled number of passengers expected to be picked up at the pick-up location, receiving, from at least one sensor configured to detect entry of passengers from the ridesharing vehicle, a number of passengers actually picked up at the pick-up location, comparing the actual number of passengers picked up at the pick-up location with the scheduled number of passengers, and initiating a remedial action when a difference exists between the scheduled number of passengers and the actual number of passengers as detected by the at least one sensor.

In one embodiment, a system for directing an electric vehicle to a charging station may include a memory for storing historical data associated with past demand for ridesharing vehicles in a geographical area and locations of a plurality of charging stations in the geographical area, a communication interface for communicating with a fleet of ridesharing vehicles including a plurality of electric vehicles, and at least one processor programmed to access the memory. The at least one processor may be programmed to receive, via the communications interface, current battery-charge data for the plurality of electric vehicles, wherein the current battery-charge data is reflective of a distance that each electric vehicle can operate before recharging, identify, from the current battery-charge data, a specific electric vehicle traveling in the geographic area and in need of a charge, receive current vehicle location data for the specific electric vehicle, wherein the current vehicle location data includes global positioning system (GPS) data generated by at least one GPS component associated with the specific electric vehicle, determine, using the historical data, predicted demand for ridesharing requests in at least one area proximate to at least one of the plurality of charging stations, based on an estimated charging completion time and the predicted demand, select a charging station for the specific electric vehicle, wherein the selected charging station is other than a charging station closest to a current location of the specific electric vehicle, and direct the specific electric vehicle to the selected charging station.

In one embodiment, a system for directing an electric vehicle to a charging station may include memory for storing locations of a plurality of charging stations in the geographical area, a communication interface for communicating with a fleet of ridesharing vehicles including a plurality of electric vehicles, and at least one processor. The at least one processor may be programmed to access the memory and to: receive, via the communications interface, current battery-charge data for the plurality of electric vehicles, wherein the current battery-charge data is reflective of a distance that each electric vehicle can operate before recharging; identify, from the current battery-charge data, a specific electric vehicle traveling in the geographic area and in need of a charge; receive current vehicle location data for the specific electric vehicle, wherein the current vehicle location data includes global positioning system (GPS) data generated by at least one GPS component associated with the specific electric vehicle; receive, via the communications interface, current occupancy data for the plurality of charging stations, wherein the current occupancy data includes an estimated charging completion time for each charging station; based on the estimated charging completion time, select a charging station for the specific electric vehicle, wherein the selected charging station is other than a charging station closest to a current location of the specific electric vehicle; and direct the specific electric vehicle to the selected charging station.

In one embodiment, a method for directing an electric vehicle to a charging station may include accessing a memory configured to store historical data associated with past demand for ridesharing vehicles in a geographical area and locations of a plurality of charging stations in the geographical area, communicating with a fleet of ridesharing vehicles including a plurality of electric vehicles, receiving current battery-charge data for the plurality of electric vehicles, wherein the current battery-charge data is reflective of a distance that each electric vehicle can operate before recharging, identifying, from the current battery-charge data, a specific electric vehicle traveling in the geographical area and in need of a charge, receiving current vehicle location data for the specific electric vehicle, wherein the current vehicle location data includes global positioning system (GPS) data generated by at least one GPS component associated with the specific electric vehicle, determining, using the historical data, predicted demand for ridesharing requests in at least one area proximate at least one of the plurality of charging stations, based on an estimated charging completion time and the predicted demand, selecting a charging station for the specific electric vehicle, wherein the selected charging station is other than a charging station closest to a current location of the specific electric vehicle, and directing the specific electric vehicle to the selected charging station.

In one embodiment, a system may direct electrically-powered vehicles and petrol-powered vehicles to different locations. The system may include a communications interface for communicating with a fleet of vehicles including electrically-powered vehicles and petrol-powered vehicles and for receiving requests for rides from a plurality of users, and at least one processor. The at least one processor may be programmed to receive, via the communications interface, a first request for a ride from a first user, the first request including information related to a first pick-up location of the first user and a first desired destination of the first user; receive, via the communications interface, a second request for a ride from a second user, the second request including information related to a second pick-up location of the second user and a second desired destination of the second user; receive current battery-charge data for the electrically-powered vehicles, wherein the current battery-charge data is indicative of a distance in which each electrically-powered vehicle can operate without charging; receive current vehicle location data for the fleet of vehicles, wherein the current vehicle location data includes global positioning system (GPS) data generated by at least one GPS component associated with each vehicle; based on the first and second desired destinations, the current battery-charge data, and the current vehicle location data, electronically assign the first user to a first electrically-powered vehicle and the second user to a second petrol-powered vehicle; and transmit, via the communications interface, instructions to direct the first electrically-powered vehicle to the first pick-up location and the second petrol-powered vehicle to the second pick-up location.

In one embodiment, a method may direct electrically-powered vehicles and petrol-powered vehicles to different locations. The method may include communicating with a fleet of vehicles including electrically-powered vehicles and petrol-powered vehicles; receiving a first request for a ride from a first user, the first request including information related to a first pick-up location of the first user and a first desired destination of the first user; receiving a second request for a ride from a second user, the second request including information related to a second pick-up location of the second user and a second desired destination of the second user; receiving current battery-charge data for the electrically-powered vehicles, wherein the current battery-charge data is indicative of a distance in which each electrically-powered vehicle can operate without charging; receiving current vehicle location data for the fleet of vehicles, wherein the current vehicle location data includes global positioning system (GPS) data generated by at least one GPS component associated with each vehicle; based on the first and second desired destinations, the current battery-charge data, and the current vehicle location data, electronically assigning the first user to a first electrically-powered vehicle and the second user to a second petrol-powered vehicle; and directing the first electrically-powered vehicle to the first pick-up location and the second petrol-powered vehicle to the second pick-up location.

In one embodiment, a system may direct manually-drivable vehicles and autonomous vehicles. The system may include at least one communications interface for receiving ride requests from a plurality of users and for communicating with a plurality of vehicles-for-hire including manually-drivable vehicles and autonomous vehicles; memory storing information identifying a driving mode of each vehicle-for-hire as either a manually-drivable vehicle or an autonomous vehicle, and information identifying roads restricted to at least one of manually-drivable vehicles and autonomous vehicles; and at least one processor. The at least one processor may be programmed to receive, via the communications interface, a ride request from a prospective passenger, the ride request including information related to a pick-up location and a drop-off location of the prospective passenger; receive current vehicle location data for the plurality of vehicles-for-hire, wherein the current vehicle location data includes global positioning system (GPS) data generated by at least one GPS component associated with each vehicle-for-hire; electronically assign a specific vehicle-for-hire with capacity to fulfill the ride request to pick up the prospective passenger based on the current vehicle location data; access the stored information to determine the driving mode of the specific vehicle-for-hire; select a mode-specific route for the specific vehicle-for-hire that avoids roads restricted to the specific vehicle-for-hire based on the driving mode of the specific vehicle-for-hire; and wirelessly transmit the selected mode-specific route to the specific vehicle-for-hire.

In one embodiment, a method may direct manually-drivable vehicles and autonomous vehicles. The method may include communicating with a plurality of vehicles-for-hire including manually-drivable vehicles and autonomous vehicles; accessing stored information identifying a driving mode of each vehicle-for-hire as either a manually-drivable vehicle or an autonomous vehicle, and information identifying roads restricted to at least one of manually-drivable vehicles and autonomous vehicles; receiving a ride request from a prospective passenger, the ride request including information related to a pick-up location and a drop-off location of the prospective passenger; receiving current vehicle location data for the plurality of vehicles-for-hire, wherein the current vehicle location data includes global positioning system (GPS) data generated by at least one GPS component associated with each vehicle-for-hire; electronically assigning a specific vehicle-for-hire with capacity to fulfill the ride request to pick up the prospective passenger based on the current vehicle location data; accessing the stored information to determine the driving mode of the specific vehicle-for-hire; selecting a mode-specific route for the specific vehicle-for-hire that avoids roads restricted to the specific vehicle-for-hire based on the driving mode of the specific vehicle-for-hire; and wirelessly transmitting the selected mode-specific route to the specific vehicle-for-hire.

In one embodiment, an autonomous vehicle-for-hire may comprise a vehicle body; at least one sensor associated with the vehicle body for sensing traffic conditions in a vicinity of the vehicle-for-hire; a communications interface for communicating with a remote server configured to electronically receive ride requests from prospective passengers; and at least one processor. The at least one processor may be programmed to receive from the remote server data identifying a pick-up location of a specific passenger and data identifying a drop-off location for the specific passenger; electronically direct the autonomous vehicle-for-hire to pick up the specific passenger at the pick-up location; after picking up the specific passenger, electronically direct the autonomous vehicle-for-hire to drop off the specific passenger at the drop-off location; receive from the at least one sensor traffic data associated with the drop-off location, when the autonomous vehicle-for-hire is in a vicinity of the drop-off location; enable a comparison of the traffic data obtained from the at least one sensor with safety data to determine whether dropping off the specific passenger at the drop-off location complies with a safety threshold; when it is determined that a drop off at the drop-off location fails to meet the safety threshold, enable analysis of the traffic data obtained from the at least one sensor to identify an alternative location, in a vicinity of the drop-off location, that complies with the safety threshold; and direct the vehicle-for-hire to the alternative location, to drop off the specific passenger at the alternative location.

In one embodiment, a method for dropping off passengers at a safe location may comprise communicating with a remote server configured to electronically receive ride requests from prospective passengers; receiving from the remote server data identifying a pick-up location of a specific passenger and data identifying a drop-off location for the specific passenger; electronically directing the autonomous vehicle to pick up the specific passenger at the pick-up location; after picking up, electronically directing the autonomous vehicle to drop off the specific passenger at the drop-off location; receive from at least one sensor configured to sense traffic conditions in a vicinity of the vehicle-for-hire traffic data associated with the drop-off location; enabling a comparison of the traffic data obtained from the at least one sensor with safety data to determine whether dropping off the specific passenger at the drop-off location complies with a safety threshold; when it is determined that a drop off at the drop-off location fails to meet the safety threshold, enabling analysis of the traffic data obtained from the at least one sensor to identify an alternative location, in a vicinity of the drop-off location, that complies with the safety threshold; and directing the vehicle-for-hire to the alternative location, to drop off the specific passenger at the alternative location.

In one embodiment, a method for picking up passengers from a safe location may comprise communicating with a remote server configured to electronically receive ride requests from prospective passengers; receiving from the remote server data identifying a pick-up location of a specific passenger and data identifying a drop-off location for the specific passenger; electronically directing the autonomous vehicle to pick up the specific passenger at the pick-up location; before picking up the specific passenger at the pick-up location, receiving from at least one sensor configured to sense traffic conditions in a vicinity of the vehicle-for-hire traffic data associated with the pick-up location; enabling a comparison of the traffic data obtained from the at least one sensor with safety data to determine whether picking up the specific passenger at the pick-up location complies with a safety threshold; determining that a pick up at the pick-up location fails to meet the safety threshold; analyzing the traffic data obtained from the at least one sensor to identify an alternative pick-up location, in a vicinity of the pick-up location, that complies with the safety threshold; directing the vehicle-for-hire to the alternative pick-up location, to pick up the specific passenger at the alternative pick-up location; and causing a message including a description of the alternative pick-up location to be transmitted to the specific passenger.

In one embodiment, a system may direct a ridesharing vehicle. The system may include a communications interface and at least one processor. The communications interface may be configured to receive requests for shared-rides from a plurality of users. The at least one processor may be configured to receive during a first time period, via the communications interface, a first request for a shared-ride from a first user. The first request including information indicative of a first starting point, a first desired destination, and a first requested pick-up time, wherein the first requested pick-up time is during a second time period more than two hours after the first time period. The at least one processor may also be configured to receive during the first time period, via the communications interface, a second request for a shared ride from a second user. The second request may include information indicative of a second starting point different from the first starting point, a second desired destination different from the first desired destination, and a second requested pick-up time during the second time period. The at least one processor may further be configured store the first and second requests for processing during a third time period, where the third time period for processing is more than one hour after the first time period but before the second time period. During the third time period, the at least one processor may be configured to receive current vehicle location data for a plurality of ridesharing vehicles, wherein the current vehicle location data includes global positioning system (GPS) data generated by at least one GPS component associated with each of the plurality of ridesharing vehicles; process the first request, the second request, and the vehicle location data to identify a specific ridesharing vehicle for transporting both the first user and the second user; and calculate a ridesharing route for picking up the first user and the second user, wherein calculating the ridesharing route includes determining pick-up locations for the first user and the second user that differ from the first starting point and the second starting point. After the third time period and before the second time period, the at least one processor may be configured to wirelessly transmit to the first user and the second user the respective pick-up locations; and wireless transmit to the specific ridesharing vehicle, the calculated route for picking up the first and second user during the second time period.

In another embodiment, a method may direct ridesharing vehicles. The method may include receiving during a first time period, via the communications interface, a first request for a shared-ride from a first user, the first request including information indicative of a first starting point, a first desired destination, and a first requested pick-up time, wherein the first requested pick-up time is during a second time period more than two hours after the first time period; receiving during a first time period, via the communications interface, a second request for a shared ride from a second user, the second request including information indicative of a second starting point different from the first starting point, a second desired destination different from the first desired destination, and a second requested pick-up time during the second time period; storing the first and second requests for processing during a third time period, where the third time period for processing is more than one hour after the first time period but before the second time period; during the third time period, receiving current vehicle location data for a plurality of ridesharing vehicles, wherein the current vehicle location data includes global positioning system (GPS) data generated by at least one GPS component associated with each of the plurality of ridesharing vehicles; during the third time period, processing the first request, the second request, and the vehicle location data to identify a specific ridesharing vehicle for transporting both the first user and the second user; during the third time period, calculating a ridesharing route for picking up the first user and the second user, wherein calculating the ridesharing route includes determining pick-up locations for the first user and the second user that differ from the first starting point and the second starting point; after the third time period and before the second time period, wirelessly transmitting to the first user and the second user the respective pick-up locations; and after the third time period and before the second time period, wireless transmitting to the specific ridesharing vehicle, the calculated route for picking up the first and second user during the second time period.

Consistent with other disclosed embodiments, non-transitory computer-readable storage media may store program instructions, which are executed by at least one processing device and perform any of the methods described herein.

The foregoing general description and the following detailed description are exemplary and explanatory only and are not restrictive of the claims.

BRIEF DESCRIPTION OF THE DRAWINGS

The accompanying drawings, which are incorporated in and constitute part of this disclosure, illustrate various example embodiments. In the drawings:

FIG. 14 is a flowchart of an exemplary process for managing a fleet of petrol and non-petrol ridesharing vehicles, in accordance with some embodiments of the present disclosure.

DETAILED DESCRIPTION

Figure 1:
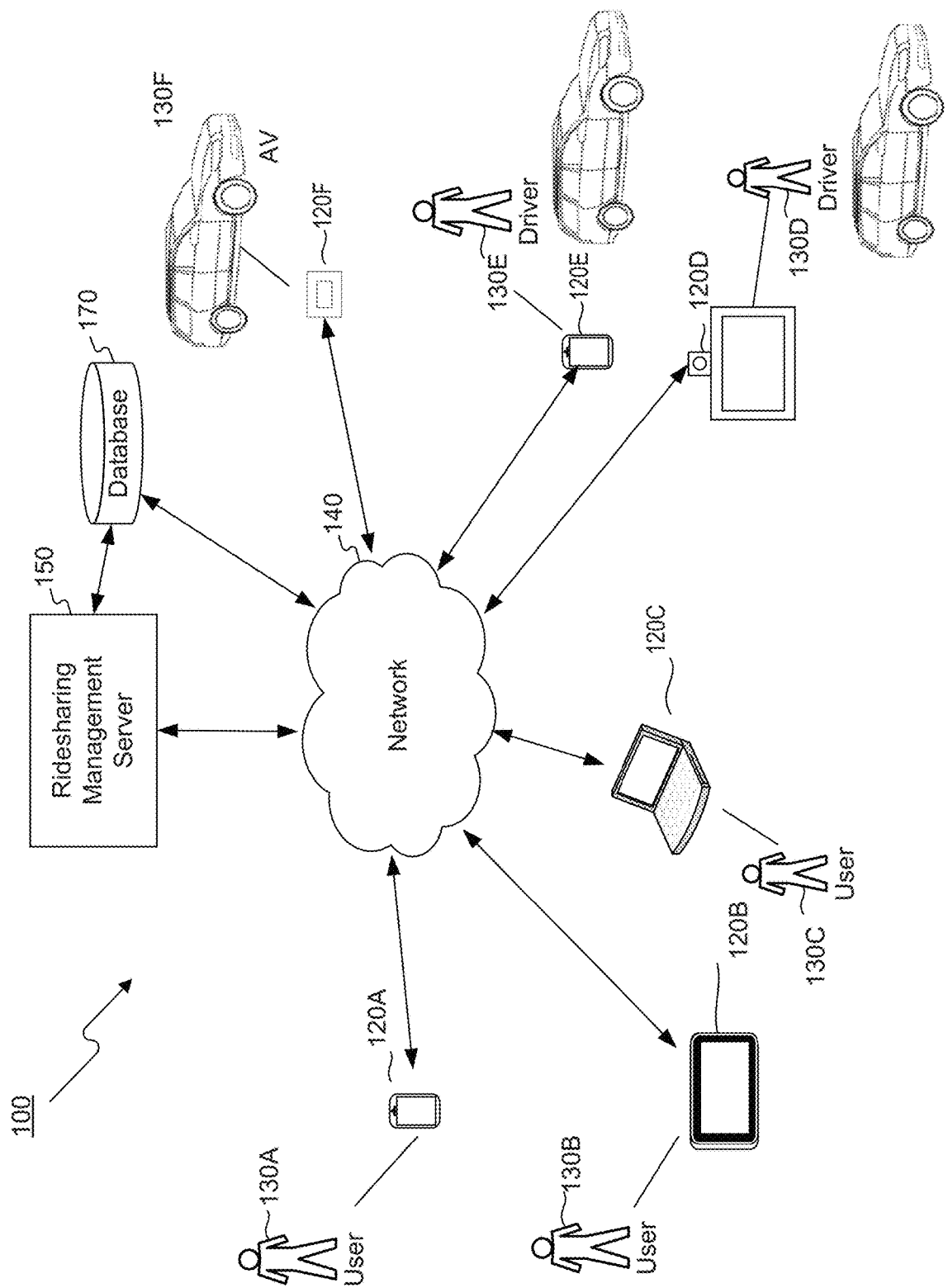
FIG. 1 is a diagram illustrating an example ridesharing management system, in accordance with some embodiments of the present disclosure.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions or modifications may be made to the components illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope is defined by the appended claims.

Disclosed embodiments of the present disclosure provide methods and systems for vehicle ridesharing and vehicle ridesharing management. The term "vehicle" or "ridesharing vehicle" as used herein refers to any kind of vehicle (e.g., car, van, SUV, truck, bus, etc.) suitable for human transportation, such as providing ride services. In some embodiments, a vehicle may be a taxi. In some embodiments, a vehicle may include an autonomous vehicle, wherein a control device integrated with the vehicle or a management system separate from the vehicle may send operational instructions and guide the vehicle to designated pick-up locations and drop-off locations. For the ease and conciseness of description, some embodiments disclosed herein may simply refer to a vehicle or a taxi as an example, which does not limit the scope of the disclosed embodiments.

Consistent with some embodiments of the present disclosure, a ridesharing management system may receive a first ride request from a first user. The first ride request may include a starting point and a desired destination. The ridesharing management system may calculate a first estimated pick-up time based on a current location of a vehicle that is in the surrounding areas. After sending a confirmation with the estimated pick-up time, the ridesharing management system may then guide the vehicle to a pick-up location for picking up the first rider. The pick-up location may be a different location from the starting point included in the first ride request. The system may also guide the first user to the pick-up location.

In some embodiments, the system may subsequently receive a second ride request from a second user, for example, while the first user is still in the vehicle. The second ride request may include a second starting point and a second desired destination. The system may calculate a second estimated pick-up time, provide a second confirmation to the second rider, and guide the second rider to a second pick-up location. In some embodiments, the second pick-up location may be a different location from the second starting point included in the second ride request.

In some embodiments, the system may calculate the fares for each user, based on the solo ride portion for a corresponding user, and the shared portion of the ride. For example, the system may offer a discount for the shared portion of the ride. In some embodiments, the system may also calculate the fare amount for a particular user based on various service-related parameters such as user input regarding whether to use toll roads, the walking distance between the starting point and the pick-up location, and the walking distance between the desired destination and the drop-off location.

The embodiments herein further include computer-implemented methods, tangible non-transitory computer-readable mediums, and systems. The computer-implemented methods can be executed, for example, by at least one processor that receives instructions from a non-transitory computer-readable storage medium. Similarly, systems and devices consistent with the present disclosure can include at least one processor and memory, and the memory can be a non-transitory computer-readable storage medium. As used herein, a "non-transitory computer-readable storage medium" refers to any type of physical memory on which information or data readable by at least one processor can be stored. Examples include random access memory (RAM), read-only memory (ROM), volatile memory, nonvolatile memory, hard drives, CD ROMs, DVDs, flash drives, disks, and any other known physical storage medium. Singular terms, such as "memory" and "computer-readable storage medium," can additionally refer to multiple structures, such a plurality of memories or computer-readable storage mediums. As referred to herein, a "memory" may comprise any type of computer-readable storage medium unless otherwise specified. A computer-readable storage medium may store instructions for execution by at least one processor, including instructions for causing the processor to perform steps or stages consistent with an embodiment herein. Additionally, one or more computer-readable storage mediums may be used in implementing a computer-implemented method. The term "computer-readable storage medium" should be understood to include tangible items and exclude carrier waves and transient signals.

FIG. 1 is a diagram illustrating an example ridesharing management system, in which various implementations as described herein may be practiced, according to some embodiments of the present disclosure. As shown in FIG. 1, ridesharing management system 100 includes one or more mobile communications devices 120A-120F (collectively referred to as mobile communications devices 120), a network 140, a ridesharing management server 150, and a database 170. The plurality of mobile communications devices 120A-120F may further include a plurality of user devices 120A-120C associated with users 130A-130C respectively, a plurality of driver devices 120D and 120E associated with drivers 130D and 130E, and a driving-control device 120F associated with an autonomous vehicle 130F. Consistent with some embodiments of the present disclosure, ridesharing management server 150 may communicate with driving-control device 120F to direct autonomous vehicle 130F to pick up and drop off users 130A-130C. In one example, autonomous vehicles capable of detecting objects on the road and navigate to designated locations may be utilized for providing ridesharing services.

The components and arrangements shown in FIG. 1 are not intended to limit the disclosed embodiments, as the system components used to implement the disclosed processes and features can vary. For example, ridesharing management system 100 may include multiple ridesharing management servers 150, and each ridesharing management server 150 may handle a certain category of ridesharing services, ridesharing services associated with a certain category of service vehicles, or ridesharing services in a specific geographical region, such that a plurality of ridesharing management servers 150 may collectively provide a dynamic and integrated ridesharing service system.

Network 140 may facilitate communications between user devices 120 and ridesharing management server 150, for example, receiving ride requests and other ride server related input from or sending confirmations to user devices, and sending ride service assignments to driver devices and driving-control devices. Network 140 may be any type of networks that provides communications, exchanges information, and/or facilitates the exchange of information between ridesharing management server 150 and user devices 120. For example, network 140 may be the Internet, a Local Area Network, a cellular network, a public switched telephone network ("PSTN"), or other suitable connection(s) that enables ridesharing management system 100 to send and receive information between the components of ridesharing management system 100. Network 140 may support a variety of messaging formats and may further support a variety of services and applications for user devices 120. For example, network 140 may support navigation services for mobile communications devices 120, such as directing the users and service vehicles to pick-up or drop-off locations.

Ridesharing management server 150 may be a system associated with a communication service provider which provides a variety of data or services, such as voice, messaging, real-time audio/video, to users, such as users 130A-130E. Ridesharing management server 150 may be a computer-based system including computer system components, desktop computers, workstations, tablets, handheld mobile communications devices, memory devices, and/or internal network(s) connecting the components. Ridesharing management server 150 may be configured to receive information from mobile communications devices 120 over network 140, process the information, store the information, and/or transmit information to mobile communications devices 120 over network 140.

For example, in some embodiments, ridesharing management server 150 may be configured to: receive ride requests from user devices 120A-120C, send ride confirmation and ride fare information to user devices 120A-120C, and send ride service assignments (for example, including pick-up and drop-off location information) to driver devices 120D and 120E, and driving-control device 120F. Further, ridesharing management server 150 may further be configured to receive user input from user devices 120A-120C as to various ride service parameters, such as walking distance to a pick-up location, maximum delay of arrival/detour, and maximum number of subsequent pick-ups, etc. In some embodiments, ridesharing management server 150 may be further configured to: calculate ride fares based on a solo portion of a user's ride and a shared portion of the ride. Further, the ride fare calculation may further be based on various ride service parameters set by the user, such as the walking distance involved in the ride, and user selection regarding toll road usage, etc.

Database 170 may include one or more physical or virtual storages coupled with ridesharing management server 150. Database 170 may be configured to store user account information (including registered user accounts and driver accounts), corresponding user profiles such as contact information, profile photos, and associated mobile communications device information. With respect to users, user account information may further include ride history, service feedbacks, complaints, or comments. With respect to drivers, user account information may further include number of ride service assignments completed, ratings, and ride service history information. Database 170 may further be configured to store various ride requests received from user devices 120A-120C and corresponding starting point and desired destination information, user input regarding various service parameters, pick-up and drop-off locations, time of pick-up and drop-off, ride fares, and user feedbacks, etc.

Database 170 may further include traffic data, maps, and toll road information, which may be used for ridesharing service management. Traffic data may include historical traffic data and real-time traffic data regarding a certain geographical region, and may be used to, for example, calculate estimate pick-up and drop-off times, and determine an optimal route for a particular ride. Real-time traffic data may be received from a real-time traffic monitoring system, which may be integrated in or independent from ridesharing management system 100. Maps may include map information used for navigation purposes, for example, for calculating potential routes and guiding the users to a pick-off or drop-off location. Toll road information may include toll charges regarding certain roads, and any change or updates thereof. Toll road information may be used to calculate ride fares, for example, in cases where the user permits use of toll roads.

The data stored in database 170 may be transmitted to ridesharing management server 150 for accommodating ride requests. In some embodiments, database 170 may be stored in a cloud-based server (not shown) that is accessible by ridesharing management server 150 and/or mobile communications devices 120 through network 140. While database 170 is illustrated as an external device connected to ridesharing management server 150, database 170 may also reside within ridesharing management server 150 as an internal component of ridesharing management server 150.

As shown in FIG. 1, users 130A-130E may include a plurality of users 130A-130C, and a plurality of drivers 130D and 130E, who may communicate with one another, and with ridesharing management server 150 using various types of mobile communications devices 120. As an example, a mobile communications device 120 may include a display such as a television, tablet, computer monitor, video conferencing console, or laptop computer screen. A mobile communications device 120 may further include video/audio input devices such as a microphone, video camera, keyboard, web camera, or the like. For example, a mobile communications device 120 may include mobile devices such as a tablet or a smartphone having display and video/audio capture capabilities. A mobile communications device 120 may also include one or more software applications that facilitate the mobile communications devices to engage in communications, such as IM, VoIP, video conferences. For example, user devices 130A-130C may send requests to ridesharing management server 150 and receive confirmations therefrom. Drivers 130D and 130E may use their respective devices to receive ride service assignments and navigation information from ridesharing management server 150 and may contact the users with their respective devices 120D and 120E.

In some embodiments, a user may directly hail a vehicle by hand gesture or verbal communication, such as traditional street vehicle hailing. In such embodiments, once a driver accepts the request, the driver may then use his device to input the ride request information. Ridesharing management server 150 may receive such request information, and accordingly assign one or more additional ride service assignments to the same vehicle, for example, subsequent e-hail ride requests received from other mobile communications devices 120 through network 140.

In some embodiments, driver devices 120D and 120E, and driving-control device 120F may be embodied in a vehicle control panel, as a part of the vehicle control system associated with a particular vehicle. For example, a traditional taxi company may install a drive device in all taxi vehicles managed by the taxi company. In some embodiments, driver devices 120D and 120E, and driving-control device 120F, may be further coupled with a payment device, such as a card reader installed as a part of the vehicle control panel or as a separate device associated with the vehicle. A user may then use the payment device as an alternative payment mechanism. For example, a user who hails the taxi on the street may pay through the payment device, without using a user device providing ridesharing service.

Figure 2:
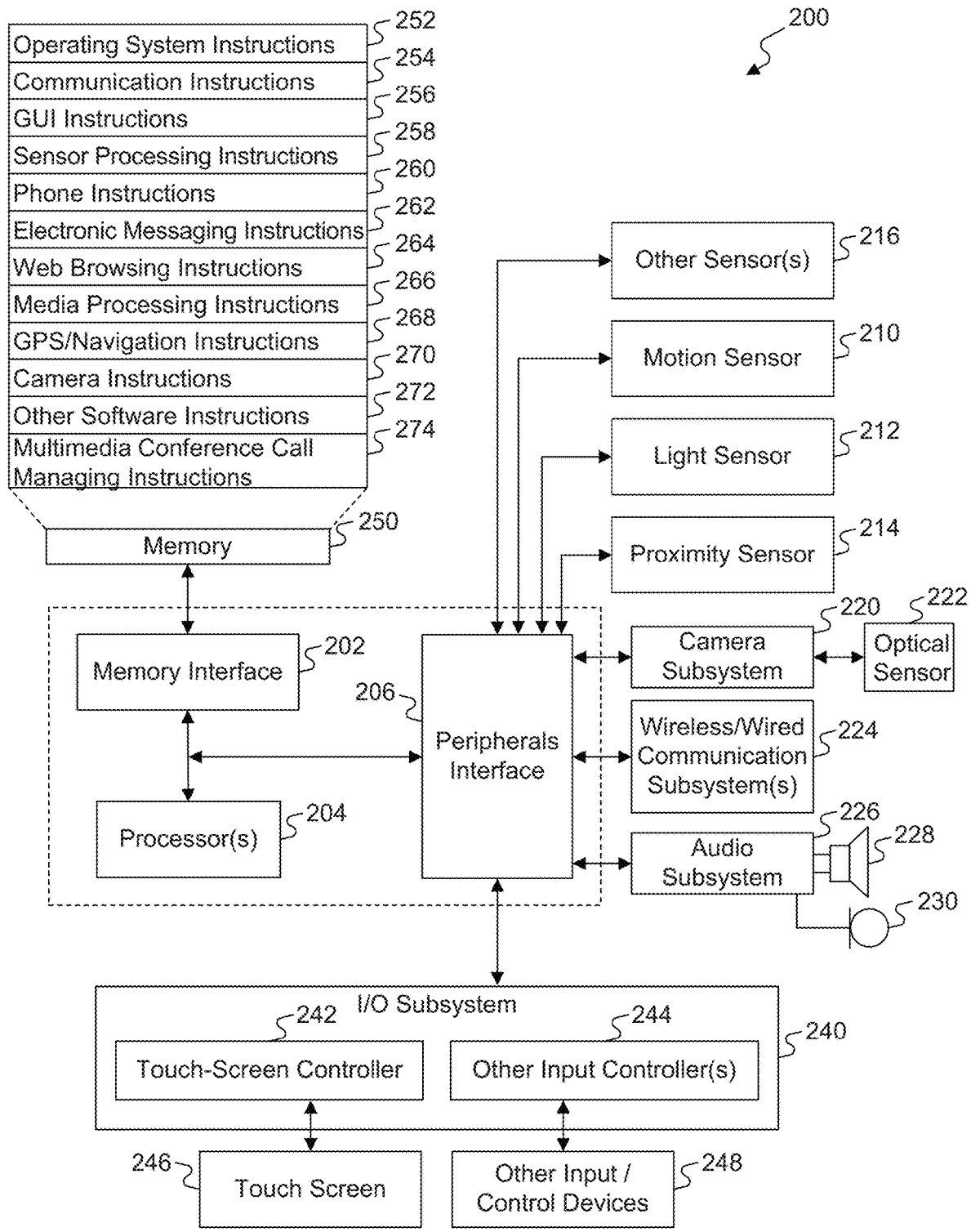
FIG. 2 is a diagram illustrating the components of an example mobile communications device associated with a ridesharing management system, in accordance with some embodiments of the present disclosure.

FIG. 2 is a diagram illustrating the components of an example mobile communications device 200 associated with a ridesharing management system, such as system 100 as shown in FIG. 1, in accordance with some embodiments of the present disclosure. Mobile communications device 200 may be used to implement computer programs, applications, methods, processes, or other software to perform embodiments described in the present disclosure, such as mobile communications devices 120A-120F. For example, user devices 120A-120C, driver devices 120D and 120E, and driving-control device 120F may respectively be installed with a user side ridesharing application, and a corresponding driver side ridesharing application.

Mobile communications device 200 includes a memory interface 202, one or more processors 204 such as data processors, image processors and/or central processing units, and a peripherals interface 206. Memory interface 202, one or more processors 204, and/or peripherals interface 206 can be separate components or can be integrated in one or more integrated circuits. The various components in mobile communications device 200 may be coupled by one or more communication buses or signal lines.

Sensors, devices, and subsystems can be coupled to peripherals interface 206 to facilitate multiple functionalities. For example, a motion sensor 210, a light sensor 212, and a proximity sensor 214 may be coupled to peripherals interface 206 to facilitate orientation, lighting, and proximity functions. Other sensors 216 may also be connected to peripherals interface 206, such as a positioning system (e.g., GPS receiver), a temperature sensor, a biometric sensor, or other sensing device, to facilitate related functionalities. A GPS receiver may be integrated with, or connected to, mobile communications device 200. For example, a GPS receiver may be included in mobile telephones, such as smartphone devices. GPS software may allow mobile telephones to use an internal or external GPS receiver (e.g., connecting via a serial port or Bluetooth). A camera subsystem 220 and an optical sensor 222, e.g., a charged coupled device ("CCD") or a complementary metal-oxide semiconductor ("CMOS") optical sensor, may be used to facilitate camera functions, such as recording photographs and video clips.

Communication functions may be facilitated through one or more wireless/wired communication subsystems 224, which includes an Ethernet port, radio frequency receivers and transmitters and/or optical (e.g., infrared) receivers and transmitters. The specific design and implementation of wireless/wired communication subsystem 224 may depend on the communication network(s) over which mobile communications device 200 is intended to operate. For example, in some embodiments, mobile communications device 200 may include wireless/wired communication subsystems 224 designed to operate over a GSM network, a GPRS network, an EDGE network, a Wi-Fi or WiMax network, and a Bluetooth® network.

An audio subsystem 226 may be coupled to a speaker 228 and a microphone 230 to facilitate voice-enabled functions, such as voice recognition, voice replication, digital recording, and telephony functions.

I/O subsystem 240 may include touch screen controller 242 and/or other input controller(s) 244. Touch screen controller 242 may be coupled to touch screen 246. Touch screen 246 and touch screen controller 242 may, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with touch screen 246. While touch screen 246 is shown in FIG. 2, I/O subsystem 240 may include a display screen (e.g., CRT or LCD) in place of touch screen 246.

Other input controller(s) 244 may be coupled to other input/control devices 248, such as one or more buttons, rocker switches, thumb-wheel, infrared port, USB port, and/or a pointer device such as a stylus. Touch screen 246 may, for example, also be used to implement virtual or soft buttons and/or a keyboard.

Memory interface 202 may be coupled to memory 250. Memory 250 includes high-speed random-access memory and/or non-volatile memory, such as one or more magnetic disk storage devices, one or more optical storage devices, and/or flash memory (e.g., NAND, NOR). Memory 250 may store an operating system 252, such as DRAWIN, RTXC, LINUX, iOS, UNIX, OS X, WINDOWS, or an embedded operating system such as VXWorkS. Operating system 252 may include instructions for handling basic system services and for performing hardware dependent tasks. In some implementations, operating system 252 can be a kernel (e.g., UNIX kernel).

Memory 250 may also store communication instructions 254 to facilitate communicating with one or more additional devices, one or more computers and/or one or more servers. Memory 250 can include graphical user interface instructions 256 to facilitate graphic user interface processing; sensor processing instructions 258 to facilitate sensor-related processing and functions; phone instructions 260 to facilitate phone-related processes and functions; electronic messaging instructions 262 to facilitate electronic-messaging related processes and functions; web browsing instructions 264 to facilitate web browsing-related processes and functions; media processing instructions 266 to facilitate media processing-related processes and functions; GPS/navigation instructions 268 to facilitate GPS and navigation-related processes and instructions; camera instructions 270 to facilitate camera-related processes and functions; and/or other software instructions 272 to facilitate other processes and functions.

In some embodiments, communication instructions 254 may include software applications to facilitate connection with ridesharing management server 150 that handles vehicle ridesharing requests. Graphical user interface instructions 256 may include a software program that facilitates a user associated with the mobile communications device to receive messages from ridesharing management server 150, provide user input, and so on. For example, a user may send ride requests and ride service parameters to ridesharing management server 150 and receive ridesharing proposals and confirmation messages. A driver may receive ride service assignments from ridesharing management server 150, and provide ride service status updates.

Each of the above identified instructions and applications may correspond to a set of instructions for performing one or more functions described above. These instructions need not be implemented as separate software programs, procedures, or modules. Memory 250 may include additional instructions or fewer instructions. Furthermore, various functions of mobile communications device 200 may be implemented in hardware and/or in software, including in one or more signal processing and/or application specific integrated circuits.

Figure 3:
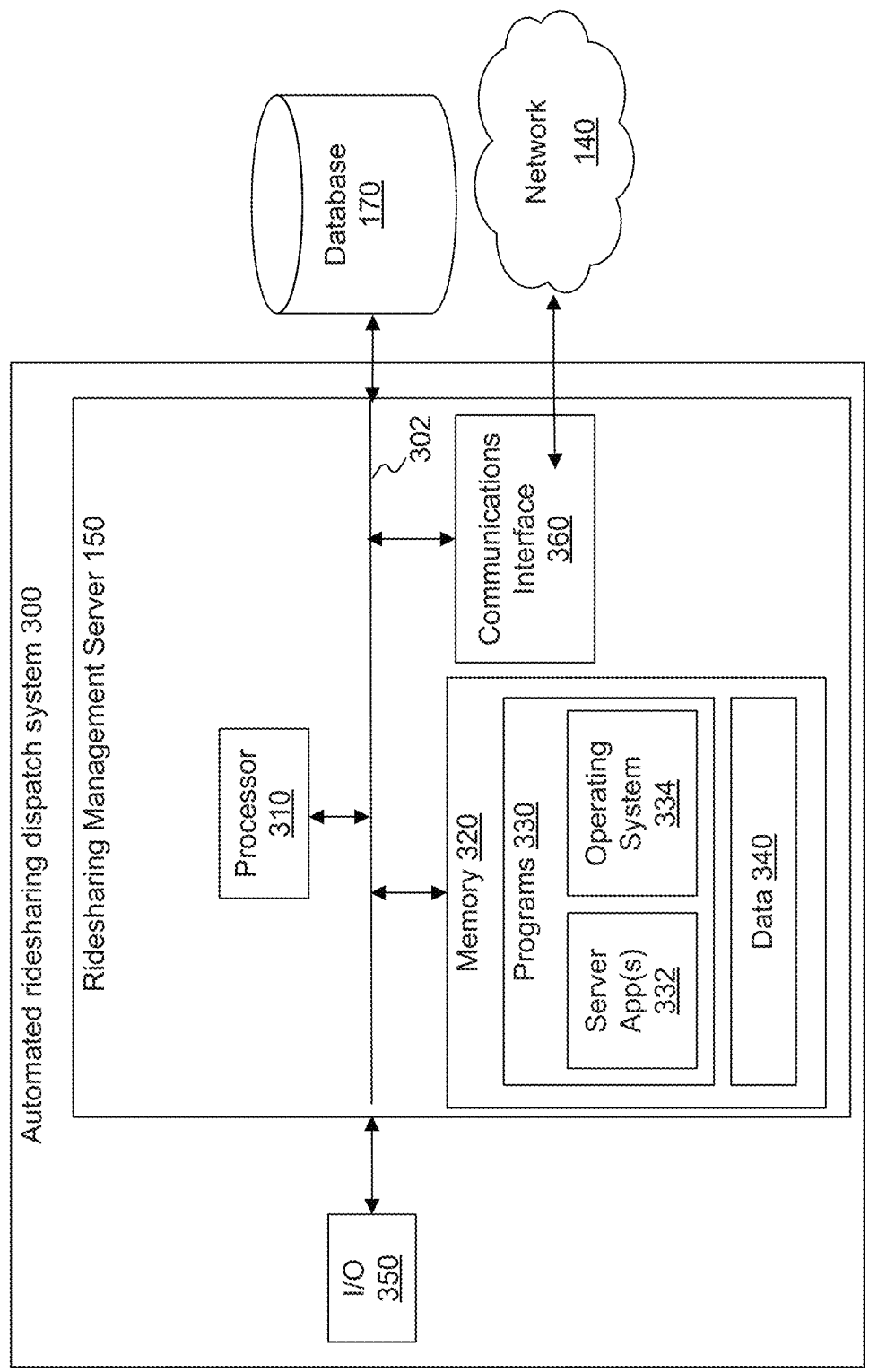
FIG. 3 is a diagram illustrating the components of an example ridesharing management server associated with a ridesharing management system, in accordance with some embodiments of the present disclosure.

FIG. 3 is a diagram illustrating the components of an example an automated ridesharing dispatch system 300 that includes ridesharing management server 150 associated with a ridesharing management system 100, in accordance with some embodiments of the present disclosure. Ridesharing management server 150 may include a bus 302 (or other communication mechanism), which interconnects subsystems and components for transferring information within ridesharing management server 150.

As shown in FIG. 3, automated ridesharing dispatch system 300 may include one or more processors 310, one or more memories 320 storing programs 330 including, for example, server app(s) 332, operating system 334, and data 340, and a communications interface 360 (e.g., a modem, Ethernet card, or any other interface configured to exchange data with a network, such as network 140 in FIG. 1). Automated ridesharing dispatch system 300 may communicate with an external database 170 (which, for some embodiments, may be included within ridesharing management server 150). Automated ridesharing dispatch system 300 may include a single server (e.g., ridesharing management server 150) or may be configured as a distributed computer system including multiple servers, server farms, clouds, or computers that interoperate to perform one or more of the processes and functionalities associated with the disclosed embodiments. The term "cloud server" refers to a computer platform that provides services via a network, such as the Internet. When ridesharing management server 150 is a cloud server it may use virtual machines that may not correspond to individual hardware. Specifically, computational and/or storage capabilities may be implemented by allocating appropriate portions of desirable computation/ storage power from a scalable repository, such as a data center or a distributed computing environment.

Processor 310 may be one or more processing devices configured to perform functions of the disclosed methods, such as a microprocessor manufactured by Intel™ or manufactured by AMD™. Processor 310 may comprise a single core or multiple core processors executing parallel processes simultaneously. For example, processor 310 may be a single core processor configured with virtual processing technologies. In certain embodiments, processor 310 may use logical processors to simultaneously execute and control multiple processes. Processor 310 may implement virtual machine technologies, or other technologies to provide the ability to execute, control, run, manipulate, store, etc. multiple software processes, applications, programs, etc. In some embodiments, processor 310 may include a multiple-core processor arrangement (e.g., dual, quad core, etc.) configured to provide parallel processing functionalities to allow ridesharing management server 150 to execute multiple processes simultaneously. It is appreciated that other types of processor arrangements could be implemented that provide for the capabilities disclosed herein.

Memory 320 may be a volatile or non-volatile, magnetic, semiconductor, tape, optical, removable, non-removable, or other type of storage device or tangible or non-transitory computer-readable medium that stores one or more program (s) 330 such as server apps 332 and operating system 334, and data 340. Common forms of non-transitory media include, for example, a flash drive, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM or any other flash memory, NVRAM, a cache, a register, any other memory chip or cartridge, and networked versions of the same.

Ridesharing management server 150 may include one or more storage devices configured to store information used by processor 310 (or other components) to perform certain functions related to the disclosed embodiments. For example, ridesharing management server 150 may include memory 320 that includes instructions to enable processor 310 to execute one or more applications, such as server apps 332, operating system 334, and any other type of application or software known to be available on computer systems. Alternatively or additionally, the instructions, application programs, etc., may be stored in an external database 170 (which can also be internal to ridesharing management server 150) or external storage communicatively coupled with ridesharing management server 150 (not shown), such as one or more database or memory accessible over network 140.

Database 170 or other external storage may be a volatile or non-volatile, magnetic, semiconductor, tape, optical, removable, non-removable, or other type of storage device or tangible or non-transitory computer-readable medium. Memory 320 and database 170 may include one or more memory devices that store data and instructions used to perform one or more features of the disclosed embodiments. Memory 320 and database 170 may also include any combination of one or more databases controlled by memory controller devices (e.g., server(s), etc.) or software, such as document management systems, Microsoft SQL databases, SharePoint databases, Oracle™ databases, Sybase™ databases, or other relational databases.

In some embodiments, ridesharing management server 150 may be communicatively connected to one or more remote memory devices (e.g., remote databases (not shown)) through network 140 or a different network. The remote memory devices can be configured to store information that ridesharing management server 150 can access and/or manage. By way of example, the remote memory devices may include document management systems, Microsoft SQL database, SharePoint databases, Oracle™ databases, Sybase™ databases, or other relational databases. Systems and methods consistent with disclosed embodiments, however, are not limited to separate databases or even to the use of a database.

Programs 330 may include one or more software modules causing processor 310 to perform one or more functions of the disclosed embodiments. Moreover, processor 310 may execute one or more programs located remotely from one or more components of the ridesharing management system 100. For example, ridesharing management server 150 may access one or more remote programs that, when executed, perform functions related to disclosed embodiments.

In the presently described embodiment, server app(s) 332 may cause processor 310 to perform one or more functions of the disclosed methods. For example, devices associated with users, drivers and autonomous vehicles may respectively be installed with user applications for vehicle ridesharing services, and driver applications for vehicle ridesharing services. Further, a mobile communications device may be installed with both the driver applications and the user applications, for uses in corresponding situations.

In some embodiments, other components of ridesharing management system 100 may be configured to perform one or more functions of the disclosed methods. For example, mobile communications devices 120 may be configured to calculate estimate pick-up and drop-off times based on a certain ride request, and may be configured to calculate estimate ride fares. As another example, mobile communications devices 120 may further be configured to provide navigation service, and location service, such as directing the user to a particular pick-up or drop-off location, and providing information about a current location of the respective user or vehicle to ridesharing management server 150.

In some embodiments, program(s) 330 may include operating system 334 performing operating system functions when executed by one or more processors such as processor 310. By way of example, operating system 334 may include Microsoft Windows™, Unix™, Linux™, Apple™ operating systems, Personal Digital Assistant (PDA) type operating systems, such as Apple iOS, Google Android, Blackberry OS, Microsoft CE™, or other types of operating systems. Accordingly, the disclosed embodiments may operate and function with computer systems running any type of operating system 334. Ridesharing management server 150 may also include software that, when executed by a processor, provides communications with network 140 through communications interface 360 and/or a direct connection to one or more mobile communications devices 120. Specifically, communications interface 360 may be configured to receive ride requests (e.g., from user devices 120A-120C) headed to differing destinations and receive indications of the current locations of the ridesharing vehicles (e.g., from driver devices 120D and 120E or driving-control device 120F). In one example, communications interface 360 may be configured to continuously or periodically receive current vehicle location data for the plurality of ridesharing vehicles that are part of ridesharing management system 100. The current vehicle location data may include global positioning system (GPS) data generated by at least one GPS component of a mobile communications device 120 associated with each ridesharing vehicle.

In some embodiments, data 340 may include, for example, profiles of users, such as user profiles or driver profiles. Data 340 may further include ride requests from a plurality of users, user ride history and driver service record, and communications between a driver and a user regarding a particular ride request. In some embodiments, data 340 may further include traffic data, toll road information, and navigation information, which may be used for handling and accommodating ride requests.

Automated ridesharing dispatch system 300 may also include one or more I/O devices 350 having one or more interfaces for receiving signals or input from devices and providing signals or output to one or more devices that allow data to be received and/or transmitted by automated ridesharing dispatch system 300. For example, automated ridesharing dispatch system 300 may include interface components for interfacing with one or more input devices, such as one or more keyboards, mouse devices, and the like, that enable automated ridesharing dispatch system 300 to receive input from an operator or administrator (not shown).

Figure 4A:
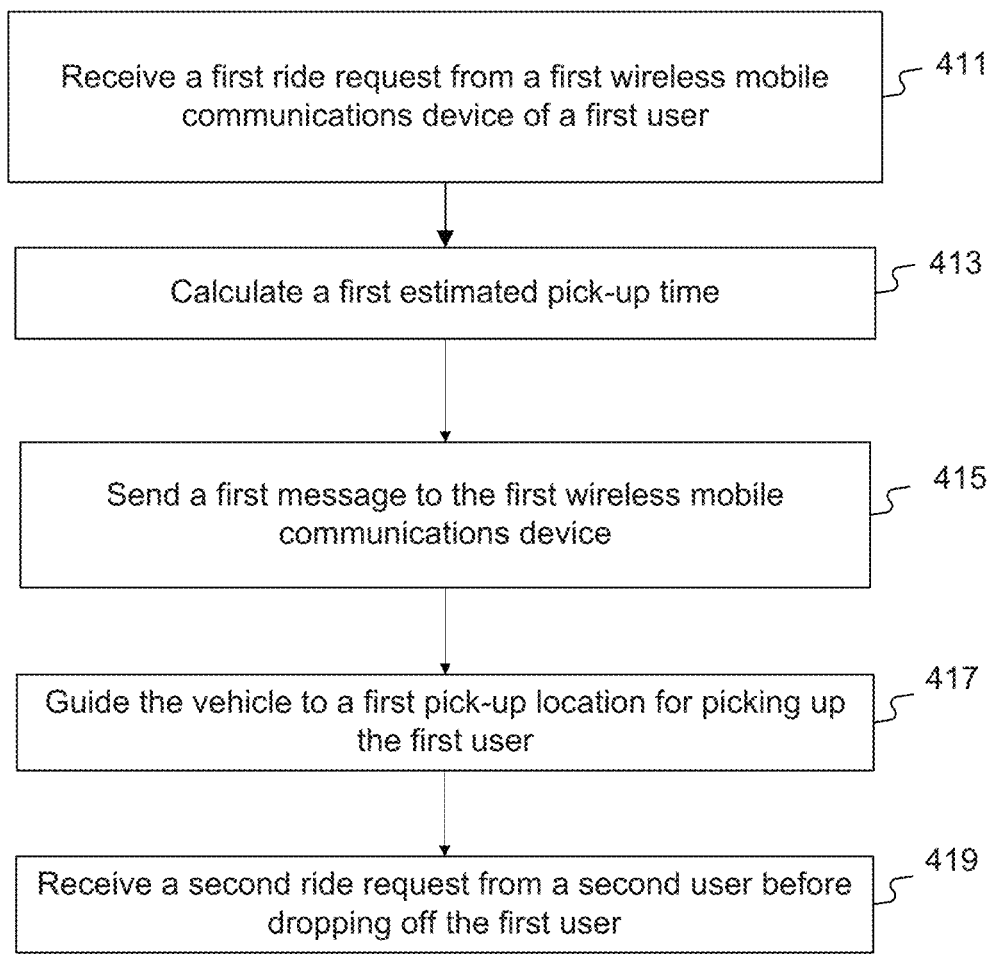
FIG. 4A and FIG. 4B are flowcharts of example processes for vehicle ridesharing management, in accordance with some embodiments of the present disclosure.
Figure 4B:
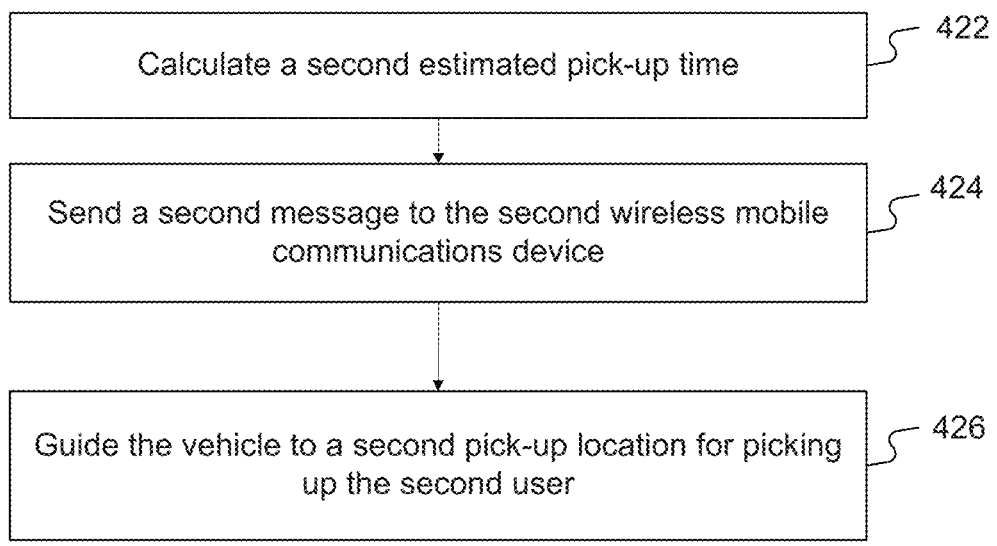

FIGS. 4A and 4B are flowcharts of example processes 410 and 420 for vehicle ridesharing management, in accordance with some embodiments of the present disclosure. In one embodiment, all of the steps of process 400 may be performed by a ridesharing management server, such as ridesharing management server 150 described above with reference to FIGS. 1 and 3. Alternatively, at least some of the steps of process 400 may be performed by a mobile communications device, such as the mobile communications devices 120 described above with reference to FIGS. 1 and 2. In the following description, reference is made to certain components of FIGS. 1-3 for purposes of illustration. It will be appreciated, however, that other implementations are possible and that other components may be used to implement example methods disclosed herein.

At step 411, ridesharing management server 150 may receive a first ride request from a first wireless communication of a first user, for example, a request from user 130A sent through user device 120A. The first ride request may include a first starting point and a first desired destination. A ride request may refer to a request from a user needing transportation service from a certain location to another. A starting point may refer to a current location of the user, as input by the user through an input device of an associated user device, or as determined by a location service application installed on the user device. In some embodiments, the starting point may be a location different from the current location of the user, for example, a location where the user will subsequently arrive at (e.g., entrance of a building). A desired destination may refer to a location where the user requests to be taken to.

In some embodiments, the actual pick-up location and the actual drop-off location may be different from the starting point and the desired destination. For example, the pick-up location may be of a certain distance from the starting point, where the user may be directed to for pick-up. By encouraging the user to walk to a pick-up location nearby, consistent with some embodiments, the vehicle may more easily and quickly locate the user without causing an excessive detour or an excessive delay for users who are in the vehicle. Similarly, by encouraging the user to walk from a drop-off location different from but within a certain distance from the desired destination, the vehicle may be able to accommodate subsequent pick-ups, or arrive at the subsequent pick-up locations more quickly. The vehicle ridesharing service management system may provide incentives or rewards for the user who are willing to walk a certain distance. For example, the ridesharing management system may offer certain discounts based on the number and distances of the walks involved in a particular ride. Alternatively, the ridesharing management system may offer ride credits corresponding to the number and distance of the walks undertaken by the user during his rides. The user may use the credits for subsequent ride payment, or redeem the credit for money, free rides, or other rewards. Further, advantages of such embodiments may include more efficient vehicle use and management, more user flexibility, and less air pollution associated with vehicle use.

In some embodiments, prior to or after the user sends a ride request to ridesharing management server 150, the user may further input ride service parameters through, for example, a settings component provided on a user interface. Ride service parameters refer to user preference parameters regarding a vehicle ridesharing service, for example, a maximum walking distance from the starting point to a pick-up location, a maximum walking distance from a drop-off location to a desired destination, a total maximum walking distance involved in a ride, a maximum number of subsequent pick-ups, maximum delay of arrival/detour incurred by subsequent pick-ups during a ride, and a selection whether to permit toll road usage during the ride, etc.

Ride service parameters may be transmitted to ridesharing management server 150 for processing the request and assignment of an available vehicle based on the ride service parameters. For example, a ride request may be associated with a maximum walking distance of 300 meters from a starting point to a pick-up location. When assigning an available vehicle to pick up the user, ridesharing management server 150 may include in the assignment an assigned pick-up location within 300 meters or less of the starting point. Similarly, a ride request may be associated with a maximum walking distance of 0.5 mile from a drop-off location to a desired destination. When assigning an available vehicle to pick up the user, ridesharing management server 150 may include in the assignment an assigned drop-off location within 0.5 mile or less from the desired destination.

For requests associated with a maximum total walking distance of one mile during the ride, when assigning an available vehicle to pick up the user, ridesharing management server 150 may include in the assignment an assigned pick-up location and an assigned drop-off location, a total of a distance from the starting point to the assigned pick-up location and a distance from the assigned drop-off location to a desired destination may be equal to or less than one mile.

In the above examples, the values regarding the walking distances are only exemplary. Other embodiments consistent with the present disclosure may use different options of the distances and may provide a list of options. The distances may further be measured in different units, for example, miles, meters, kilometers, blocks, and feet, etc., which are not limited by the disclosed embodiments herein. In some embodiments, the distance may further be represented by an average walking time from a certain location to another, based on average walking speed, for example, ten minutes, five minutes, etc.

With respect to parameters regarding subsequent pick-ups, such as a maximum number of subsequent pick-ups, and maximum delay of arrival incurred by subsequent pick-ups, ridesharing management server 150 may assign subsequent pick-ups accordingly, without exceeding the parameters set by the user. For example, a ride request may be associated with a maximum number of two subsequent pick-ups during the ride. Ridesharing management server 150 may monitor the service status of the vehicle assigned to pick up the user, and refrain from assigning a third subsequent pick-up before the vehicle arrives at a drop-off location for dropping off the user. As another example, for a ride request associated with a maximum delay of arrival of ten minutes, when assigning subsequent ride requests, ridesharing management server 150 may calculate an estimated delay that may occur to the user if the same vehicle was to undertake the subsequent ride request. If the estimated delay that may occur to the user is more than ten minutes, ridesharing management server 150 may assign the subsequent ride request to other available vehicles.

In some embodiments, the user may also input selection of toll road usage through the associated user device, to allow or disallow use of toll roads. Ridesharing management server 150 may then take the user's selection into account when assigning an available vehicle for accommodating the ride request, determining travel route, and calculating ride fare for the user. For example, ridesharing management server 150 may adjust the ride fare amount for a corresponding user based on the toll roads selection input and toll charges involved. For another example, if a first user does not permit toll road usage, before any subsequent pick-ups during the ride, ridesharing management server 150 may send a route to an assigned vehicle that does not include toll roads. For another example, if a subsequent user sharing the ride permits usage of toll road, ridesharing management server 150 may not charge the first user for any overlap portion of the ride where toll roads are used, change the route to include toll roads after the first user is dropped off, or assign the second user to a ridesharing vehicle with users that permit toll road usage.

In some embodiments, the ride request information may also be input from the driver device, for example, driver device 120D, or from a device associated with the vehicle. In the case of street hailing, where the user hails a vehicle on the street without using a vehicle ridesharing service application on a mobile communications device, the driver, for example, driver 130D, may input information such as the starting point/pick-up information and destination information through driver device 120D, which may then be transmitted to ridesharing management server 150.

At step 413, ridesharing management server 150 may calculate an estimated pick-up time, for example, based on a current location of an assigned vehicle and the first starting point included in the first ride request. An estimated pick-up time may refer to a time period before an assigned vehicle arrives at a pick-up location for picking up the user.

The assigned vehicle may refer to the vehicle that is assigned to undertake the first ride request, for example, a taxi in a taxi fleet, one of a plurality of vehicles managed by a transportation service system, or a plurality of vehicles owned by a plurality of owners and used to provide ridesharing services. The pick-up location may be the same as the starting point, or an assigned pick-up location associated with the starting point.

The estimated pick-up time may be determined based on a distance between a current location of the assigned vehicle and the pick-up location, and an estimate speed of traveling along the route between the two locations. The current location of the assigned vehicle may be determined by a location service application installed on a driver device, a driving-control device, or by a location determination component in the ridesharing management system 100, which may be a part of or separate from ridesharing management server 150. In some embodiments, the estimated pick-up time may further be determined based on historical or real-time traffic data, and a route currently followed by the vehicle.

In some embodiments, process 410 may further include locating one or a plurality of potential available vehicles and selecting an assigned vehicle therefrom. For example, potential available vehicles may include vacant vehicles in the surrounding areas of the first starting point, and vehicles heading to a location close to the first starting point for assigned pick-ups or drop-offs. Ridesharing management server 150 may filter potential available vehicles by ride service parameters set by the users who are inside the vehicle, for example, removing occupied vehicles where a user inside the vehicle does not permit subsequent pick-ups, or occupied vehicles where the user requires a minimal delay. In some embodiments, ridesharing management server 150 may filter potential assignment vehicles by choosing a vehicle that would involve minimal walking of the user or walking without the need of crossing the street. In some embodiments, ridesharing management server 150 may further filter potential assignment vehicles by choosing a vehicle that would involve minimal detour for the vehicle to arrive at the pick-up location. In some embodiments, the assigned vehicle may be selected by applying multiple filter criteria, or by applying multiple filter criteria in a certain order.

In some embodiments, the pick-up location may be an assigned pick-up location different from the first starting point, for example, half a block or further away from the first starting point. Ridesharing management server 150 may assign a pick-up location based on ride service parameters set by the first user, as described above at step 411. Ridesharing management server 150 may further assign a pick-up location which is along a main street where an assigned vehicle can easily locate, or a location which would not require an assign vehicle to take a U-turn. In cases where there are one or more other users in the vehicle, ridesharing management server 150 may assign a pick-up location close to the vehicle's next assigned drop-off, or on the side of a street where the vehicle will soon go through. In some embodiments, ridesharing management server 150 may adjust selection of the pick-up location based on filtering results of potential assignment vehicles, or vice versa. The two selection processes may complement each other to reach one or more optimal combinations.

In some embodiments, where there are multiple potential assignment vehicles, each with a corresponding potential pick-up location, an estimated pick-up time may be respectively calculated corresponding to each of the potential assignment vehicles. Ridesharing management server 150 may then choose the vehicle with the shortest estimated pick-up time to be the assigned vehicle.

At step 415, ridesharing management server 150 may send a first message to a user device associated with the first user, which is, in this example, user device 120A. The first message may be configured to cause an indication of the calculated first estimated pick-up time to appear on a display of user device 120A. The message may appear in different formats, for example, a text message including the estimated pick-up time, an audio message, or an image, the specific implementation of which are not limited by the disclosed embodiments herein.

In one embodiment, the message includes a confirmation that the ridesharing request is accepted. If ridesharing management server 150 assigns a pick-up location different from the starting point, the message may further cause the display of an indication of the assigned pick-up location. Ridesharing management server 150 may further provide a navigation option which may be displayed on a user interface. A selection of the navigation option may then provide walking directions the user to the assigned pick-up location for pick-up. The message may further cause a display of an indication of an estimated walking distance from the starting point to the assigned pick-up location. In addition, the message may include an estimated walking distance from the assigned drop-off location to the desired destination. The assigned drop-off location may be a location close to the desired destination, within the maximum walking distance parameters set by the first user. For example, the drop-off location may be at a location half a block away or further from the desired destination and may be along a main street where the vehicle may easily locate and access. For another example, the drop-off location may be determined based on a route towards the next pick-up location, such that the vehicle may easily drop off the first user on its way to the next pick-up location, thereby avoiding an extra detour.

In another embodiment, the message may include one or more proposals associated with different vehicles. Each proposal may include information about the proposed pick-up location. The information about the proposed pick-up location may include the distance from the user to the proposed pick-up location. Each proposal may include a price of the ride associated with the type of the ride, and an estimation of a pick-up time. The estimate may be presented as a range. In one example, each proposal may include different pick-up locations, different prices, and/or different estimations of a pick-up time. According to this embodiment, step 415 may also include receiving a proposal selection reflective of a selected pick-up vehicle and sending an addition message that includes information about the selected vehicle, and the driver associated with the vehicle. For example, the vehicle information may include the license plate number, brand, color, and/or model of the vehicle. The driver information may include a name, nickname, profile photo, ratings, number of previous rides, and/or contact information of the driver. The message may further include a contact option allowing the user to contact the driver, for example, a "contact the driver" button, which the user may select to initiate a communication session with the driver.

At step 417, ridesharing management server 150 may guide the assigned vehicle to the first pick-up location for picking up the first user. For example, ridesharing management server 150 may transmit direction information to the driver device associated with the assigned vehicle, for example, driver device 120D or driving-control device 120F. In some embodiments, a navigation component of the driver device, or the driving-control device may perform the step of guiding the vehicle to the first pick-up location. Correspondingly, ridesharing management server 150, or a navigation component of the user device 120A, may guide the user to the first pick-up location, in cases where the pick-up location is an assigned pick-location different from the first starting point. For example, for autonomous vehicles used for ridesharing services, such as autonomous vehicle 130F as shown in FIG. 1, the vehicle itself may be capable of using a variety of techniques to detect its surroundings, identify feasible paths, and navigate without direct human input.

In some embodiments, once the vehicle is assigned to pick up the user, ridesharing management server 150 may assign a communication channel for the driver associated with the assigned vehicle to communicate with the user, for example, a masked phone number. In some embodiments, a user interface of a driver device, such as driver device 120D, may include an option to send notification messages to the user, for example, a pre-defined message button of "I'm here." Once the vehicle arrives at the pick-up location, the driver may click the message button to send the message to the user. This way, the driver may not need to dial out or type a message in order to notify the user of the vehicle's arrival, reducing driver distraction and associated safety hazards.

At step 419, ridesharing management server 150 may receive a second ride request from a second user. In some embodiments, the second user request may be a street hailing request received directly by the vehicle while the first user is still inside, namely, before dropping off the first user. The vehicle may then undertake the second ride request, if the first user permits subsequent pick-ups. In some embodiments, the driver of the vehicle may input the second ride request information through a driver device, for example, driver device 120D associated with driver 130D. The input may inform ridesharing management server 150 that the vehicle has undertaken a second ride request or may further include the pick-up location and destination information of the second user. Ridesharing management server 150 may then accordingly determine whether to assign additional pick-ups to the same vehicle and may further send direction information guiding the vehicle to the second user's destination.

In some embodiments, the second ride request may be received by ridesharing management server 150 from a second wireless mobile communications device, for example, user device 120B associated with user 130B as shown in FIG. 1. The second ride request may further include a second starting point, and a second desired destination. Ridesharing management server 150 may then assign a corresponding ride service to an available vehicle, which may be the vehicle that has picked up the first user, before dropping off the first user. In processing the second ride request, the example process 420 as shown in FIG. 4B may be performed.

At step 422, ridesharing management server 150 may calculate a second estimated pick-up time, for example, based on a second current location of the vehicle and the second starting point. The second estimated pick-up time may refer to an estimated time period before the vehicle arrives at a second pick-up location for picking up the second user. The second pick-up location may be an assigned pick-up location different from, but associated with, the second starting point. Assignment of the second pick-up location may include similar steps as described above with reference to FIG. 4A, details of which are not repeated herein.

At step 424, ridesharing management server 150 may send a second message to the second wireless mobile communication device, which is user device 120B in this example. The second message may be configured to cause an indication of the calculated second estimated pick-up time to appear on a display of the second wireless mobile communication device. As described above with reference to FIG. 4A, the message may appear in different formats, and may further cause a display of multiple proposals with multiple options for the second pick-up location, walking distance, walking directions from the second starting point to the second pick-up location, etc., the details of which are not repeated herein.

In some embodiments, ridesharing management server 150 may set the second pick-up location at substantially the same location as the first pick-up location, for example, half a block away, or 100 meters away from the first pick-up location. This way, the vehicle may pick up both users at about the same time at substantially the same location, further improving service efficiency. In some embodiments, ridesharing management server 150 may set the second pick-up location at a substantially the same location as the first drop-off location, wherein the vehicle may drop off the first user, and pick up the second user at about the same time, without extra travelling. Further, in some embodiments, the second drop-off location may be set at substantially the same location as the first drop off location, such that the vehicle may drop off multiple users at the same time.

In some embodiments, ridesharing management server 150 may set the first pick-up location to substantially differ from the first starting point, and the second pick-up location to substantially differ from the second starting point, for example, to ensure both pick-up locations are along the same side of the same street where the vehicle may go through. Ridesharing management server 150 may then send respective directions to the first user device and the second user device, to guide the users to the respective pick-up locations.

In some embodiments, ridesharing management server 150 may set the first pick-up location at substantially the same as the first starting point and set the second pick-up location to substantially differ from the second starting point. For example, the selection of the pick-up locations may be made such that the first pick-up location and the second pick-up location are close to one another, both pick-up locations are along the same street, or the second pick-up location is close to the first drop-off location. Ridesharing management server 150 may then send respective directions to the first user device and the second user device, to guide the users to the respective pick-up locations.

At step 426, ridesharing management server 150 may guide the vehicle to a second pick-up location for picking up the second user. As described above with reference to FIG. 4A, this step may also be performed by a navigation component of the driver's device (e.g., driver device 120D or driving-control device 120F associated with autonomous vehicle 130F).

In some embodiments, ridesharing management server 150 may change the first drop-off location after receiving the second ride request, and the change may be made without pre-approval of the first user. The first drop-off location refers to a location for dropping off the first user. As described above with reference to FIG. 4A, the first drop-off location may be the same as the first desired destination, or at a location different from the first desired destination.

For example, the second pick-up location may be set at a location close to the first desired destination, included in the first ride request. When assigning the second ride request to the vehicle, ridesharing management server 150 may change the first drop-off location to a location closer to or at the first desired destination, thus reducing the walking distance for the first user to arrive at his desired destination. For another example, the first drop-off location may be changed to a location where the first user does not need to cross the street to arrive at his desired destination, without causing or increasing detour for the vehicle to arrive at the second pick-up location.

In some embodiments, ridesharing management system 100 may subsequently receive a plurality of subsequent ride requests. These additional ride requests may either be received by ridesharing management server 150 and assigned to the vehicles or received by the vehicles in the form of street hailing. Steps described above with reference to FIGS. 4A and 4B may similarly be used to process the third ride request.

For example, ridesharing management server 150 may receive a third ride request from a third user device, for example, user device 120C associated with user 130C, as shown in FIG. 1. Ridesharing management server 150 may process the request and assign the request to the vehicle while at least one of a first user and a second user is still in the vehicle. The third ride request may further include a third starting point and a third desired destination. Ridesharing management server 150 may calculate a third estimated pick-up time and send a confirmation to a user's device (e.g., user device 120C). Ridesharing management server 150 may transmit direction and route information to the driver's device associated with the vehicle (e.g., driver device 120D as shown in FIG. 1), to guide the vehicle to pick up and drop off user 130C.

As described above with reference to FIGS. 4A and 4B, processing of subsequent ride requests may take into account the ride service parameters set by the users whose requests have previously been received and assigned. For example, if both the first user and the second user are still in the vehicle, and one of them has set a maximum delay of arrival, ridesharing management server 150 may not assign the third request to the same vehicle if such assignment would cause a delay longer than the set value. For example, if the first user has set a maximum delay of arrival of 10 minutes, ridesharing management server 150 may calculate an estimated time period it takes for the vehicle to pick up (and/or drop off) the third user before dropping off the first user. If the estimated time would cause a total delay of arrival for the first user to exceed 10 minutes, ridesharing management server 150 may therefore assign the third ride request to another vehicle. For another example, if the second user has set a maximum number of one co-rider and the second user will be dropped off earlier than the first user, ridesharing management server 150 may not assign to the same vehicle, as such assignment may cause violation of the parameter (maximum number of one co-rider) set by the second user.

Figure 5:
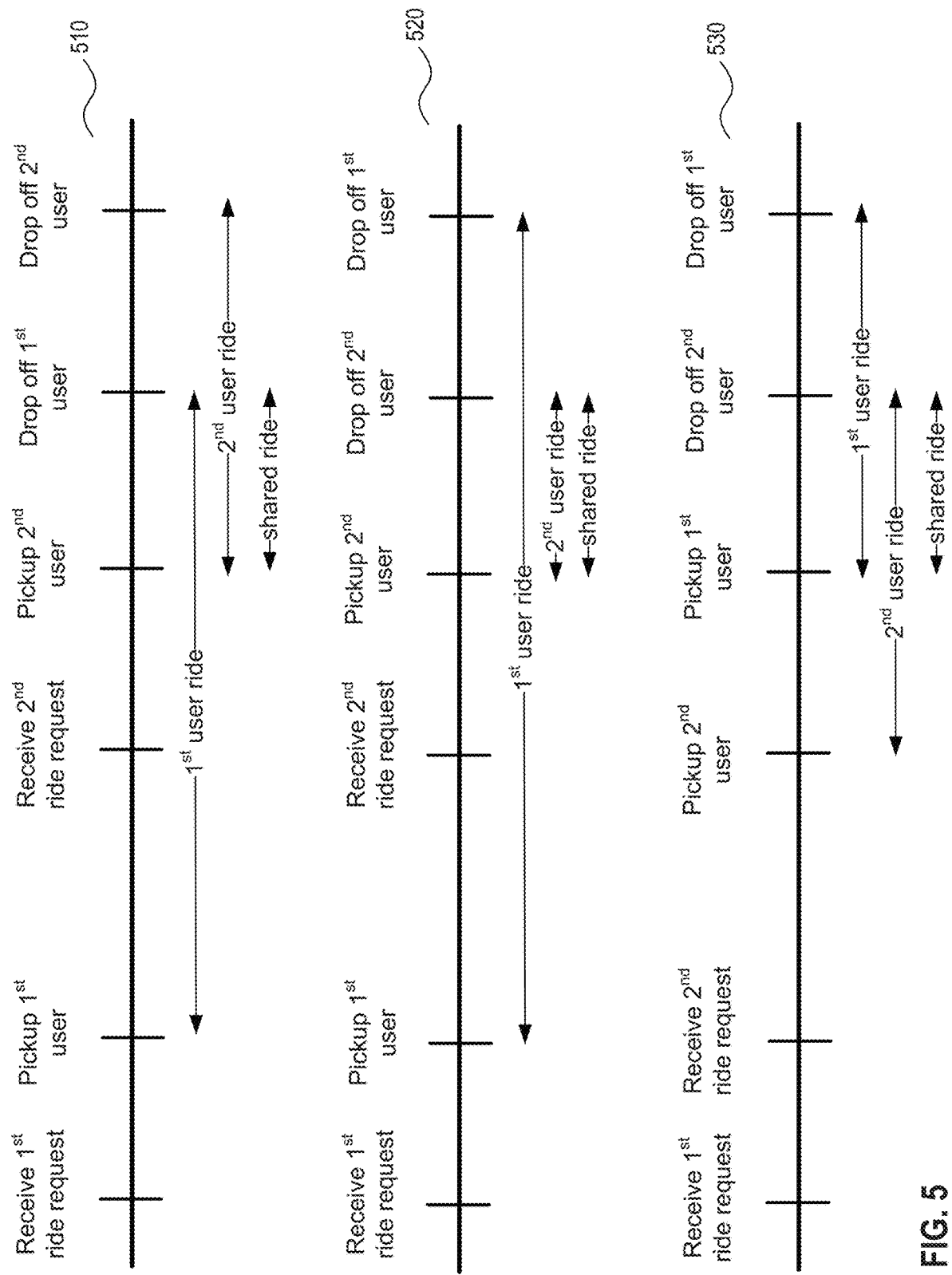
FIG. 5 is a diagram of example timelines showing ridesharing arrangements, in accordance with some embodiments of the present disclosure.

FIG. 5 is a diagram of three example timelines showing ridesharing arrangements, in accordance with some embodiments of the present disclosure. As shown in example timelines 510, 520, and 530, for a particular assigned vehicle undertaking a first ride request from a first user and a second ride request from a second user, the order of pick-ups and drop-offs for the second user may vary. For example, ridesharing management server 150 may receive a plurality of ride requests, design an optimal path and pick-up/drop-off order for a particular assigned vehicle undertaking multiple requests, and assign additional pick-ups as the vehicle completes a part of or all of the ride requests. For example, as shown in example timeline 510, a vehicle may receive a second ride request after picking up the first user and drop off the first user before dropping off the second user. A corresponding shared ride portion may be the portion of ride between the pick-up of the second user and drop-off of the first user. As shown in example timeline 520, the vehicle may receive a second ride request after picking up the first user and drop off the second user before dropping off the first user. A corresponding shared ride portion may be the portion of ride between the pick-up of the second user and drop-off the second user. As another example, as shown in example timeline 530, the vehicle may receive the first ride request and the second ride request before any pick-up. The vehicle may then pick up the second user before picking up the first user and drop off the second user before dropping off the first user. A corresponding shared ride portion may be the portion of ride between pick-up of the first user and drop-off of the second user. Depending on the order of pick-ups and drop-offs, the ridesharing management server may then determine a corresponding shared ride portion, and calculate ride fare for each user based on, for example, the shared portion, solo portion of each user, and/or other factors such as the ride service parameters set by each user.

Counting a Number of Passengers Entering a Ridesharing Vehicle

In some embodiments of the present disclosure, one or more ridesharing vehicles may participate in a ridesharing fleet. The ridesharing fleet may seek to confirm that the number of people entering a ridesharing vehicle matches the number of people that requested the transportation by a vehicle of the ridesharing feet. Conventional fleets may not account for the number of passengers entering a vehicle. For example, a discrepancy may arise when the number of passengers entering the vehicle does not match the number of passengers indicated in a ride request. A ridesharing management system may not be able to accurately anticipate the capacity of the vehicle to accept additional ride requests because of this discrepancy. Accordingly, embodiments of the present disclosure may count the number of passengers entering a ridesharing vehicle. These and other features of presently disclosed embodiments are discussed in more detail below.

Figure 6:
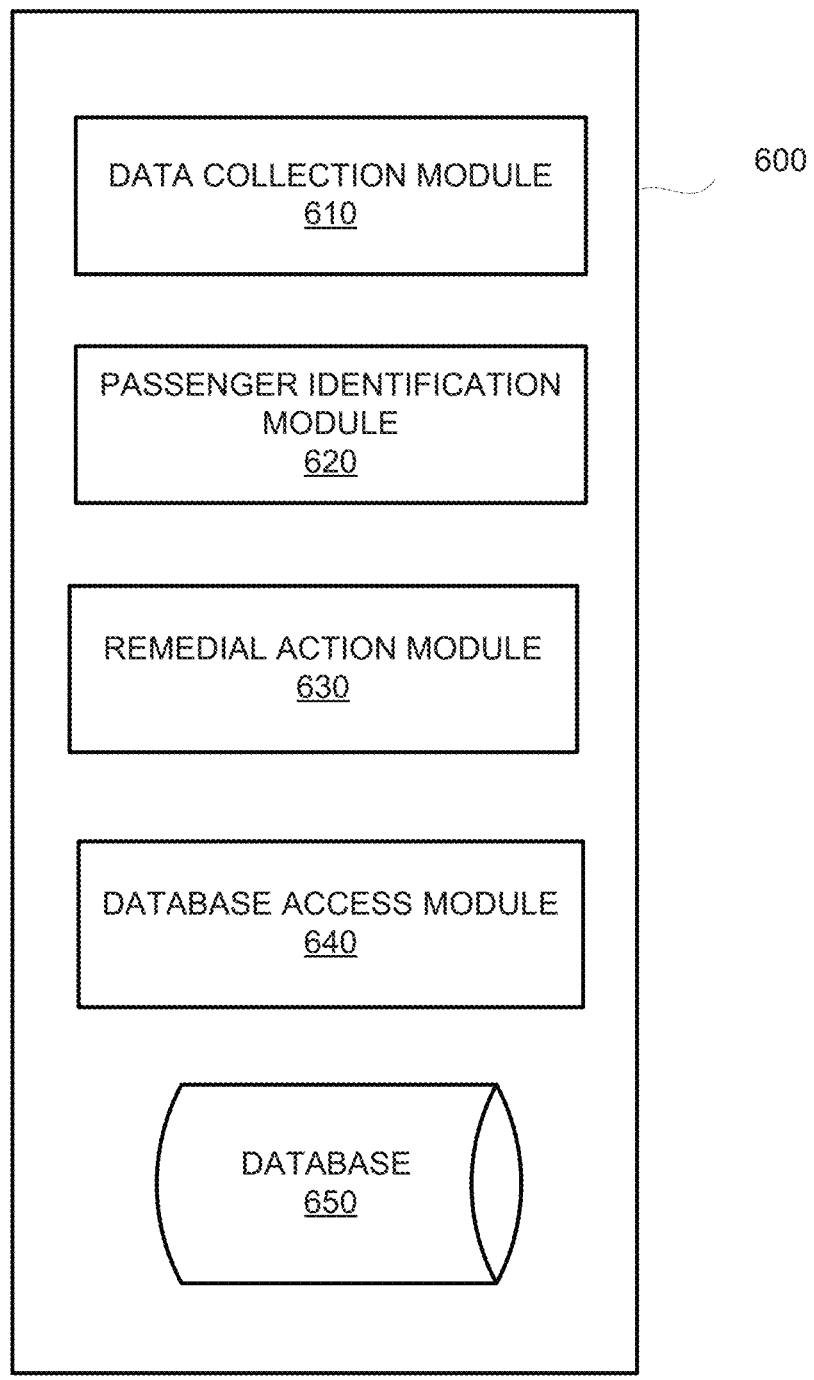
FIG. 6 is an exemplary embodiment of a memory containing software modules consistent with the present disclosure.

FIG. 6 depicts an embodiment of memory 600 for counting a number of passengers entering a ridesharing vehicle consistent with the present disclosure. The ridesharing vehicle (e.g., autonomous vehicle 130F) may include a vehicle body, a communications interface within the vehicle body for wirelessly communicating with a remote server configured to electronically receive shared-ride requests from a plurality of users, at least one sensor associated with the vehicle body and configured to detect entry (and exit) of passengers from the ridesharing vehicle, and at least one processor within the vehicle body, the at least one processor being programmed to execute instructions to perform one or more operations. The ridesharing vehicle may include memory 600 configured to store a plurality of modules and may be executable by at least one processor to perform various methods and processes disclosed herein. Further, it should be noted that memory 600 may store more or fewer modules than those shown in FIG. 6, depending on implementation-specific considerations.

As illustrated in FIG. 6, memory 600 may store software instructions to execute a data collection module 610, a passenger identification module 620, a remedial action module 630, a database access module 640, and may include a database 650. Data collection module 610 may include software instruction for receiving, via a communications interface, information about passengers to be picked up. Data collection module 610 may also include software instruction for receiving, from at least one sensor, a number of passengers actually picked up at a pickup location. Passenger identification module 620 may include software instruction for determining an identification of passengers. The determination may be based on image data wirelessly transmitted from an image sensor to a remote server or data collection module 610. Remedial action module 630 may include software instructions for comparing the actual number of passengers picked up at the pick-up location with a scheduled number of passengers and routing the ridesharing vehicle based on a desired destination of an unscheduled passenger and initiating a remedial action when a difference exists between the scheduled number of passengers and the actual number of passengers as detected by the at least one sensor. Database access module 640 may include software instruction executable to interact with database 650, to store and/or receive information (e.g., geographical maps associated with a geographical area in which a vehicle is operating, current traffic information of a geographical area, passenger identification information, passenger image data, etc.).

Data collection module 610 may include software instructions for receiving, via a communications interface, information about passengers to be picked up. Data collection module 610 may receive the passenger information via communications interface 360. The received information may include a pick-up location and a scheduled number of passengers expected to be picked up at the pick-up location. In one embodiment, the information about the passengers to be picked up may include details of at least two shared-ride requests associated with the scheduled number of passengers expected to be picked up at the pick-up location. In this embodiment, the at least one processor may be further configured identify which of the at least two shared-ride requests is associated with the difference exists between the scheduled number of passengers and the actual number of passengers. For example, the details of at least two shared-ride requests associated with scheduled number of passengers expected to be picked up may include the number of passengers per ride-booking assigned to the pick-up location. Specifically, the number of passengers per ride-booking may be important when a user wants to book a ride for a group of passengers, but the request books one passenger. In this case, the actual number of passengers associated with the corresponding booking is different. Therefore, the ridesharing vehicle may need to check whether the submitted number of passengers associated with a booking in the ride-share request is equal to the actual number of passengers. In one case, there may be two bookings of passengers with the same pick-up point which are to be picked-up by the same ridesharing vehicle. In this case, counting the number of passengers at the pickup point may not be enough; that is, the ridesharing vehicle may need to count the actual number of passengers associated with each ride-booking and if there is an inconsistency at the booking level. The at least one processor may identify which of the at least two shared-ride requests is associated with the difference based on image processing, voice processing, feedback from the user's communication device or any other means. In addition, the pick-up location may be received as a geographical coordinate information, street address, or a region prescribed by a geofence. The scheduled number of passengers may be indicated as an integer. Each integer may represent a unit of vehicle capacity required in a ridesharing vehicle necessary to comply with the received information.

Additionally, or alternatively, data collection module 610 may receive, via the communications interface, an indication of a scheduled passenger's luggage capable of impacting capacity of the ridesharing vehicle. Data collection module 610 may receive information pertaining to a number of units of luggage and/or an estimated size/weight of each unit of luggage. In some embodiments, the units of luggage may include one or more suitcases, bicycles, musical instruments, car seats, etc. Data collection module 610 may use information pertaining to the number of units of luggage and/or estimated size/weight to estimate and impact on the capacity on the ridesharing vehicle. For example, data collection module 610 may determine that received information includes an indication of two large suitcases with a one passenger may reduce the ridesharing vehicle's capacity by three. Thus, data collection module 610 may determine that a ridesharing vehicle with a capacity for three is necessary to fulfill the ride request of the passenger. Processor 310 may identify a first ridesharing vehicle in the ridesharing fleet with this capacity and assign the passenger to the first ridesharing vehicle.

Further, data collection module 610 may receive, via the communication interface, information about a drop-off location and a number of passengers scheduled to departure at the drop-off location. A plurality of drop-off locations may be indicated for each of a plurality of passengers included in the number of passengers. Alternatively, a single drop-off location may be indicated for the number of passengers as a single unit.

In some embodiments, the information received by data collection module 610 may be part of a ride requests from one or more users requesting services from ridesharing management server. A ride request may be transmitted to ridesharing management server 150 and may include information such as a pick-up location, a drop-off location, and identity of the user, a rating of the user, a current user location, a number of passengers to be picked-up, etc. Information associated with a ride request may be received, for example, from a mobile communication device (e.g. a smartphone, tablet, wearable device, etc.) associated (e.g. located in the passenger cabin) with a user. For example, user 130A may transmit a ride request from user device 120A over network 140. Network 140 may be configured to transmit data to communications interface 340 for processing by processor 310.

Figure 7:
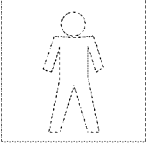
FIG. 7 is a schematic illustration of a mobile communications device for transmitting information about passengers to be picked, according to an embodiment consistent with the present disclosure.

For example, FIG. 7 illustrates a schematic illustration of a mobile communications device for transmitting information about passengers to be picked, according to an embodiment consistent with the present disclosure. Ride request 700 may include information inputted by a user and may be transmitted to processor 310 via a communication interface. Information included in ride request 700 may be received by data collection module 610. Ride request 700 may include location information 710 pertaining to a pick-up location information and desired destination information, a number of passengers expected to be picked-up 720, and a number of pieces of luggage 730. The number of passengers expected to be pick-up 720 and the number of pieces of luggage 730 may be summed to arrive at the total capacity required 750 in a ridesharing vehicle. In some embodiments, the total capacity required 740 may be calculated by mobile communications device or entered by a user. In some embodiments, ride request 700 may also be configured to enable a user to transmit image data 750. Image data 750 may include one or more images associated with passenger identification information.

Returning to FIG. 6, data collection module 610 may also include software instructions for receiving, from at least one sensor, a number of passengers actually picked up at a pickup location. The at least one sensor may include at least one of an infrared sensor, a volumetric sensor, a weight sensor, a proximity sensor, and an image sensor. In some embodiments, the at least one sensor may include a combination of one or more sensors. For example, the at least one sensor may include a combination of an image sensor and a weight sensor or a combination of an image sensor, volumetric sensor, and an infrared sensor. The at least one sensor may be configured to detect the number of passengers actually picked up at the pickup location and transmit data to data collection module 610 indicating the number of passengers based on the detection. In some embodiments, data collection module 610 may also, after arriving at the pick-up location, receive from the at least one sensor an indication of passenger's luggage actually picked up at the pick-up location.

Data collection module 610 may also include software instruction for receiving, via the communications interface, information about a drop-off location and a number of passengers scheduled to departure at the drop-off location. Information about a drop-off location and a number of passengers scheduled to departure may be received by data collection module 610 based on user input via ride request 700. Data collection module 610 may also after arriving at the drop-off location, receive from the at least one sensor a number of passengers actually departed at the drop-off location. Information about a number of passengers actually departed at the drop-off location may be received by data collection module 610 based on one or more signals detected by the at least one sensor.

Passenger identification module 620 may facilitate determination of identities of passengers using the at least one sensor, wherein the at least one sensor includes an image sensor, and wherein facilitating determination includes comparing image data from the image sensor with image-related data wirelessly received. The image-related data may be wirelessly received from data collection module 610, from or one or more devices associated with an operator of the ridesharing vehicle, or from a database associate with ridesharing management server 150. For example, passenger identification module 620 may compare the wirelessly received image-related to data included in a database of passengers registered with the ridesharing service with image data of one or more passengers picked up at the pick-up location. In other embodiments, the image-related data may include the passenger's facial signature and image of the passenger's profile associated with one or more social media accounts, or an image of the passenger stored in a database with a passenger profile. The passenger profile may be generated during passenger registration with the ridesharing service.

In some embodiments, passenger identification module 620 may cause the at least one sensor to capture an image of the one or more passengers and derive image data of the one or more passengers from the captured image. The at least one sensor may include an image sensor, and passenger identification module 620 may include software instructions for causing data from the image sensor to be wirelessly transmitted to a remote server for passenger identity confirmation at the remote server. Identification confirmation at a remote serve may enable personal data identifying a passenger to be secure.

Passenger identification module 620 may also include software instructions for receiving, via the communications interface, identifying information from a mobile communications device of a passenger and to thereby confirm an identity of the passenger based on data obtained from the mobile communications device. The ridesharing vehicle may be equipped with a short-range transmitter configured to request the identifying information from the passenger's mobile device or other communications device, such as a tablet, smart watch, etc. In some embodiments, passenger identification module 620 may be configured to automatically retrieve the identifying information from the mobile communications device of a passenger. In other embodiment, a user may provide an indication to the mobile communication device authorizing identifying information to be obtained by passenger identification module 620.

Remedial action module 630 may include software instructions for comparing the actual number of passengers picked up at the pick-up location with a scheduled number of passengers. Based on information received from passenger identification module 620 indicating a number of passengers actually picked up at the pick-up location and information received from data collection module 610 indicating a number of passengers expected to be picked up at the pick-up location, remedial action module 630 may determine a difference between the two numbers. The difference may represent the comparison, or discrepancy, between the actual quantity and the expected quantity.

Alternatively, or additionally, remedial action module 630 may include software instructions for comparing the actual passenger's luggage picked up at the pick-up location with the scheduled passenger's luggage associated with the pick-up location the comparison. For example, remedial action module 630 may determine that one or more pieces of luggage that was not expected based on information received by data collection module 610 was actually picked up at the pick-up location. Accordingly, remedial action module 630 may determine that a ridesharing vehicle capacity was different from expected. In some embodiments, remedial action module 630 may compare the actual number of passengers departed at the drop-off location with the scheduled number of passengers associated with the drop-off location. For example, remedial action module 630 may determine that passengers expected to depart at a drop-off location did not actually depart from the ridesharing vehicle as expected. Thus, the actual number of passengers departing from a drop off location may be different from an expected, or scheduled number of passengers associated with the drop off location. Remedial action module 630 may determine, based on results of the comparison, that an actual ridesharing vehicle capacity deviates from an expected ridesharing vehicle capacity, based on information received by data collection module 610 and from the at least one sensor.

Remedial action module 630 may include software instructions for initiating a remedial action when a difference exists between the scheduled number of passengers and the actual number of passengers as detected by the at least one sensor. The remedial action may provide notification to an operator or one or more passengers of the ridesharing vehicle that a difference exists between the scheduled, or expected, number of passengers and the actual number of passengers detected by the at least one sensor. The remedial action may include providing at least one of audio or visual feedback within the ridesharing vehicle. In some embodiment, the remedial action may include haptic feedback.

Remedial action module 630 may include software instructions for wirelessly transmitting an indication of the difference to the remote server. The indication of the difference may include one or more signals representing data associated with the difference. The indication of the difference may include an indication of whether a difference is detected by the at least one sensor, a magnitude of the difference, whether the actual number of passengers exceeds or is less than the scheduled number of passengers, and/or a current ridesharing vehicle capacity. The remote server may analyze the indication to determine a remedial action to be taken.

In some embodiments, transmitting the indication may enable the remote server to take into account the current number of passengers in the vehicle when making future assignments of passengers to the ridesharing vehicle. Alternatively, or additionally, remedial action module 630 may initiate a remedial action for identifying an unscheduled passenger and determining a desired destination of the unscheduled passenger. For example, remedial action module 630 may transmit data to a user device associated with an identified passenger requesting information related to an unscheduled passenger. The transmitted data may include a request that the unscheduled passenger to communication with ridesharing management server 150, that a scheduled passenger enter information related to the unscheduled passenger. In other embodiments the data may be transmitted to a device associated with an operator of the ridesharing vehicle. Based on the transmitted data requesting information related to the unscheduled passenger, ridesharing management server 150 may receive information regarding a desired destination of the unscheduled passenger and/or identifying information.

Remedial action module 630 may also include software instructions for initiating a remedial action, and the remedial action may include a first action if the scheduled number of passengers is less than the actual number of passengers as detected by the at least one sensor, and the remedial action includes a second action if the scheduled number of passengers is greater than the actual number of passengers as detected by the at least one sensor, the first action being different from the second action. That is, based on whether results of the comparison of the scheduled number of passengers is greater than or less than the actual number of passengers detected by the at least one sensor, remedial action module 630 may determine which of a plurality of remedial action should be initiated. For example, based on a determination that a current ridesharing vehicle capacity is at a predetermined ridesharing vehicle capacity due to an unscheduled passenger being picked-up at a pick-up location, remedial action module 630 may initiate a remedial action for assigning a scheduled passenger previously assigned to a first ridesharing vehicle to a second ridesharing vehicle. In other embodiments, remedial action module 630 may initiate a remedial action for assigning an additional passenger to a first ridesharing vehicle based on a determination that a scheduled passenger was not picked-up at a pick-up location, or erroneous information regarding a scheduled passenger's luggage impacting the ridesharing vehicle's capacity.

Still in other embodiments, remedial action module 630 may initiate a remedial action when a difference exists between the scheduled passenger's luggage received via the wireless connection and the actual passenger's luggage as detected by the at least one sensor. For example, in some embodiments, a passenger may indicate in a ride request a request to reserve capacity for a suitcase. After arriving at the pick-up location, data collection module 610 may determine that the passenger requires ridesharing vehicle capacity for four suitcases. Remedial action module 630 may thereafter reassign the scheduled passenger to a different ridesharing vehicle and cause a cost estimate of the ride request to be adjusted. Alternatively, or additionally, remedial action module 630 may initiate a remedial action when a difference exists between the number of passengers scheduled to departure at the drop-off location and the actual number of passengers departed at the drop-off location. For example, data collection module 610 may determine that one or more passenger did not depart from the vehicle as a desired destination indicated in a ride request. Remedial action module 630 may provide a notice and/or reminder to the passenger, send a text message, cause an adjustment to a price of the ride, thus charging the passenger for the additional time/distance commuted. Remedial action module 630 may thus enable the remote server to take into account the current number of passengers in the vehicle when making future assignments of passengers to the ridesharing vehicle based on an estimated and actual ridesharing vehicle capacity.

As illustrated in FIG. 6, database 650 may be configured to store any type of information associated with modules 610-640, depending on implementation specific considerations. For example, in embodiments in which battery-charge module 620 and/or charging station module 630 is configured to access one or more prior-stored maps of geographical areas for determining a route, database 650 may store the geographical maps. In other embodiments where charging station module 630 is configured to access one or more listings of charging stations, database 650 may store locations, hours of operation, and/or charging capacity for each charging station. Still, in other embodiments, database 650 may include information related to a charging capacity of each of the plurality of charging stations to accept additional vehicles, and for ride requests with pick-up location in a vicinity of the specific electrically powered vehicle-for-hire in need of the charge, at least one processor may be configured to assign the specific electrically-powered vehicle-for-hire to pick up a user based on a proximity of a drop-off location to a charging station and a capacity of that charging station to accept the specific electrically-powered vehicle for-hire. Location module 610, battery-charge module 620, and charging station module 630 may access database for communication by way of data access module 640.

Modules 610-640 may be implemented in software, hardware, firmware, or any combination of software, hardware or firmware. For example, if the modules are implemented in software, they may be stored in memory 250. However, in some embodiments, any one or more of modules 610-640 and data associated with database 650 may, for example, be stored in processor 204 and/or executed on a device associated with ridesharing management system 100. Modules 610-640 may be configured to interact with each other and/or other modules of memory 250 to perform functions consistent with disclosed embodiments.

Figure 8:
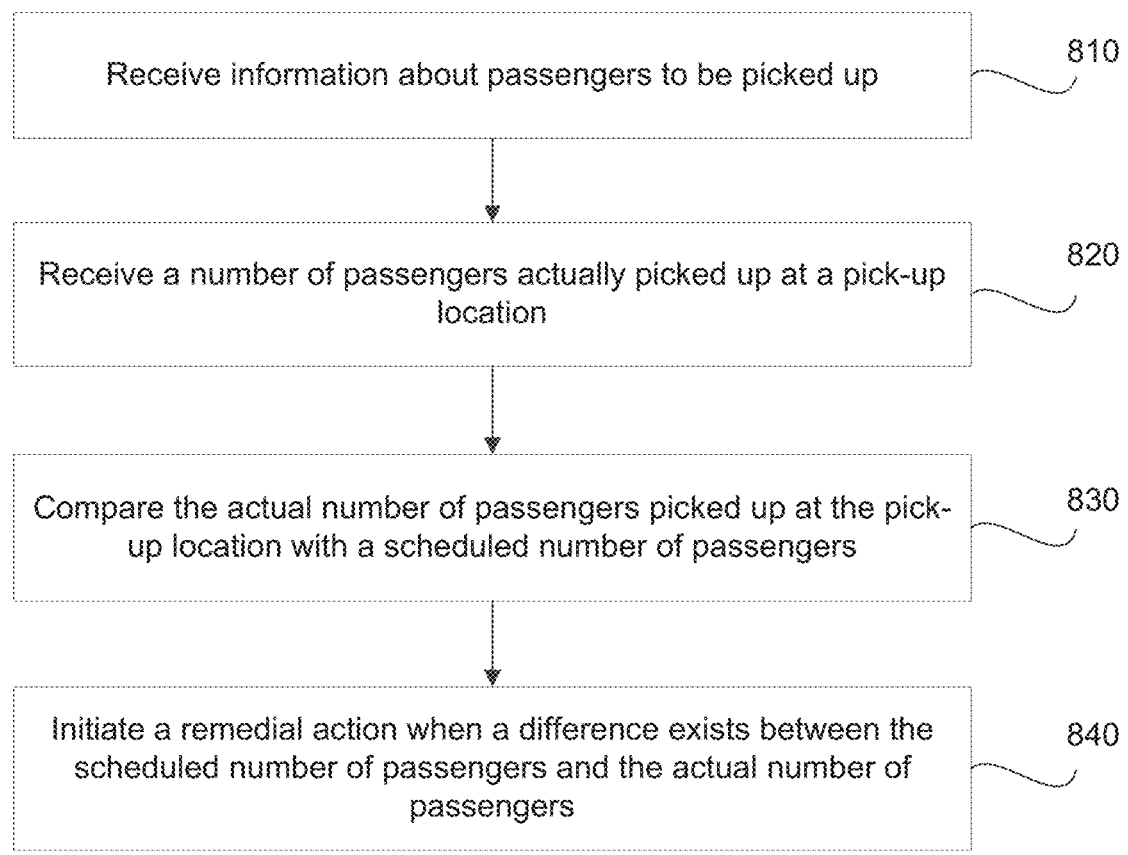
FIG. 8 is a flowchart of an exemplary process for counting a number of passengers entering a ridesharing vehicle.

FIG. 8 illustrates a flowchart showing exemplary process 800 for counting a number of passengers entering a ridesharing vehicle, consistent with disclosed embodiments. In one embodiment, the steps of process 800 may be performed by a vehicle management server, such as ridesharing management server 150 described above with reference to FIGS. 1 and 3. Alternatively, at least some of the steps of process 800 may be performed by a mobile communications device, such as the mobile communications devices 120 described above with reference to FIGS. 1 and 2. In the following description, reference is made to certain components of FIGS. 1-3 for purposes of illustration. It will be appreciated, however, that other implementations are possible and that other components may be used to implement example methods disclosed herein.

At step 810, data collection module 610 may receive information about passengers to be picked up. The information may be received via a communication interface within a vehicle body for wirelessly communicating with a remote server configured to electronically receive shared-ride requests from a plurality of users. The received information may include one or more of a pick-up location, a scheduled number of passengers expected to be picked up at the pick-up location, an indication of scheduled passenger's luggage capable of impacting capacity of the ridesharing vehicle, and/or information about a drop-off location and a number of passengers scheduled to departure at the drop-off location. In some embodiments, data collection module 610 may determine a pick-up location and a drop-off location, the determined pick-up location being at a location other than but in proximity to the starting point and the determined drop-off location being at a location other than but in proximity to the desired destination. In some embodiments, the information may receive from one or more of a device associated with a passenger, a device associated with the ridesharing vehicle, and/or a remote server.

At step 820, data collection module 610 may receive a number of passengers actually picked up at a pick-up location. The number of passengers actually picked up at the pick-up location may be received from at least one sensor. The at least one sensor may include at least one of an infrared sensor, a volumetric sensor, a weight sensor, a proximity sensor, and an image sensor. The number of passengers actually picked up may be received after a ridesharing vehicle arrived as the pick-up location. After arriving at the pick-up location, process 800 may also include receiving from the at least one sensor an indication of passenger's luggage actually picked up at the pick-up location and receiving from the at least one sensor a number of passengers actually departed at the drop-off location.

At step 830, remedial action module 630 may compare the actual number of passengers picked up at the pick-up location with a scheduled number of passengers. As explained above, the comparison may include an analysis of data received by data collection module 610 and associated with a ride request and data received after arriving at a pick-up location.

At step 840, remedial action module 630 may initiate a remedial action when a difference exists between the scheduled number of passengers and the actual number of passengers. The remedial action may include providing at least one of audio or visual feedback within the vehicle. The remedial action may include wirelessly transmitting an indication of the difference to the remote server. In some embodiment, as explained above, the remedial action may include identifying an unscheduled passenger and determining a desired destination of the unscheduled passenger. The remedial action may include a first action if the scheduled number of passengers is less than the actual number of passengers as detected by the at least one sensor, and the remedial action may include a second action if the scheduled number of passengers is greater than the actual number of passengers as detected by the at least one sensor, the first action being different from the second action.

Process 800 may include additional steps. For example, process 800 may include facilitating determination of identities of passengers, receiving an indication of scheduled passenger's luggage capable of impacting capacity of the ridesharing vehicle, receiving, via the communications interface, information about a drop-off location and a number of passengers scheduled to departure at the drop-off location. In some embodiments, facilitating determination may include one or more of comparing image data from the image sensor with image-related data wirelessly received, causing data from the image sensor to be wirelessly transmitted to a remote server for passenger identity confirmation at the remote server, and/or receive, via the communications interface, identifying information from a mobile communications device of a passenger and to thereby confirm an identity of the passenger based on data obtained from the mobile communications device.

Distributing Vehicles in Need of Charge to Charging Stations Based on Predicted Future Demand In some embodiments of the present disclosure, one or more electrically-powered vehicles may participate in a fleet of vehicles for hire. The ridesharing fleet systems configured to manage the fleet of vehicles may seek reliable ways to manage the charging of the electrically-powered vehicles and a demand for ridesharing vehicles in a geographical area. Conventional ridesharing management systems may rely on discretion of one or more operators of the one or more electrically powered vehicles to manage a charging schedule for each electrically-powered vehicle independently. However, when relying on individual discretion, conventional ridesharing management systems may be unable to distribute vehicles in need of charge to charging stations based on predicted future demand. Accordingly, embodiments of the present disclosure may distribute vehicles in need of charge to charging stations based on a predicted future demand. These and other features of presently disclosed embodiments are discussed in more detail below.

Figure 9:
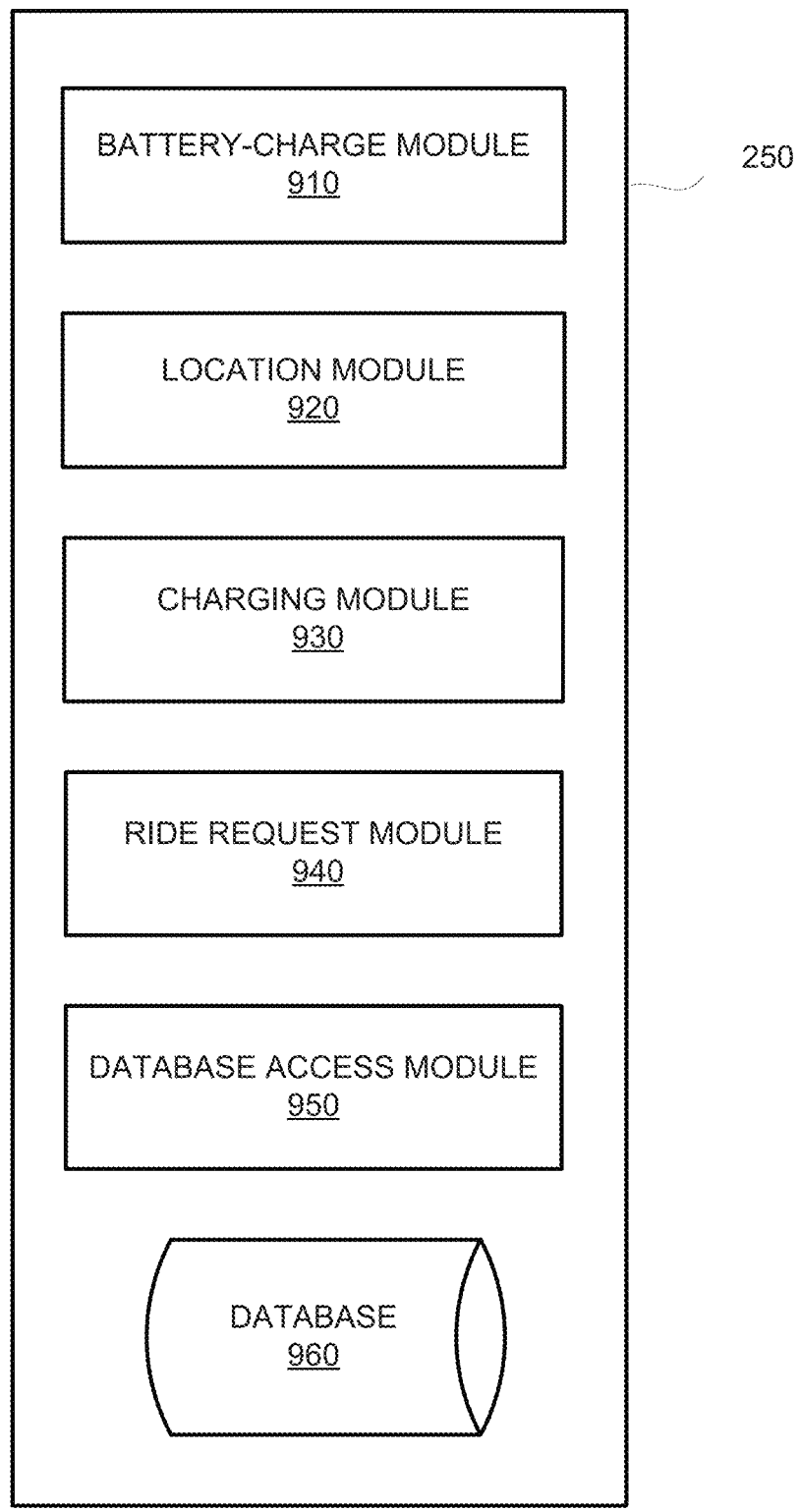
FIG. 9 is an exemplary embodiment of a memory containing software modules consistent with the present disclosure.

FIG. 9 depicts an embodiment of memory module 250 for distributing vehicles in need of charge to charging stations based on a predicted future demand consistent with the present disclosure. Memory 250 may store a plurality of modules and may be executable by at least one processor to perform various methods and processes disclosed herein. Further, it should be noted that memory 250 may store more or fewer modules than those shown in FIG. 9, depending on implementation-specific considerations.

As illustrated in FIG. 9, memory 250 may store software instructions to execute a battery-charge module 910, a location module 920, a charging module 930, a ride request module 940, a database access module 950, and may include a database 960. Battery-charge module 910 may include software instruction for receiving locations of ridesharing vehicles from one or more sources. Location module 920 may include software instruction for receiving battery-charge levels of ridesharing vehicles from one or more sources. Charging module 930 may include software instruction to determine a predicted demand for ridesharing requests and/or an estimated charging completion time. Ride request module 940 may include software instruction to direct a specific vehicle to a selected charging station. Database access module 950 may include software instruction executable to interact with database 960, to store and/or receive information (e.g., geographical maps associated with a geographical area in which a vehicle is operating, current traffic information of a geographical area, historical data for past demand in a geographical area, etc.).

Battery-charge module 910 may include software instructions for receiving current battery-charge data for a plurality of electrical vehicles. The current battery-charge data may be reflective of a duration and/or distance that each electric vehicle may operate before recharging. The duration and/or distance that each electric vehicle may operate before recharging may be based on an estimated duration and/or distance until depletion of a battery charging the vehicle and/or based on a remaining charge level of the battery. The current battery-charge data may be captured by a power sensor in the vehicle configured to determine the current charge level of the battery. The power sensor may transmit the data to a remote server over a wireless channel or to vehicle routing module to select a charging station, based on the current battery charge level. The power sensor may be configured to continuously monitor and transmit data related to the current battery charge level. The power sensor may also monitor the current battery charge level and transmit data when the charge level is less than a predetermined threshold level.

In some embodiments, the current battery-charge data may be indicative of a driving duration and/or distance in which each electrically-powered ridesharing vehicle can operate before charging. For example, battery-charge module 910 may determine the driving duration and/or distance based on the current charge level of the battery and one or more known characteristics of the vehicle. In such an example, battery-charge module 910 may convert the charge level (e.g., measured in volts or amperes) to a duration and/or distance using a conversion factor associated with the year, make, and module of the vehicle and/or using a conversion factor determined from historical data associated with the vehicle. Alternatively, the vehicle may perform the conversion and send the driving duration and/or distance to battery-charge module 620.

Additionally or alternatively, battery-charge module 910 may estimate the driving duration using real-time traffic data along a current route of the vehicle. Additionally or alternatively, battery-charge module 910 may estimate the driving duration and/or distance using terrain data, such as elevation changes, along a current route of the vehicle. Accordingly, the driving duration may be dynamically re-determined whenever the current route is changed. Additionally or alternatively, battery-charge module 910 may estimate the driving duration and/or distance using driver-performances data indicative of driver acceleration and deceleration rates. For example, the driving duration and/or distance may be increased for a driver that accelerates and decelerates within a first range and may be decreased for a driver that accelerates and decelerates within a second, higher range.

Battery-charge module 910 may also include software instructions for identifying, from the current battery-charge data, a specific electric vehicle traveling in the geographic area and in need of a charge. The specific electric vehicle may be identified based on one or more characteristics of the current battery-charge data. For example, battery-charge module 910 may analyze current battery-charge-data and determine that when the current battery-charge data is less that a predetermined threshold, the vehicle is in need of charge. In some embodiments, battery-charge module 910 may analyze current battery-charge-data and determine, when the driving duration and/or distance is less that a predetermined threshold, that the vehicle in is need of charge.

Location module 920 may include software instructions for receiving current vehicle location data for a specific electric vehicle. In some embodiments, the current vehicle location data may include global positioning system (GPS) data generated by at least one GPS component associated with the specific electric vehicle. Additionally or alternatively, location module 920 may receive other location information, such as cell tower triangulation data, Wi-Fi or other signal strength data, or any other combination of location information.

Charging module 930 may include software instruction for determining battery charging stations within a geographic area. The geographic area may include a current location of at least one of the vehicles. Charging module 930 may also determine a number of charging points in each charging station. The locations and charging points may be stored in database 950 and accessed by charging module 930.

Ride request module 940 may include software instructions for determining, using historical data, predicted demand for ridesharing requests in at least one area proximate to at least one of the plurality of charging stations. In some embodiments, the predicted demand for ridesharing requests may be based on historical data associated with a past demand for ridesharing requests in the at least one area proximate to the at least one of the plurality of charging stations. The predicted demand may be associated with a number of ride requests received by ridesharing management server within a predetermined period of time. In other embodiments, the predicted demand may be associated with a time of day, day of the week, month of the year, expected weather and/or an event being hosted in the at least one area proximate to at least one of the plurality of charging stations.

Ride request module 940 may also include software instructions for based on an estimated charging completion time and the predicted demand, selecting a charging station for the specific electric vehicle. The selected charging station may be a charging station other than a charging station closest to a current location of the specific electric vehicle. In some embodiments, ride request module 940 may manage a schedule for charging at the selected charging station based on the predicted demand. For example, in some embodiments, ride request module 940 may manage the schedule such that during a period of high predicted demand, one or more vehicles are charged to 40% of charging capacity. In other embodiments, ride request module 940 may manage the schedule such that during a period of low predicted demand, one or more vehicles are charged to 100% of the charging capacity. Additionally or alternatively, ride request module 940 may manage the schedule such that arrival/departure of vehicles to and from a selected charging station are staggered so that a first vehicle arrives for charging as a second vehicle completes charging.

In some embodiments, ride request module 940 may reassign at least one user scheduled to be picked up by the specific electric vehicle to a different ridesharing vehicle when the estimated charging completion time is after the desired time to shorten the estimated charging completion time. For example, ride request module 940 may determine that avoiding picking up a scheduled user may increase a likelihood that the specific electric vehicle is able to complete charging and thus enable the specific electric vehicle to be available by the desired time. For example, ride request module 940 may determine that the assignment of a user to the specific electric vehicle delay the estimated charging completion time to noon. Ride request module 940 may compare the estimated charging completion time with a desired time prior to noon and reassign the user to another ridesharing vehicle. The reassignment may enable a specific electric vehicle to complete charging prior at the desired time.

In some embodiments, ride request module 940 may change at least one drop-off location of at least one passenger currently riding the specific electric vehicle when the estimated charging completion time is after the desired time to shorten the estimated charging completion time. For example, ride request module 940 may determine that a schedule drop-off location may decrease a likelihood that the specific electric vehicle is able to complete charging by the desired time. Accordingly, ride request module may change, or ask the passenger to change, the drop-off location. The changed drop-off location may enable the specific electric vehicle to be available by the desired time.

In some embodiments, an estimated charging completion time may be determined based on one or more of an expected battery usage when traveling to the selected charging station, information about charging capacities of the specific electric vehicle, and/or a desired charging level prior to returning the specific vehicle to service. For example, in some embodiments, charging module 930 may access a memory that stores information about charging capacities of each of the plurality of electric vehicles, and determine the estimated charging completion time for the specific electric vehicle based on an expected battery usage when traveling to the selected charging station, the information about charging capacities of the specific electric vehicle, and a desired charging level prior to returning the specific vehicle to service.

In some embodiments, an estimated charging completion time may be determined based on an expected battery usage when traveling to the selected charging station. The expected battery usage may be based on a current location of the specific electric vehicle, a location of the selected charging station, and one or more characteristics of a driving route from the current location of the specific electric vehicle to the location of the selected charging station. In some embodiments, ride request module 940 may transmit information to battery-charge module 910 for estimated battery usage when traveling to the selected charging station. In some embodiments, battery-charge module 910 may analyze the characteristics of the driving route to estimate the expected battery usage. For example, characteristics of the driving route may include information received based on map data including information about a terrain of the geographic area. Ride request module 940 may select a charging station that may be accessed along a route with fewer elevation changes than one or more non-selected charging stations. Battery-charge module 910 may thereafter analyze characteristics of the terrain of the geographical data to estimate an expected battery usage. In other embodiments, characteristics of the driving route may include information received based on traffic data or speed limit data. The traffic data and speed limit data may be based on historical data associated with the driving route, a time of day, and/or a computed estimated time of arrival.

In some embodiments, an estimated charging completion time may be determined based on information about charging capacities of the specific electric vehicle based on obtained current occupancy data for the selected charging station, wherein the obtained current occupancy data includes a current capacity utilization for each charging point in the selected charging station and current battery-charge data for each electric vehicle located at the selected charging station. Based on a number of charging points in each charging station and the current capacity utilization for each charging point, charging module 930 may determine whether a number of open charging points at each station, if any. For example, charging module 930 may determine that the selected charging station includes four charging point. Charging module 930 may further determine that all charging point are currently occupied and/or an estimate of whether any charging points will become available within a predetermined period of time.

Additionally, or alternatively, charging module 930 may determine an estimated time at which occupied charging points will become available. For example, charging module 930 may determine the estimated charging completion time based on the current charge level of an electrically-powered ridesharing vehicle located at a charging station and one or more known characteristics of the charging point used by the vehicle and/or the vehicle. In such an example, charging module 930 may convert a remaining charge requirement (e.g., measured in volts or amperes) to an estimated time using a conversion factor associated with the year, make, and model of the vehicle and/or using a conversion factor determined from historical data associated with the vehicle. Additionally or alternatively, charging module 930 may convert a remaining charge requirement (e.g., measured in volts or amperes) to an estimated charging completion time using a conversion factor associated with a model of the charging point and/or using a conversion factor determined from historical data associated with the charging point. In any of the above embodiments, the charging station may perform the conversion and send the estimated time to charging module 930.

In some embodiments, an estimated charging completion time may be determined based on a desired charging level prior to returning the specific vehicle to service. In some embodiments, the desired charging level may be based on the predicted demand and an availability of other vehicles in the fleet of ridesharing vehicles. For example, ride request module 940 may determine that in a geographical region with a predicted demand exceeding an estimated capability of other available vehicle in the fleet of ridesharing vehicles, the desired charging level prior to retuning to service may be 30%. In other embodiments, ride request module may determine, based on a low predicted demand and ample availability of other vehicles in the fleet of ridesharing vehicle, that a desired charging level prior to returning to service may be 100%. In other embodiment, ride request module 940 may determine a desired time for the specific vehicle to return to service based on the predicted demand and a location of the selected charging station, compare the desired time to the estimated charging completion time. For example, ride request module may determine that an estimated charging completion time will elapse subsequent to the desired time for the specific vehicle to return to service. Ride request module 940 may determine based on a driving duration and/or distance that charging can be delayed for the specific electric vehicle.

Ride request module 940 may further include software instructions for directing the specific electric vehicle to the selected charging station. For example, in response to selecting the charging station, ride request module 930 may determine a route for the specific electric vehicle that terminates at the selected charging station.

In some embodiments, the specific electric vehicle may direct the specific electric vehicle from a drop-off location of a last passenger to the selected charging station. In some embodiments, the specific electric vehicle may be manually-driven and may include a handheld device associated with the driver of the vehicle and configured to receive routing instructions from ridesharing management server 150. The specific electric vehicle may also include an autonomous vehicle and may include a vehicle controller configured to receive routing instructions from ridesharing management server 150. In such embodiment, directing the specific electric vehicle from the drop-off location may include transmitting to the specific electric vehicle a specific driving route to the selected charging station. Transmitting to the specific electric vehicle may include transmitting to a vehicle controller configured to receive routing instructions and/or a device associated with an operator of the specific electric vehicle.

In any of the embodiments discussed above, ride request module 940 may identify at least two driving routes from the drop-off location of the last passenger to the selected charging station and to select a driving route that includes less elevation changes. In some embodiments, the selected driving route may include a greater travel distance but with less elevation changes compared to an alternative driving route. The driving route may be selected based on a determination that the selected driving route is likely to conserve more energy than a shorter driving distance with more elevation changes. In other embodiments, the driving route may be selected to minimize travel time.

Based on this information and information received from battery-charge module 910, location module 920, and charging station module 930, ride request module 940 may select a charging station for a specific electrically-powered ridesharing vehicle. In some embodiments, the selected charging station may be other than a charging station closest to a current location of the specific electrically-powered ridesharing. Accordingly, charging station module 630 may apply an optimization algorithm such that the driving duration and/or distance received or determined by battery-charge module 620 functions as a hard constraint but that the other variables are optimized within the constraint. For example, the algorithm may optimize the estimated time to plug-in based on distances between a current location of the specific vehicle and the charging stations as well as the current occupancy of those stations.

As illustrated in FIG. 9, database 960 may be configured to store any type of information associated with modules 910-950, depending on implementation specific considerations. For example, in embodiments in which battery-charge module 920 and/or charging station module 930 is configured to access one or more prior-stored maps of geographical areas for determining a route, database 950 may store the geographical maps. In other embodiments where charging station module 930 is configured to access one or more listings of charging stations, database 950 may store locations, hours of operation, and/or charging capacity for each charging station. Still, in other embodiments, database 950 may include information related to a charging capacity of each of the plurality of charging stations to accept additional vehicles, and historical demand in a vicinity of the specific electrical vehicle for rides. At least one processor may be configured to make an intermediate stop at the specific charging station while at least one passenger remains in the specific electric vehicle, and to direct the at least one passenger to transfer to another ridesharing. Additionally, the least one processor may inform a driver of the another ridesharing vehicle about the at least one passenger before the specific electric vehicle arrives to the charging station. Location module 910, battery-charge module 920, charging module 930, and ride request module 940 may access database 960 for communication by way of data access module 950.

Modules 910-950 may be implemented in software, hardware, firmware, or any combination of software, hardware or firmware. For example, if the modules are implemented in software, they may be stored in memory 250. However, in some embodiments, any one or more of modules 910-950 and data associated with database 960 may, for example, be stored in processor 204 and/or executed on a device associated with ridesharing management system 100. Modules 910-950 may be configured to interact with each other and/or other modules of memory 250 to perform functions consistent with disclosed embodiments.

Figure 10:
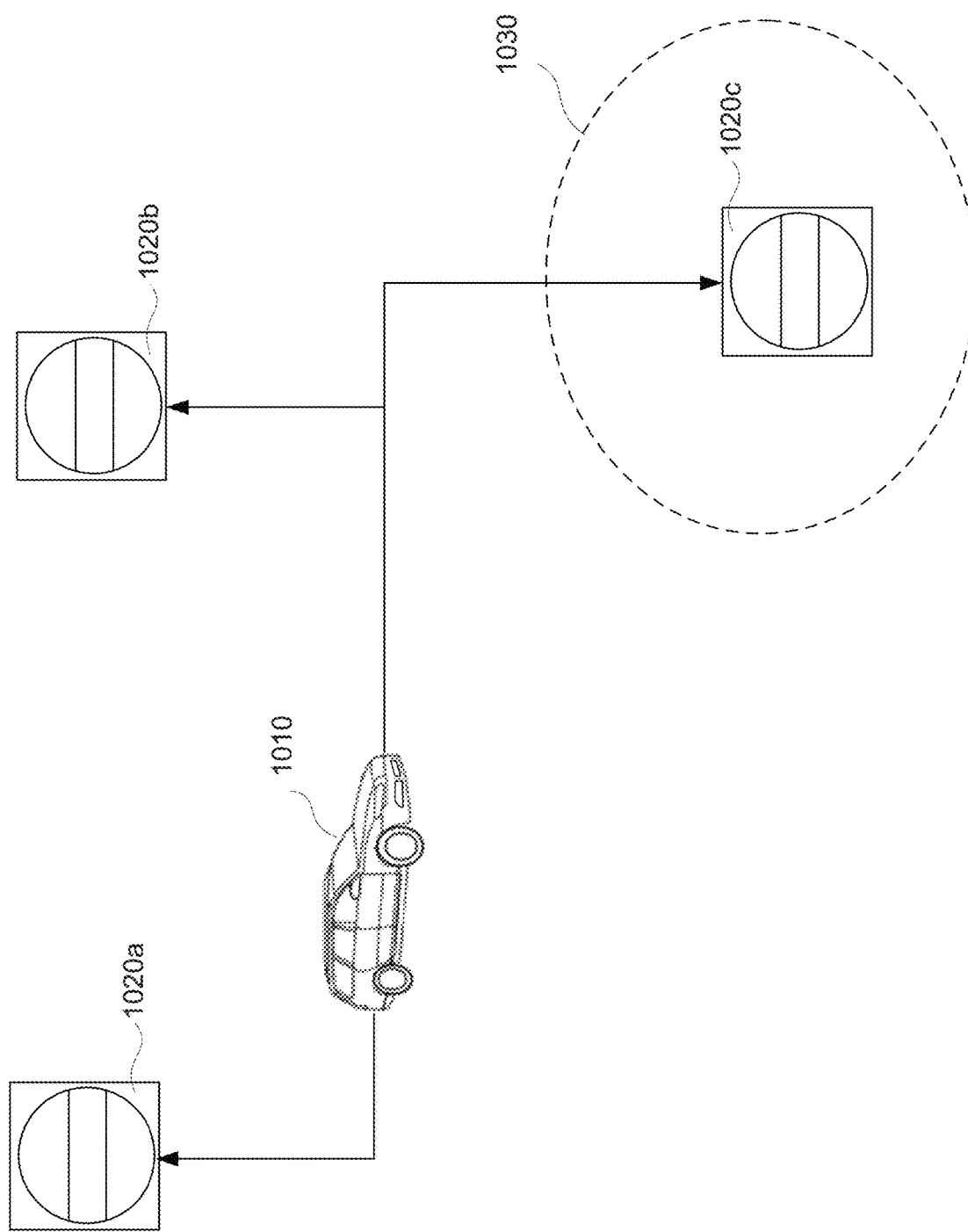
FIG. 10 is a schematic illustration of selection between a plurality of charging stations in response to an estimated charging completion time and predicted demand, according to an embodiment consistent with the present disclosure

FIG. 10 illustrates an example of selection between a plurality of charging stations in response to an estimated charging completion time and predicted demand. As depicted in FIG. 10, a specific electric vehicle 1010 may be located in a geographic area associated with a plurality of charging stations. In the example of FIG. 10, three charging stations (1020a, 1020b, and 1020c) are located in a geographic area. Ride management server 150 may determine a predicted demand for area 1030, representing at least one area proximate to at least one of the plurality of charging station. The predicted demand may also include a desired time that electric vehicle 1010 is needed in area 1030. Ride management server 150 may also determine that an estimate charging completing time for each of charging stations 1020a and 1020b if selected, is after the desired time. Accordingly, based on the driving duration and/or distance of electric vehicle 1010, charging capacities at the plurality of charging stations and a predicted demand at area 1030, ride management server 150 may direct electric vehicle 1010 to charging station 1020c, instead of charging station 1020a which may be closes to a current location of electric vehicle 1010. As explained above, additional variables may be considered in making the selection, such as historical data associated with demand for ridesharing vehicles in the geographic area, an elevation, an availability of other vehicle in the fleet of ridesharing vehicles, or the like.

Figure 11:
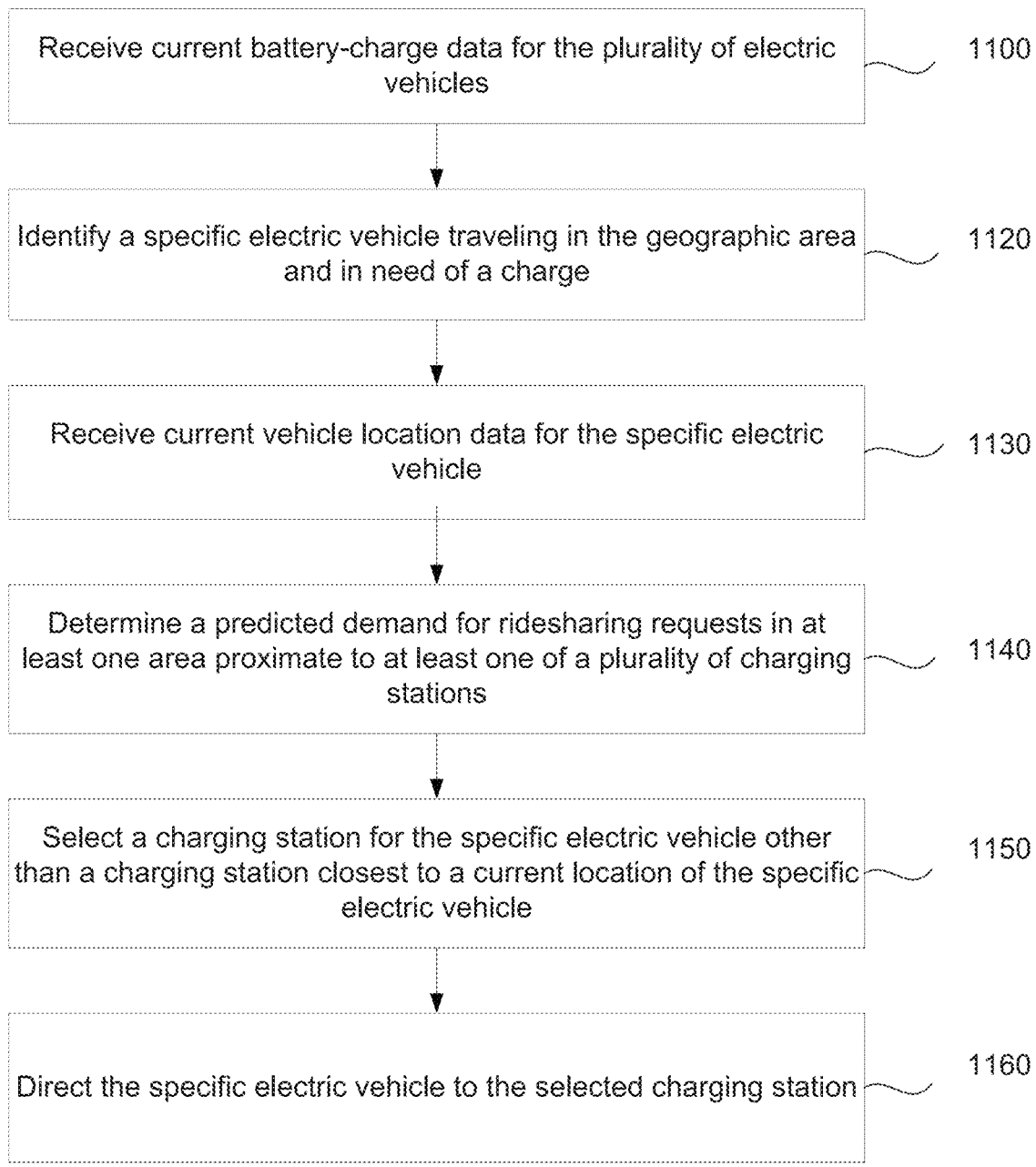
FIG. 11 is a flowchart of an exemplary process for distributing vehicles in need of charge to charging stations based on predicted future demand.

FIG. 11 illustrates a flowchart showing exemplary process 1100 for directing an electric vehicle to a charging station, consistent with disclosed embodiments. In one embodiment, the steps of process 1100 may be performed by a vehicle management server, such as ridesharing management server 150 described above with reference to FIGS. 1 and 3. Alternatively, at least some of the steps of process 1100 may be performed by a mobile communications device, such as the mobile communications devices 120 described above with reference to FIGS. 1 and 2. In the following description, reference is made to certain components of FIGS. 1-3 for purposes of illustration. It will be appreciated, however, that other implementations are possible and that other components may be used to implement example methods disclosed herein.

At step 1110, battery-charge module 910 may receive current battery-charge data for a plurality of electric vehicles. As explained above, the current battery-charge data may be indicative of a driving duration and/or distance that each electric vehicle can operate before recharging. In some embodiments, battery-charge module 910 may estimate the driving duration and/or distance. For example, battery-charge module 910 may receive real-time traffic data and estimate a driving duration and/or distance in which a specific electric vehicle can operate before charging based on the current battery-charge data and the real-time traffic data. Additionally or alternatively, battery-charge module 910 may access map data including information about a terrain of the geographic area and determine a driving duration and/or distance that each electric vehicle can operate before charging before recharging based on the current battery-charge data and elevation changes expected along a scheduled route of the specific electrically-powered ridesharing vehicle.

At step 1120, location module 920 may identify a specific electric vehicle traveling in the geographic area and in need of a charge. The specific electric vehicle may be identified based on the battery-charge data. The battery-charge data may be reflective of a current battery charge level for a vehicle within the geographical area. The geographical area may be prescribed by a geofence boundary, a zip code, of a predetermined distance from a central point.

At step 1130, location module 920 may receive current vehicle location data for the specific electric vehicle. As explained above, the current vehicle location data may include global positioning system (GPS) data generated by at least one GPS component associated with the specific electric vehicle.

At step 1140, ride request module 940 may determine predicted demand for ridesharing requests in at least one area proximate at least one of the plurality of charging stations. The predicted demand may be based on using historical data. The historical data may be associated with past demand for ridesharing vehicles in the geographic area and used to determine predicted passenger-demand.

At step 1150, ride request module 940 may select a charging station for the specific electric vehicle, wherein the selected charging station is other than a charging station closest to a current location of the specific electric vehicle. The charging station may be selected based on an estimated charging completion time and/or the predicted demand and/or availability of other vehicles in the fleet. The predicted demand may be determined at step 1140. In some embodiments, ride request module 940 may access a memory that stores information about charging capacities of each of the plurality of electric vehicles. In some embodiments, ride request module 940 may determine the estimated charging completion time for the specific electric vehicle based on an expected battery usage when traveling to the selected charging station, the information about charging capacities of the specific electric vehicle, and a desired charging level prior to returning the specific vehicle to service. The expected battery usage may be based on the current location of the specific electric vehicle, a location of the selected charging station, and characteristics of a driving route from the current location of the specific electric vehicle to the location of the selected charging station. The desired charging level prior to return of the specific vehicle to service may be based on the predicted demand and an availability of other vehicles in the fleet of ridesharing vehicles. The expected charging completion time at the selected charging station further may be based on obtained current occupancy data for the selected charging station. The obtained current occupancy data may include a current capacity utilization for each charging point in the selected charging station and current battery-charge data for each electric vehicle located at the selected charging station At step 1160, ride request module 940 may direct the specific electric vehicle to the selected charging station. Ride request module 940 may also to manage a schedule for charging at the selected charging station based on the predicted demand. In some embodiments, ride request module 940 may direct the specific electric vehicle from a drop-off location of a last passenger to the selected charging station. Directing the specific electric vehicle from the drop-off location includes transmitting to the specific electric vehicle a specific driving route to the selected charging station. Ride request module 940 select a driving route that includes less elevation changes than an alternative driving route.

Process 1100 may include additional steps. For example, process 1100 may include one or more of determining a desired time for the specific vehicle to return to service based on the predicted demand and a location of the selected charging station, and determining a desired time for the specific vehicle to return to service based on the predicted demand and a location of the selected charging station, and to compare the desired time to the estimated charging completion time. In some embodiments, process 1100 may include reassigning at least one user scheduled to be picked up by the specific electric vehicle to a different ridesharing vehicle when the estimated charging completion time is after the desired time to shorten the estimated charging completion time. Process 1100 may also include one or more of making an intermediate stop at the specific charging station while at least one passenger remains in the specific electric vehicle, and to direct the at least one passenger to transfer to another ridesharing vehicle at the charging station, and informing a driver of the another ridesharing vehicle about the at least one passenger before the specific electric vehicle arrives to the charging station.

Managing a Fleet of Petrol and Non-Petrol Ridesharing Vehicles

Embodiments of the present disclosure may allow for a vehicle management system to manage a fleet of vehicles for hire. The fleet of vehicles may comprise one or more electrically-powered vehicles and one or more petrol-powered vehicles. An electrically-powered vehicle may be a vehicle driven by one or more electric motors using the energy stored in one or more batteries mounted thereon. Exemplary electrically-powered vehicles include all-electric vehicles, plug-in hybrid electric vehicles, and hybrid vehicles. A petrol-powered vehicle may be a vehicle including an internal combustion engine powered by fuel such as gasoline, diesel, or natural gas.

The vehicle management system may receive a plurality of requests for a ride from a plurality of users and assign a specific user to a specific vehicle selected from the fleet of vehicles based on the information relating to the ride request, current battery-charge data, and/or vehicle location. For example, the vehicle management system may determine that the specific vehicle is in need of charging based on the current battery-charge data thereof. The vehicle management system may also determine a drop-off location for the user according to the information relating to the ride request (e.g., a desired destination), and the drop-off location may be close to the desired destination and a charging station. The vehicle management system may further assign the user to the specific vehicle and direct the specific vehicle to pick up the user at a pick-up location and drive to the drop-off location. The specific vehicle may drive to the charging station to charge the battery after driving the user to the drop-off location.

In some embodiments, the vehicle management system may receive a plurality of requests for ride from a plurality of users, and assign a first request to a first electrically-powered vehicle and a second request to a second petrol-powered vehicle based on the desired destinations of the first and second requests, current battery-charge data of the vehicles, and current vehicle of the vehicles. In some embodiments, the vehicle management system may also provide routes to the first electrically-powered vehicle and the second petrol-powered vehicle according to the current battery-charge data.

Figure 12:
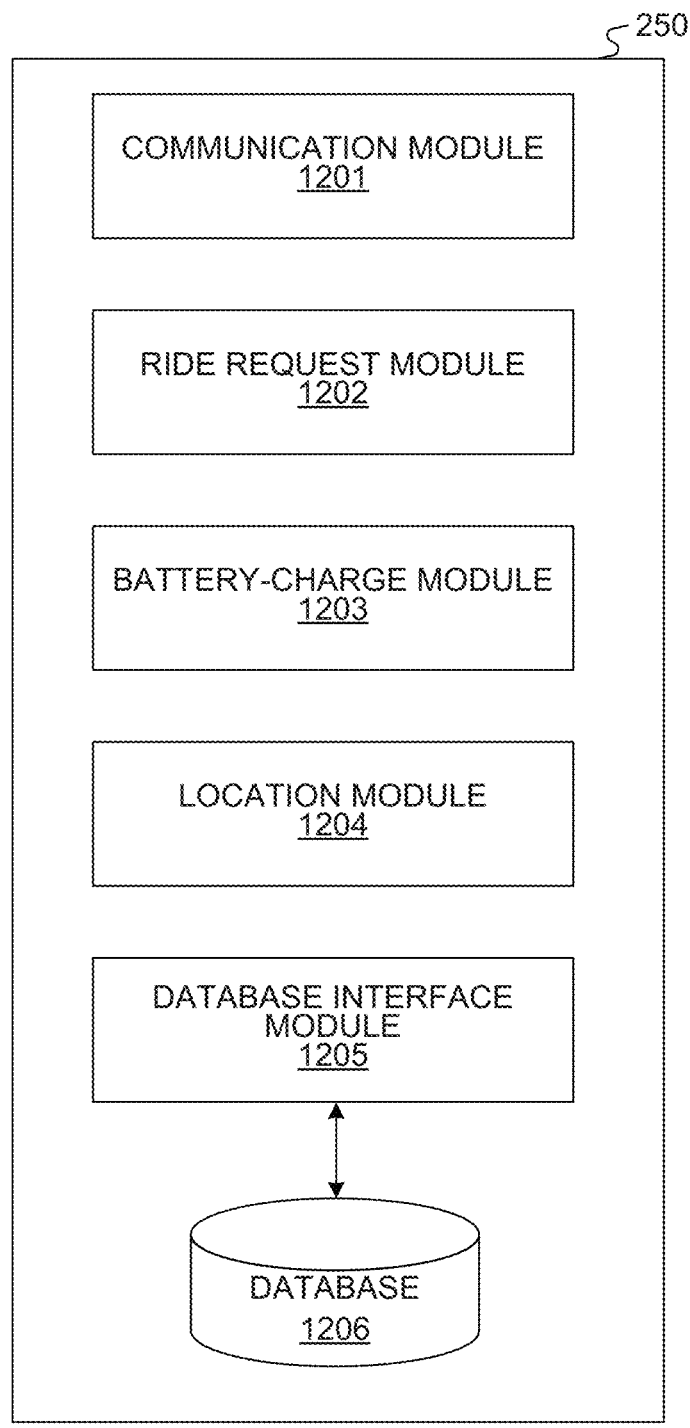
FIG. 12 is an exemplary embodiment of a memory containing software modules, in accordance with some embodiments of the present disclosure.

FIG. 12 depicts an embodiment of memory module 250 for managing a fleet of ridesharing vehicles including electrically-powered ridesharing vehicles consistent with the present disclosure. Memory 250 may store a plurality of modules and may be executable by at least one processor to perform various methods and processes disclosed herein. Further, it should be noted that memory 250 may store more or fewer modules than those shown in FIG. 12, depending on implementation-specific considerations.

As illustrated in FIG. 12, memory 250 may store software instructions to execute a communication module 1201, a ride request module 1202, a battery-charge module 1203, a location module 1204, a database access module 1205, and may include a database 1206. Communication module 1201 may include software instruction for communicating with other components of ridesharing management system 100 (e.g., one or more user devices 120A-120C, driver devices 120D and 120E, driving-control device 120F). Ride request module 1202 may include software instruction for receiving ride requests from a plurality of users. Battery-charge module 1203 may include software instruction for receiving battery-charge levels of ridesharing vehicles from one or more sources. Location module 1204 may include software instruction for receiving locations of ridesharing vehicles from one or more sources. Database access module 1205 may include software instruction executable to interact with database 1206, to store and/or receive information (e.g., geographical maps associated with a geographical area in which a vehicle is operating, current traffic information of a geographical area, historical data for efficient routes, battery-charge data of one or more electrically-powered vehicles).

Communication module 1201 may include software instructions for facilitating communications between the device on which it is implemented (e.g., ridesharing management server 150) and another component of ridesharing management system 100 (e.g., mobile communications devices 120A-120F, one or more vehicles, database 170). For example, ridesharing management server 150 may receive a plurality of requests for a ride from a plurality of users (via, e.g., mobile communications devices associated with the users) via communication module 1201. As another example, ridesharing management server 150 may electronically assign a specific user to a specific vehicle via communication module 1201.

Ride request module 1202 may include software instructions for receiving a plurality of requests for a ride from a plurality of users. Each ride request may include a starting point and a desired destination within the geographic area. In some embodiments, ride request module 1202 may determine a pick-up location and a drop-off location, the determined pick-up location being at a location other than but in proximity to the starting point and the determined drop-off location being at a location other than but in proximity to the desired destination. Additionally or alternatively, ride request module 1202 may determine the drop-off location for a user based on a location of the charging station and the desired destination of the ride request. For example, in one embodiment, a ride request may include information that the desired destination is a building at the corner of an intersection of two cross streets. Ride request module 1202 may determine that dropping the user off at the intersection would result in the vehicle entering a one-way street, impeding a more efficient route to a charging station. Thus, ride request module 1202 may instead, for example, drop the user off at a location proximal to the desired destination, and avoid entering the one-way street. Ride request module 1202 may also electronically assign ride requests to one or more vehicles.

Battery-charge module 1203 may include software instructions for receiving current battery-charge data for an electrically-powered ridesharing vehicle. The data may be related to the remaining charge of the battery powering the vehicle and/or an estimated time until depletion of the battery as captured by a power sensor in the vehicle for determining the current charge level of the battery. The power sensor may transmit the data to a remote server over a wireless channel or to vehicle routing module to select a charging station, based on the current battery charge level. The power sensor may be configured to continuously monitor and transmit data related to the current battery charge level. The power sensor may also monitor the current battery charge level and transmit data when the charge level is less than a predetermined threshold level.

In some embodiments, the current battery-charge data may be indicative of a driving duration and/or distance in which each electrically-powered ridesharing vehicle can operate before charging. Similar to battery-charge module 1203, battery-charge module 1203 may determine the driving duration and/or distance based on the current charge level of the battery and one or more known characteristics of the vehicle. Alternatively, the vehicle may perform the conversion and send the driving duration and/or distance to battery-charge module 1203. In some embodiments, the driving duration and/or distance in which the electrically-powered ridesharing vehicle can operate before recharging may correspond to at least one of a driving time and a driving distance.

Additionally or alternatively, battery-charge module 1203 (or the vehicle) may estimate the driving duration using real-time traffic data along a current route of the vehicle, using terrain data, such as elevation changes, along a current route of the vehicle, using driver-performances data indicative of driver acceleration and deceleration rates, or the like.

Location module 1204 may include software instructions for receiving current vehicle location data for an electrically-powered ridesharing vehicle. In some embodiments, the current vehicle location data may include global positioning system (GPS) data generated by at least one GPS component associated with the electrically-powered ridesharing vehicle. Additionally or alternatively, location module 1204 may receive other location information, such as cell tower triangulation data, Wi-Fi or other signal strength data, or any other combination of location information. In one example, location module 1204 may receive the location data, for example, from a mobile communication device (e.g., a smartphone, tablet, wearable device, etc.) associated (e.g., located in the passenger cabin) with the electrically-powered ridesharing vehicle.

Database access module 1205 may include software instructions for interacting with database 1206, to store and/or receive information. Database 1206 may be configured to store any type of information associated with modules 1201-1205, depending on implementation-specific considerations.

Modules 1201-1205 may be implemented in software, hardware, firmware, or any combination of software, hardware or firmware. For example, if the modules are implemented in software, they may be stored in memory 250. However, in some embodiments, any one or more of modules 1201-1205 and data associated with database 1206 may, for example, be stored in processor 204 and/or executed on a device associated with ridesharing management system 100. Modules 1201-1205 may be configured to interact with each other and/or other modules of memory 250 to perform functions consistent with disclosed embodiments.

Figure 13:
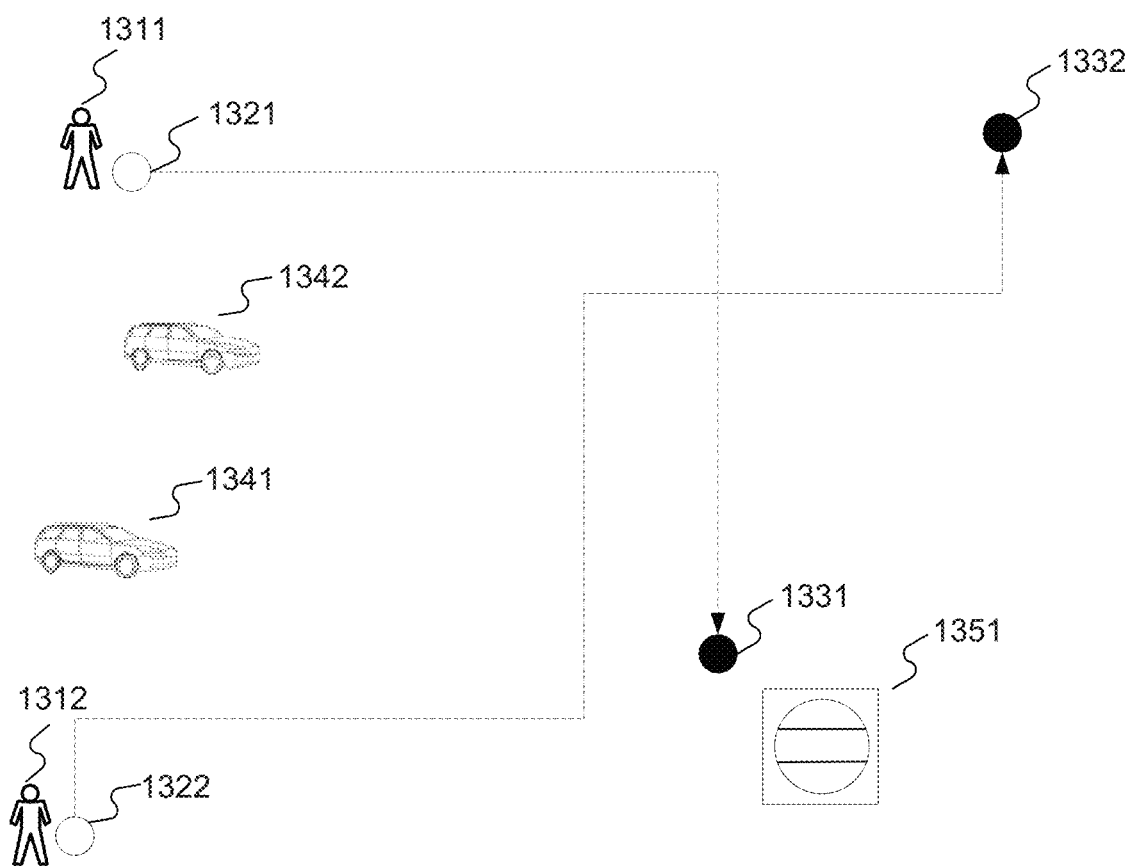
FIG. 13 is a schematic illustration of exemplary process for assigning a first user to a first vehicle and a second user to a second vehicle based on the ride requests, battery-charge data, and vehicle location data.

FIG. 13 is a schematic illustration of an exemplary process for assigning a first user to a first vehicle and a second user to a second vehicle based on the ride requests, battery-charge data, and vehicle location data. As illustrated in FIG. 13, a first user 1311 transmits a first request for a ride to ridesharing management server 150 via a first user device 120 (not shown). The first request includes a first pick-up location 1321 and a first desired destination 1331. A second user 1312 transmits a second request for a ride to ridesharing management server 150 via a second user device 120 (not shown). The second request includes a second pick-up location 1322 and a second desired destination 1332. There are two vehicles, a first vehicle 1341 and a second vehicle 1342, that may be available to be assigned to a ride request. First vehicle 1341 may be an electrically-powered vehicle, and second vehicle 1342 may be a petrol-powered vehicle. Intuitively, a conventional system may assign first user 1311 to second vehicle 1342 and second user 1312 to first vehicle 1341 because second vehicle 1342 is closer to the pick-up location of first user 1311 than first vehicle 1341 and first vehicle 1341 is closer to the pick-up location of second user 1312 than second vehicle 1342. However, the assignment of first vehicle 1341 to second user 1312 may create problems for first vehicle 1341 (an electrically-powered vehicle) if first vehicle 1341 is in need for charging because there are no any charging locations close to desired destination 1332 of second user 1312. The battery of first vehicle 1341 may become depleted after first vehicle 1341 drives to desired destination 1332 and before finding a charging station to charge the battery. As explained below in connection with FIG. 14, additional variables may be considered in assigning the ride requests to the vehicles, such as current battery-charge data, desired destinations of the requests (or the drop-off locations), locations of the vehicles, or the like, or a combination thereof.

FIG. 14 is a flowchart showing an exemplary process 1400 for managing a fleet of petrol and non-petrol ridesharing vehicles, in accordance with some embodiments of the present disclosure. In one embodiment, the steps of process 1400 may be performed by a vehicle management server, such as ridesharing management server 150 described above with reference to FIGS. 1 and 3. Alternatively, at least some of the steps of process 1400 may be performed by a mobile communications device, such as the mobile communications devices 120 described above with reference to FIGS. 1 and 2. In the following description, reference is made to certain components of FIGS. 1-3 for purposes of illustration. It will be appreciated, however, that other implementations are possible and that other components may be utilized to implement example methods disclosed herein.

At step 1401, ride request module 1202 may receive, via a communications interface, a first request for a ride from a first user. The communications interface may be communications interface 360, communication module 1201, or the like, or a combination thereof. For example, a first user may generate a first request for a ride via a user device 120 associated with the first user (e.g., an application installed in user device 120). User device 120 may transmit the first request to ridesharing management server 150, which may receive the first request via communication module 1201.

A request (e.g., the first request for a ride or a second request for a ride discussed below) may include information related to a pick-up location of a user (e.g., the first pick-up location of the first user or the second pick-up location of the second user discussed below). The pick-up location of the user (or the user device 120 associated with the user) may be determined according to a current location of the user. For example, user device 120 may determine its current location according to GPS signals a GPS component of user device 120 receives. User device 120 may also determine the pick-up location according to the current location. For example, user device 120 may designate the current location as the pick-up. Alternatively, user device 120 may determine a location that is close to the current location and is suitable for the user to wait for a vehicle (e.g., within a walking distance, avoiding busy streets, avoiding non-stopping regions) as the pick-up location. Alternatively, user device 120 may recommend a plurality of candidate pick-up locations for the user to choose. For example, user device 120 may display a user interface showing a map in which a plurality of candidate pick-up locations are shown along with the current location of the user. The user may select one of the candidate pick-up locations as the pick-up location via the user interface. User device 120 may include the information relating to the pick-up location into the request to be transmitted to ridesharing management server 150.

The ride request may also include a desired destination of the user. The desired destination may be determined by user device 120 according to the user's input. For example, the user may enter the desired destination in a user interface of user device 120. Alternatively or additionally, the user may choose the desired destination from a list of historical destination in the user interface. Alternatively or additionally, the user may enter a partial entry, and user device 120 may recommend one or more candidate destinations to the user based on the requests that the user made in the past. The user may then select one of the candidate destination(s) as the desired destination.

At step 1403, ride request module 1202 may receive, via the communications interface, a second request for a ride from a second user. Ride request module 1202 may receive the second request in a manner similar to step 1403 described above. The second request may include information similar to the first request described above and may be generated based or the same as or similar to the process of generating the first request as described above.

By way of example, as illustrated in FIG. 13, a first user 1311 transmits a first request for a ride to ridesharing management server 150 via a first user device 120 (not shown). The first request includes a first pick-up location 1321 and a first desired destination 1331. A second user 1312 transmits a second request for a ride to ridesharing management server 150 via a second user device 120 (not shown). The second request includes a second pick-up location 1322 and a second desired destination 1332. There are two vehicles, a first vehicle 1341 and a second vehicle 1342, that may be available to be assigned to a ride request. First vehicle 1341 may be an electrically-powered vehicle, and second vehicle 1342 may be a petrol-powered vehicle.

At step 1405, battery-charge module 1203 may receive current battery-charge data for the electrically-powered vehicles via, for example, the communications interface. For example, battery-charge module 1203 may periodically receive from an electrically-powered vehicle the current battery-charge data thereof.

In some embodiments, the current battery-charge data of an electrically-powered vehicle may include an indication of a driving duration in which the electrically-powered vehicle can operate without charging. Alternatively or additionally, the battery-charge data may include a mileage to depletion, and the mileage to depletion may indicate an estimation of how much longer distance the ridesharing vehicle may operate before the battery requires recharging. As another example, battery-charge module 1203 may determine the driving duration and/or distance based on the current charge level of the battery and one or more known characteristics of the vehicle. In such an example, battery-charge module 1203 may convert the charge level (e.g., measured in volts or amperes) to a duration and/or distance using a conversion factor associated with the year, make, and module of the vehicle and/or using a conversion factor determined from historical data associated with the vehicle. Alternatively, the vehicle may perform the conversion and send the driving duration and/or distance to battery-charge module 1203.

In some embodiments, the battery-charge data may also include information relating to the charging capacity of an electrically-powered vehicle. The information relating to the charging capacity of the electrically-powered vehicle may include the charging capacity of the vehicle battery, the type of the vehicle battery, an indication if the first electrically-powered vehicle is a fully electric vehicle or a hybrid vehicle, and/or specific data about the battery performances. Battery-charge module 1203 may save the battery-charge data into database 1206.

In some embodiments, an electrically-powered vehicle may include a power sensor configured to capture its current battery-charge data. For example, the power sensor may be configured to continuously monitor and transmit data related to the current battery charge level. The power sensor may also monitor the current battery charge level and transmit data when the charge level is less than a predetermined threshold level.

In some embodiments, an electrically-powered vehicle may transmit its current battery-charge data to ridesharing management server 150 periodically (e.g., every 5 seconds, every 1 minute, every 5 minutes, every 10 minutes, every 30 minutes, etc.), and ridesharing management server 150 may periodically receive the current battery-charge data accordingly. Alternatively or additionally, the electrically-powered vehicle may transmit the current battery-charge data to ridesharing management server 150 according to the battery charge. For example, the electrically-powered vehicle may transmit the current battery-charge data to ridesharing management server 150 if the electrically-powered vehicle determines that the battery charge is less than or equal to a threshold level (e.g., 30% of the full charge), and ridesharing management server 150 may automatically receive the current battery-charge data from the vehicle when the battery charge is equal to or below the predefined threshold. In some embodiments, the electrically-powered vehicle may transmit its current battery-charge data at different frequencies according to the battery level. For example, the electrically-powered vehicle may transmit its current battery-charge data to ridesharing management server 150 at a first frequency (e.g., every 30 minutes) if the electrically-powered vehicle determines that the battery level is greater than or equal to 50% of the full charge, and may transmit its current battery-charge data at a second frequency (e.g., every 10 minutes) if the electrically-powered vehicle determines that the battery level is less than 50% of the full charge.

In some embodiments, battery-charge module 1203 may receive current battery-charge data for the electrically-powered vehicles including at least one fully electric vehicle and at least one hybrid vehicle.

By way of example, first vehicle 1341 illustrated in FIG. 13, which may be an electrically-powered vehicle, may transmit its current battery-charge data to ridesharing management server 150 periodically or when the battery level is less than a threshold.

At step 1407, location module 1204 may receive current vehicle location data for the fleet of vehicles. The fleet of vehicles may include a plurality of petrol-powered vehicles and a plurality of electrically-powered vehicles. The electrically-powered vehicles may include one or more electrically-powered vehicles that transmit the current battery-charge data to ridesharing management server 150 as described above in connection of step 1405.

The current vehicle location data may include global positioning system (GPS) data generated by at least one GPS component associated with each vehicle. Additionally or alternatively, location module 1204 may receive other location information, such as cell tower triangulation data, Wi-Fi or other signal strength data, or any other combination of location information. In one example, location module 910 may receive the location data, for example, from a mobile communication device (e.g., a smartphone, tablet, wearable device, etc.) associated (e.g., located in the passenger cabin) with a vehicle.

In some embodiments, a vehicle may transmit its current location data to ridesharing management server 150 periodically (e.g., every 30 minutes, every 10 minutes, every 5 minutes, every 1 minute, every 5 seconds) or in real time.

By way of example, location module 1204 may receive current vehicle location data of first vehicle 1341 and second vehicle 1342 periodically or in real time.

At step 1409, ride request module 1202 may electronically assign the first user to a first electrically-powered vehicle and the second user to a second petrol-powered vehicle based on the first and second desired destinations, the current battery-charge data, and/or the current vehicle location data. By way of example, ride request module 1202 may electronically assign first user 1311 to first vehicle 1341 (which may be an electrically-powered vehicle) and second user 1312 to second vehicle 1342 (which may be a petrol-powered vehicle) based on first desired destination 1331 and second desired destination 1332, the current battery-charge data, and the current vehicle location data.

In some embodiments, ride request module 1202 may electronically assign the first user to a first vehicle and the second user to a second vehicle based on the information relating to the first and second requests, the current battery-charge data of one or more electrically-powered vehicles, and the current vehicle location data of one or more vehicles (electrically-powered vehicle and/or petrol-powered vehicle). The first vehicle may be an electrically-powered vehicle or petrol-powered vehicle. The second vehicle may be an electrically-powered vehicle or petrol-powered vehicle. The information relating to the first and second requests based on which ride request module 1202 electronically distributes the first and second requests may include the first desired destination, the first pick-up location, the second desired destination, or the second pick-up location, or the like, or a combination thereof.

In some embodiments, ride request module 1202 may electronically assign vehicles to the first and second requests according to the current battery-charge data of one or more electrically-powered vehicles. For example, battery-charge module 1203 may determine whether a first electrically-powered vehicle is need of a charge based on the current battery-charge data thereof. By way of example, battery-charge module 1203 may determine an electrically-powered vehicle is need of charge if battery-charge module 1203 determines that the duration in which the first electrically-powered vehicle can operate without charging is under a threshold period (e.g., 0.5, 1, 1.5 hours, etc.). Alternatively or additionally, battery-charge module 1203 may determine the electrically-powered vehicle is need of charger if battery-charge module 1203 determines that the driving distance in which the first electrically-powered vehicle can operate without charging is under a threshold distance (e.g., 1 km, 2 km, 5 km, 10 km, 20 km, 50 km, 100 km, 200 km, etc.). If ride request module 1202 determines that the first electrically-powered vehicle is in need of a charge, ride request module 1202 may electronically assign the first user (e.g., first user 1311) to the first electrically-powered vehicle (e.g., first vehicle 1341) and the second user (e.g., second user 1312) to a second petrol-powered vehicle (e.g., second vehicle 1342) despite that first user 1311 may be at a first location (e.g., first pick-up location 1321) closer to second vehicle 1342 than first vehicle 1341, and that second user 1312 is at a second location (e.g., second pick-up location 1322) closer to first vehicle 1341 than second vehicle 1342.

In some embodiments, ride request module 1202 may electronically assign vehicles to the first and second requests further based on one or more charging locations. A charging location may include a charging station and/or a charging lane. For example, ride request module 1202 may access information relating to the charging locations stored in database 1206 via database access module 1205. Ride request module 1202 may obtain the information relating to the charge location (s) in proximity to the desired destination (s) of the first request and/or the second request. Ride request module 1202 may also determine that a charging location is in proximity to a desired destination if ride request module 1202 determines that the charging location is within a radius (e.g., 1 km, 2 km, 5 km, 10 km, etc.) to the desired destination (or the desired destination is within a radius of the charging location). On the other hand, if ride request module 1202 determines that no charging location is within the radius to the desired destination, ride request module 1202 may determine that no charging location is in proximity to the desired destination. If ride request module 1202 determines that an electrically-powered vehicle (e.g., first vehicle 1341) is in need of charging and a desired destination of a user (first user 1311) is in proximity to a charging location (e.g., charging station 1351), ride request module 1202 may electronically assign first vehicle 1341 to first user 1311 when the desired destination is in proximity to a charging location. Alternatively or additionally, ride request module 1202 may electronically assign second user 1312 to second petrol-powered vehicle 1342 when the desired destination of second user 1312 is not in proximity to any charging location (e.g., first vehicle 1341 needs charging, and the desired destination of second user 1312 is not with a radius of 10 km of a charging station).

In some embodiments, ride request module 1202 may electronically assign an electrically-powered vehicle to a ride request based on the current battery-charge data associated with the electrically-powered vehicle and the charging capacities of the electrically-powered vehicle. For example, ride request module 1202 may access database 1206 to obtain the information relating to charging capacities of the electrically-powered vehicle and receive the current battery-charge data of the electrically-powered vehicle. The information relating to charging capacities of the electrically-powered vehicle may include an indication if the first electrically-powered vehicle is a fully electric vehicle or a hybrid vehicle, and/or specific data about the battery performances. Ride request module 1202 may assign the electrically-powered vehicle to a ride request based on the information relating to charging capacities of the electrically-powered vehicle and the current battery-charge data of the electrically-powered vehicle.

In some embodiments, ride request module 1202 may determine a drop-off location based on information relating to a ride request, and the current battery-charge data, and the location(s) of one or more charging locations. By way of example, ride request module 1202 may determine a drop-off location that is close to a charging location and a desired destination of the ride request (e.g., 500 m from the desired destination and 2 km from the charging location).

In some embodiments, ride request module 1202 may determine a drop-off location for each of the first and second requests and respectively assign the determined drop-off locations to the first and second requests. Ride request module 1202 may electronically assign the first electrically-powered vehicle to the first request and the second petrol-powered vehicle to the second request based on the drop-off locations of passengers currently assigned to each of the first electrically-powered vehicle and the second petrol-powered vehicle.

At step 1411, ride request module 1202 may transmit instructions to direct the first electrically-powered vehicle to the first pick-up location and the second petrol-powered vehicle to the second pick-up location via, for example, the communications interface. Ride request module 1202 may also transmit information relating to the first drop-off location of the first user (which may be the same as the first desired destination) to the first electrically-powered vehicle and transmit information relating to the second drop-off location of the second user (which may be the same as the second desired destination) to the second petrol-powered vehicle. In some embodiments, ride request module 1202 may also determine a route from the pick-up location to the drop-off location (or the desired destination) for each of the vehicles. For example, ride request module 1202 may determine a route for an electrically-powered vehicle based on the driving duration and/or distance, real-time traffic data, terrain data (e.g., elevation changes), driver-performances data indicative of driver acceleration and deceleration rates, or the like, or a combination thereof. Ride request module 1202 may also direct the first electrically-powered vehicle via a first determined driving route and to direct the second petrol-powered vehicle via a second determined driving route. In some embodiments, the first driving route may include fewer elevation changes compared to the second driving route.

Routing Both Autonomous and Non-Autonomous Vehicles

Embodiments of the present disclosure may allow for a vehicle management system to manage a fleet of vehicles for hire. The fleet of vehicles may comprise one or more autonomous vehicles-for-hire and one or more manually-drivable vehicles-for-hire. An autonomous vehicle-for-hire may be a vehicle-for-hire capable of performing driving tasks without or with little intervention of a human driver. For example, the autonomous vehicle-for-hire may be a vehicle that has an autonomy level of 4, 5, or 6 defined by the Society of Automotive Engineers (SAE) International. A manually-drivable vehicle-for-hire may be a vehicle that requires a human driver's input to perform driving tasks. For example, the manually-drivable vehicle-for-hire may be a vehicle that has an autonomy level of 0, 1, 2, or 3 defined by the SAE International.

The vehicle management system may receive a request for a ride from a prospective passenger. The system may also electronically assign a specific vehicle-for-hire that is capable of fulfilling the ride request to the prospective passenger. The system may further determine the driving mode of the assigned vehicle (e.g., the assigned vehicle being in an autonomous vehicle) and determine a route specific to the driving mode of the assigned vehicle. The system may also wireless transmit the determined route to the assigned vehicle.

Figure 15:
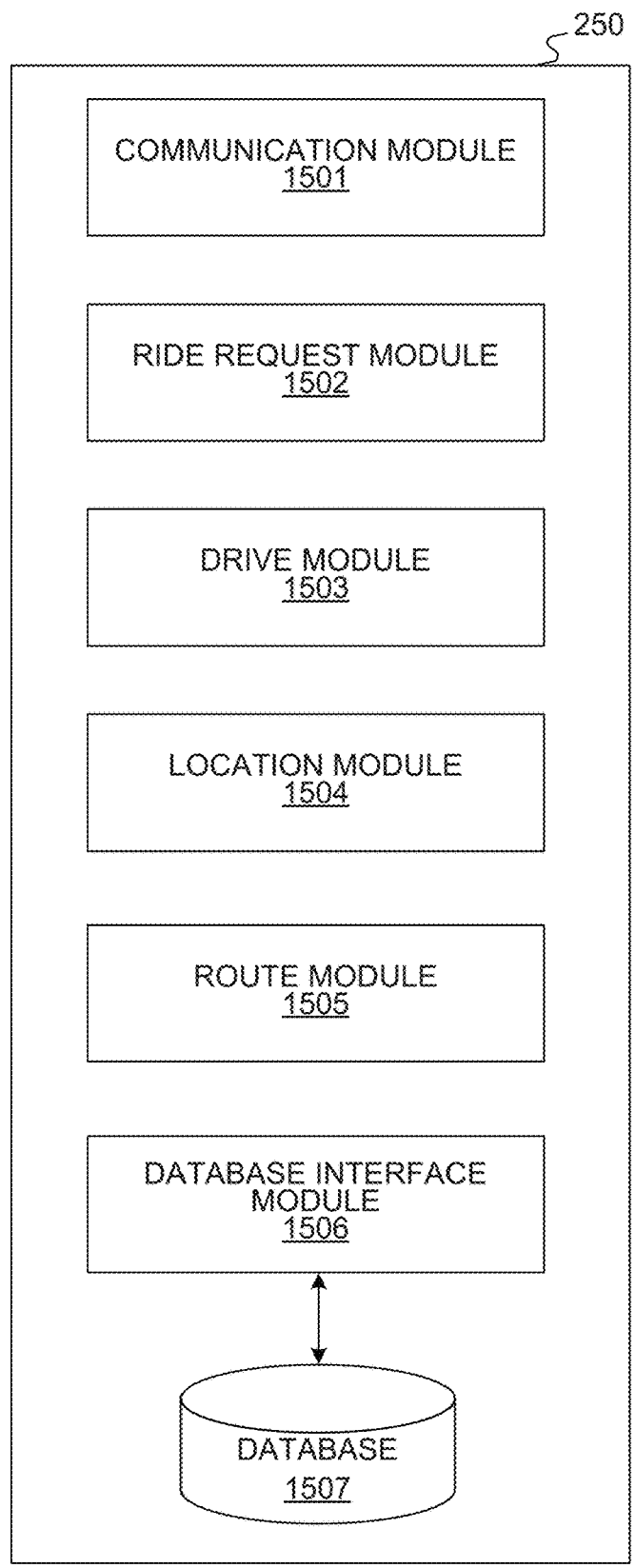
FIG. 15 is an exemplary embodiment of a memory containing software modules, in accordance with some embodiments of the present disclosure.

FIG. 15 is an exemplary embodiment of a memory containing software modules, in accordance with some embodiments of the present disclosure.

Memory 250 may store a plurality of modules and may be executable by at least one processor to perform various methods and processes disclosed herein. Further, it should be noted that memory 250 may store more or fewer modules than those shown in FIG. 15, depending on implementation-specific considerations.

As illustrated in FIG. 15, memory 250 may store software instructions to execute a communication module 1501, a ride request module 1502, a drive module 1503, a location module 1504, a route module 1505, a database access module 1506, and may include a database 1507. Communication module 1501 may include software instruction for communicating with other components of ridesharing management system 100 (e.g., one or more user devices 120A-120C, driver devices 120D and 120E, driving-control device 120F). Ride request module 1502 may include software instruction for receiving a request for a ride from a prospective passenger and for electronically assigning a specific vehicle-for-hire to the prospective passenger. Drive module 1503 may include software instruction for determining the driving mode of the specific vehicle-for-hire. Location module 1504 may include software instruction for receiving locations of one or more vehicles from one or more sources. Route module 1505 may include software instruction for determining a specific route for the specific vehicle-for-hire assigned to the prospective passenger. Database access module 1506 may include software instruction executable to interact with database 1507, to store and/or receive information (e.g., geographical maps associated with a geographical area in which a vehicle is operating, current traffic information of a geographical area, historical data for efficient routes, battery-charge data of one or more electrically-powered vehicles).

Communication module 1501 may include software instructions for facilitating communications between the device on which it is implemented (e.g., ridesharing management server 150) and another component of ridesharing management system 100 (e.g., mobile communications devices 120A-120F, one or more vehicles, database 170). For example, ridesharing management server 150 may receive a request for a ride from one or more prospective passengers (via, for example, a mobile communications device associated with the prospective passenger(s)) via communication module 1501. As another example, ridesharing management server 150 may electronically assign a specific vehicle-for-hire to a prospective passenger via communication module 1501.

Ride request module 1502 may include software instructions for receiving a request for a ride from one or more prospective passengers. Each ride request may include a starting point and a desired destination within the geographic area. In some embodiments, ride request module 1502 may determine a pick-up location and a drop-off location, the determined pick-up location being at a location other than but in proximity to the starting point and the determined drop-off location being at a location other than but in proximity to the desired destination. Additionally or alternatively, ride request module 1502 may determine the drop-off location for a prospective passenger based on a location of the charging station and the desired destination of the ride request. For example, in one embodiment, a ride request may include information that the desired destination is a building at the corner of an intersection of two cross streets. Ride request module 1502 may determine that dropping the prospective passenger off at the intersection would result in the vehicle entering a one-way street, impeding a more efficient route to a charging station. Thus, ride request module 1502 may instead, for example, drop the prospective passenger off at a location proximal to the desired destination, and avoid entering the one-way street. Ride request module 1502 may also electronically assign a specific vehicle-for-hire to the prospective passenger.

Drive module 1503 may include software instructions for determining the driving mode of a vehicle. For example, drive module 1503 may access stored information and determine the driving mode of a specific vehicle-for-hire. Database 1507 may store information relating to the driving modes of a plurality of vehicles. The driving mode may be autonomous or manually drivable. In some embodiments, the driving mode may be autonomous capable (i.e., the vehicle can be autonomously or manually drivable depending on a selection by the driver or ridesharing management server 150). Drive module 1503 may access and obtain the information relating to a specific vehicle-for-hire stored in database 1507 via, for example, database access module 1506. Drive module 1503 may also determine the drive mode of the vehicle based on the obtained information.

Location module 1504 may include software instructions for receiving current location data for a plurality of vehicles-for-hire and/or a prospective passenger (via, for example, user device 120 associated with the prospective passenger). In some embodiments, the current location data of a vehicle or a prospective passenger may include global positioning system (GPS) data generated by at least one GPS component associated with the vehicle or prospective passenger. Additionally or alternatively, location module 1504 may receive other location information, such as cell tower triangulation data, Wi-Fi or other signal strength data, or any other combination of location information. In one example, location module 1504 may receive the location data, for example, from a mobile communication device (e.g., a smartphone, tablet, wearable device, etc.) associated (e.g., located in the passenger cabin) with the vehicle or prospective passenger.

Route module 1505 may include software instructions for determining a mode-specific route for the specific vehicle-for-hire based on the driving mode of the specific vehicle-for-hire.

Database access module 1506 may include software instructions for interacting with database 1507, to store and/or receive information. Database 1507 may be configured to store any type of information associated with modules 1501-1505, depending on implementation-specific considerations.

Modules 1501-1505 may be implemented in software, hardware, firmware, or any combination of software, hardware or firmware. For example, if the modules are implemented in software, they may be stored in memory 250. However, in some embodiments, any one or more of modules 1501-1505 and data associated with database 1507 may, for example, be stored in processor 204 and/or executed on a device associated with ridesharing management system 100. Modules 1501-1505 may be configured to interact with each other and/or other modules of memory 250 to perform functions consistent with disclosed embodiments.

Figure 16:
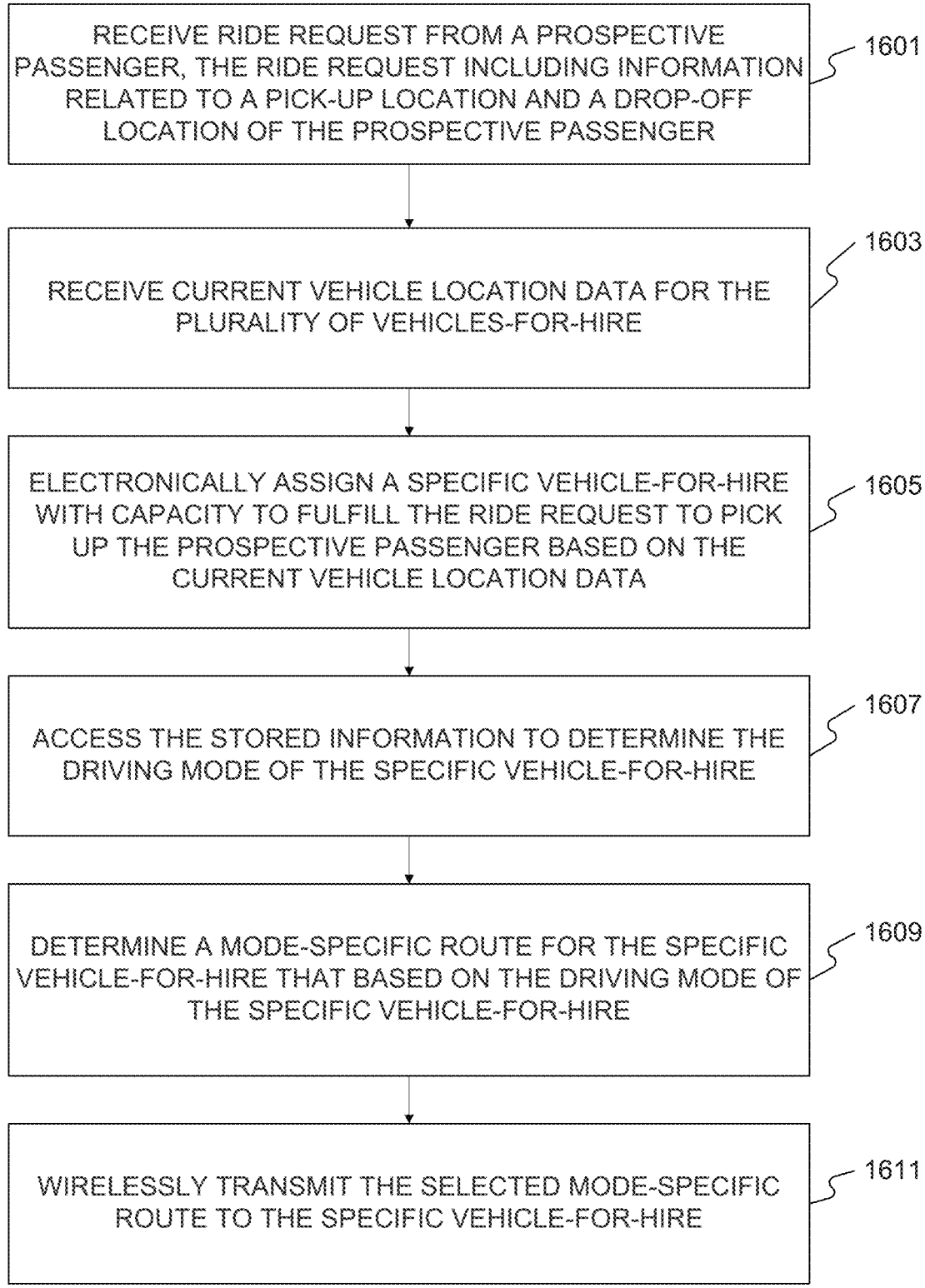
FIG. 16 is a flowchart of an exemplary process for managing a fleet of ridesharing vehicles in accordance with some embodiments of the present disclosure.

FIG. 16 is a flowchart showing an exemplary process 1600 for managing a fleet of ridesharing vehicles, in accordance with some embodiments of the present disclosure. The fleet of vehicles include one or more manually-drivable vehicles-for-hire and one or more autonomous vehicles-for-hire. In some embodiments, the fleet of vehicles include one or more electrically-powered vehicles and one or more petrol-powered vehicles. In one embodiment, the steps of process 1600 may be performed by a vehicle management server, such as ridesharing management server 150 described above with reference to FIGS. 1 and 3. Alternatively, at least some of the steps of process 1600 may be performed by a mobile communications device, such as the mobile communications devices 120 described above with reference to FIGS. 1 and 2. In the following description, reference is made to certain components of FIGS. 1-3 for purposes of illustration. It will be appreciated, however, that other implementations are possible and that other components may be utilized to implement example methods disclosed herein.

At step 1601, ride request module 1502 may receive a ride request from a prospective passenger via a communications interface. The communications interface may be communications interface 360, or communication module 1501, or the like, or a combination thereof. For example, the prospective passenger may generate a request for a ride via a user device 120 associated with the prospective passenger (e.g., an application installed in user device 120). User device 120 may also transmit the ride request to ridesharing management server 150, which may receive the ride request via communication module 1501.

The ride request may include information related to a pick-up location of the prospective passenger. The pick-up location of the prospective passenger (or a user device 120 associated with the prospective passenger) may be determined according to a current location of the prospective passenger. For example, user device 120 may determine its current location according to GPS signals received by a GPS component of user device 120. User device 120 may also determine the pick-up location according to the current location. For example, user device 120 may designate the current location as the pick-up location. Alternatively, user device 120 may determine a location that is close to the current location and is suitable for the prospective passenger to wait for a vehicle (e.g., within a walking distance, avoiding busy streets, avoiding non-stopping regions) as the pick-up location. Alternatively, user device 120 may recommend a plurality of candidate pick-up locations for the prospective passenger to choose. For example, user device 120 may display a user interface showing a map in which a plurality of candidate pick-up locations are shown along with the current location of the prospective passenger. The prospective passenger may select one of the candidate pick-up locations as the pick-up location via the user interface. User device 120 may include the information relating to the pick-up location into the request to be transmitted to ridesharing management server 150.

The ride request may also include information related to a drop-off location for the prospective passenger. For example, the prospective passenger may enter a desired destination at user device 120. User device 120 may determine a drop-off location based on the entered desired destination. For instance, user device 120 may simply designate the desired destination as the drop-off location. Alternatively, user device 120 may recommend a drop-off location suitable for the prospective passenger to be dropped off according to the desired destination (e.g., within walking distance, avoiding busy streets, avoiding non-stopping regions).

In some embodiments, the ride request may also include information related to the preferences of the prospective passenger. For example, user device 120 may ask the prospective passenger regarding his or her preference regarding whether to avoid riding an autonomous vehicle when the prospective passenger initiates a request at user device 120. The prospective passenger may enter his or her preference at user device 120. User device 120 may include such information in the ride request to be transmitted to ridesharing management server 150. Alternatively or additionally, user device 120 may receive the preference information from the prospective passenger and store the preference information in the prospective passenger's profile. When user device 120 generates a ride request, user device 120 may automatically include the preference information in the ride request without the prospective passenger's input of preference information. Alternatively or additionally, ridesharing management server 150 may receive such preference information from user device 120 once and store the preference information in the prospective passenger's profile (e.g., stored in database 1507).

At step 1603, location module 1504 may receive current vehicle location data for a plurality of vehicles-for-hire via, for example, communication module 1501. The plurality of vehicles-for-hire may include a plurality of autonomous vehicles-for-hire and a plurality of manually-drivable vehicles-for-hire.

In some embodiments, at least one of the plurality of vehicles-for-hire is electrically powered. The electrically-powered vehicle(s) may transmit battery-charge data to ridesharing management server 150 as described elsewhere in this disclosure. For example, an electrically-powered vehicle may periodically transmit current battery-charge data to ridesharing management server 150. In some embodiments, ridesharing management server 150 may determine whether a vehicle-for-hire is an electrically-powered vehicle or a petrol-powered vehicle by accessing information identifying a powering mode of the vehicle stored in, for example, database 1507.

The current vehicle location data may include global positioning system (GPS) data generated by at least one GPS component associated with each vehicle. Additionally or alternatively, location module 1504 may receive other location information, such as cell tower triangulation data, Wi-Fi or other signal strength data, or any other combination of location information. In one example, location module 910 may receive the location data, for example, from a mobile communication device (e.g., a smartphone, tablet, wearable device, etc.) associated (e.g., located in the passenger cabin) with a vehicle.

At step 1605, ride request module 1502 may electronically assign a specific vehicle-for-hire with capacity to fulfill the ride request to pick up the prospective passenger based on the current vehicle location. For example, ride request module 1502 may electronically assign a vehicle-for-hire that is the closest to the prospective passenger to pick up the prospective passenger.

In some embodiments, ride request module 1502 may provide an indication to the prospective passenger that an autonomous vehicle-for-hire is en route. For example, ride request module 1502 may transmit a notification to the prospective passenger (via, for example, user device 120) via the communications interface (e.g., communications interface 360, communication module 1501) after electronically assigning an autonomous vehicle-for-hire to the prospective passenger. The notification may indicate that an autonomous vehicle-for-hire has been assigned to the prospective passenger and is en route. The notification may be in the form of a text message, an audio message, an image, a link, a push notification, or an in-app notification, or the like, or a combination thereof. In some embodiments, ride request module 1502 may also cause user device 120 associated with the prospective passenger to display a user interface showing a map along with an icon representing the vehicle approaching the prospective passenger when the vehicle moves toward the prospective passenger. In some embodiments, the notification may also include a request for the prospective passenger to confirm acceptance of the assignment of an autonomous vehicle. The prospective passenger may accept or decline the assignment of the autonomous vehicle-for-hire after receiving the notification, and user device 120 may transmit the confirmation (acceptance or rejection of the assignment) to ride request module 1502. If a rejection is received from user device 120, ride request module 1502 may electronically re-assign a manually-drivable vehicle-for-hire to the prospective passenger.

In some embodiments, in assigning a specific vehicle-for-hire to pick up the prospective passenger, ride request module 1502 may consider various additional factors. For example, ride request module 1502 may electronically assign a specific vehicle-for-hire to the prospective passenger based on the prospective passenger's preference about riding an autonomous vehicle-for-hire. By way of example, the prospective passenger may specify the preference to avoid riding an autonomous vehicle-for-hire in the ride request. Alternatively or additionally, such information may be stored in the prospective passenger's profile accessible to ride request module 1502. Ride request module 1502 may process the ride request from the prospective passenger to determine if the prospective passenger prefers avoiding riding an autonomous vehicle. Ride request module 1502 may also electronically assign a manually-drivable vehicle-for-hire to the prospective passenger despite that assigning an autonomous vehicle-for-hire would result in a faster drop off time for the prospective passenger.

In some embodiments, ride request module 1502 may electronically assign a specific vehicle-for-hire to the prospective passenger based on the pick-up time and/or the drop-off time. For example, ride request module 1502 may select at least one manually-drivable vehicle and at least one autonomous vehicle each capable of fulfilling the ride request. Route module 1505 may also calculate a route for each selected vehicle based on the driving mode of each selected vehicle (i.e., the vehicle being autonomous or manually-drivable). The route may be from the current location of each vehicle to the pick-up location of the prospective passenger. Route module 1505 may further compare each route to current traffic data and select the vehicle that has a faster (or the fastest) pick-up time for the prospective passenger as the specific vehicle-for-hire assigned to the prospective passenger. The waiting period for the prospective passenger may then be the shortest. In some embodiments, the current traffic data may include information relating to the restrictions imposed that are specific to autonomous vehicles or manually-drivable vehicles. Exemplary restrictions may include roadways that are restricted to autonomous vehicles or roadways that are restricted to manually-drivable vehicles. Exemplary roadways may include neighborhoods, roads, lanes, or turns, or the like, or a combination thereof. For example, the current traffic data may include information relating to one or more roads that are not open to autonomous vehicles. When determining a route for an autonomous vehicle, route module 1505 may exclude such roads from the route planning for the vehicle.

As another example, ride request module 1502 may select at least one manually-drivable vehicle and at least one autonomous vehicle each capable of fulfilling the ride request. Route module 1505 may also calculate a route for each selected vehicle from the current location of the vehicle to the drop-off location for the prospective passenger (passing the pick-up location) based on the driving mode of the vehicle. Route module 1505 may further compare each route to current traffic data and select the vehicle that has a faster (or the fastest) drop-off time for the prospective passenger as the specific vehicle-for-hire assigned to the prospective passenger. The drop-off time may include the time for each vehicle driving from the current location of each vehicle to the drop-off location. Alternatively, ride request module 1502 may select the vehicle that has a faster (or the fastest) driving time for the prospective passenger as the specific vehicle-for-hire assigned to the prospective passenger. The driving time may be the time for each selected vehicle from the pick-up location to the drop-off location.

In some embodiments, a vehicle-for-hire may be assigned to two or more ride requests. Ride request module 1502 may electronically assign a vehicle-for-hire based on the fastest average drop-off time for the prospective passenger and additional passenger(s) assigned to the vehicle. For example, ride request module 1502 may receive two ride requests, one from the prospective passenger (or referred to as the first passenger) and the other from another passenger (or referred to as the second passenger). Ride request module 1502 may select at least one manually-drivable vehicle and at least one an autonomous vehicle each capable of fulfilling the ride requests for the first passenger and the second passenger. Route module 1505 may also calculate a route for each selected vehicle satisfying the ride requests based on the driving mode of each selected vehicle and the current traffic data. For example, route module 1505 may determine for each selected vehicle a route passing the current location of the vehicle, and the pick-up locations and the drop-off locations of the first and second passengers. In some embodiments, the current traffic data may include information identifying the restricted road(s) specific to an autonomous vehicle or a manually-drivable vehicle. Ride request module 1502 may also electronically assign the vehicle between (or among) the selected vehicles that results in a faster (or the fastest) average drop-off time for the first and second passengers. In some embodiments, the average drop-off time may be determined by summing the estimated drop-off time for the first and second passengers for each of the selected vehicles and dividing by the total number by two. The estimated drop-off time for the first and second passengers may change based on the current passengers' assignments for each of the selected vehicles.

In some embodiments, ride request module 1502 may electronically identify and assign a specific vehicle-for-hire with capacity to fulfill the ride request to pick up the prospective passenger based on the number of passengers currently (or having been or to be) assigned to the vehicle. For example, ride request module 1502 may electronically assign an autonomous vehicle (whose capacity may be five passengers) to pick up the prospective passenger if there are four passengers currently assigned to the vehicle. As another example, ride request module 1502 may electronically assign an autonomous vehicle to pick-up the prospective passenger if the ride request sent by the prospective passenger indicates that there are five passengers (including the prospective passenger) on the trip.

At step 1607, drive module 1503 may access stored information and determine the driving mode of the specific vehicle-for-hire. For example, database 1507 may store information relating to the driving mode of each of the plurality of vehicles. The driving mode may be autonomous or manually driving. In some embodiments, the driving mode may be autonomous capable (i.e., the vehicle can be autonomously or manually driving depending on a selection by the driver or ridesharing management server 150). Drive module 1503 may access and obtain the information relating to the specific vehicle-for-hire stored in database 1507 via, for example, database access module 1506. Drive module 1503 may also determine the drive mode of the vehicle based on the obtained information.

At step 1609, route module 1505 may determine (or select) a mode-specific route for the specific vehicle-for-hire based on the driving mode of the specific vehicle-for-hire. The route may include a plurality of links from the current location of the vehicle to the pick-up location and from the pick-up location to the drop-off location. For example, route module 1505 may determine a route for the specific vehicle-for-hire based on current traffic data specific to the driving mode of the specific vehicle-for-hire. By way of example, route module 1505 may determine that the specific vehicle-for-hire is an autonomous vehicle (or a manually-drivable vehicle). Route module 1505 may also obtain restrictions specific to autonomous vehicles (or manually-drivable vehicles) from, for example, database 1507 or a third-party data provider. In some embodiments, database 1507 may store map data defining roadways that are restricted to autonomous vehicles (and/or manually-drivable vehicles). Route module 1505 may access the map data and determine a route for the specific vehicle-for-hire based on the restrictions to autonomous vehicles (or manually-drivable vehicles) according to the map data. Exemplary restrictions may include roadways that are restricted to autonomous vehicles and/or manually-drivable vehicles. Exemplary roadways may include neighborhoods, roads, lanes, or turns, or the like, or a combination thereof. For example, an autonomous vehicle may be restricted from taking a right or left turn in a certain area. As another example, a manually-drivable vehicle may be restricted from driving at an express lane reserved to autonomous vehicles (or vice versa). As a further example, when determining a route for the specific vehicle-for-hire, route module 1505 may exclude restricted roads specific to the specific vehicle-for-hire from the route planning for the vehicle.

In some embodiments, route module 1505 may determine a mode-specific route for the specific vehicle-for-hire based on the driving mode and the powering mode of the specific vehicle-for-hire. For example, database 1507 may store the information relating to the powering mode of the specific vehicle-for-hire (e.g., being electrically-powered or petrol-powered). Route module 1505 may access the information relating to the powering mode and determine the powering mode of the specific vehicle-for-hire. After determining that the specific vehicle-for-hire is an electrically-powered vehicle, route module 1505 may determine (or identify) at least two mode-specific routes to pick up the prospective passenger and select a driving route that includes less elevation changes and avoids roads restricted to the specific vehicle-for-hire.

At step 1611, ride request module 1502 may wireless transmit information relating to the determined (or selected) mode-specific route to the specific vehicle-for-hire via, for example, network 140. For example, ride request module 1502 may wireless transmit the determined route to user device 120 associated with the specific vehicle-for-hire (or the driver of the vehicle) or driving-control device 120F if the vehicle is an autonomous vehicle. The route may include a plurality of links from the current location of the vehicle to the pick-up location and from the pick-up location to the drop-off location. In some embodiments, ride request module 1502 may also wireless transmit information relating to the prospective passenger and/or ride request to the specific vehicle-for-hire. The information transmitted to the vehicle may include the prospective passenger's name, gender, age, photo, or the like, or a combination thereof.

In some embodiments, ride request module 1502 may receive a pick-up confirmation from the assigned specific vehicle-for-hire after picking up the prospective passenger. For example, if the specific vehicle-for-hire is an autonomous vehicle, after picking up the prospective passenger, driving-control device 120F may transmit a pick-up confirmation to ride request module 1502. As another example, if the specific vehicle-for-hire is a manually-drivable vehicle, the driver may transmit a pick-up confirmation to ride request module 1502 via user device 120 associated with the driver or vehicle. The pick-up confirmation may include information identifying the prospective passenger. Exemplary identification information may include an image, voice, and/or biometric data of the passenger captured at the time of the pick-up. Exemplary biometric data may include fingerprint, palm print, face recognition, iris recognition, retina, or the like, or a combination thereof. For instance, driving-control device 120F (or user device 120) may capture a picture of the passenger, which may be used to identify whether the passenger is the prospective passenger. Alternatively or additionally, ride request module 1502 may receive a pick-up confirmation from the prospective passenger after being picked up by the specific vehicle-for-hire. For example, the prospective passenger may transmit a pick-up confirmation via user device 120 associated with the prospective passenger to ride request module 1502. In some embodiments, ride request module 1502 may receive a first pick-up confirmation from the specific vehicle-for-hire and a second pick-up confirmation from the prospective passenger. More than one confirmation may be important in case of the specific vehicle-for-hire being an autonomous vehicle. For example, ridesharing management server 150 may determine that a particular vehicle has passed the pick-up location and ask the prospective passenger via user device 120 to confirm that the prospective passenger was indeed picked up by the vehicle.

Figure 17:
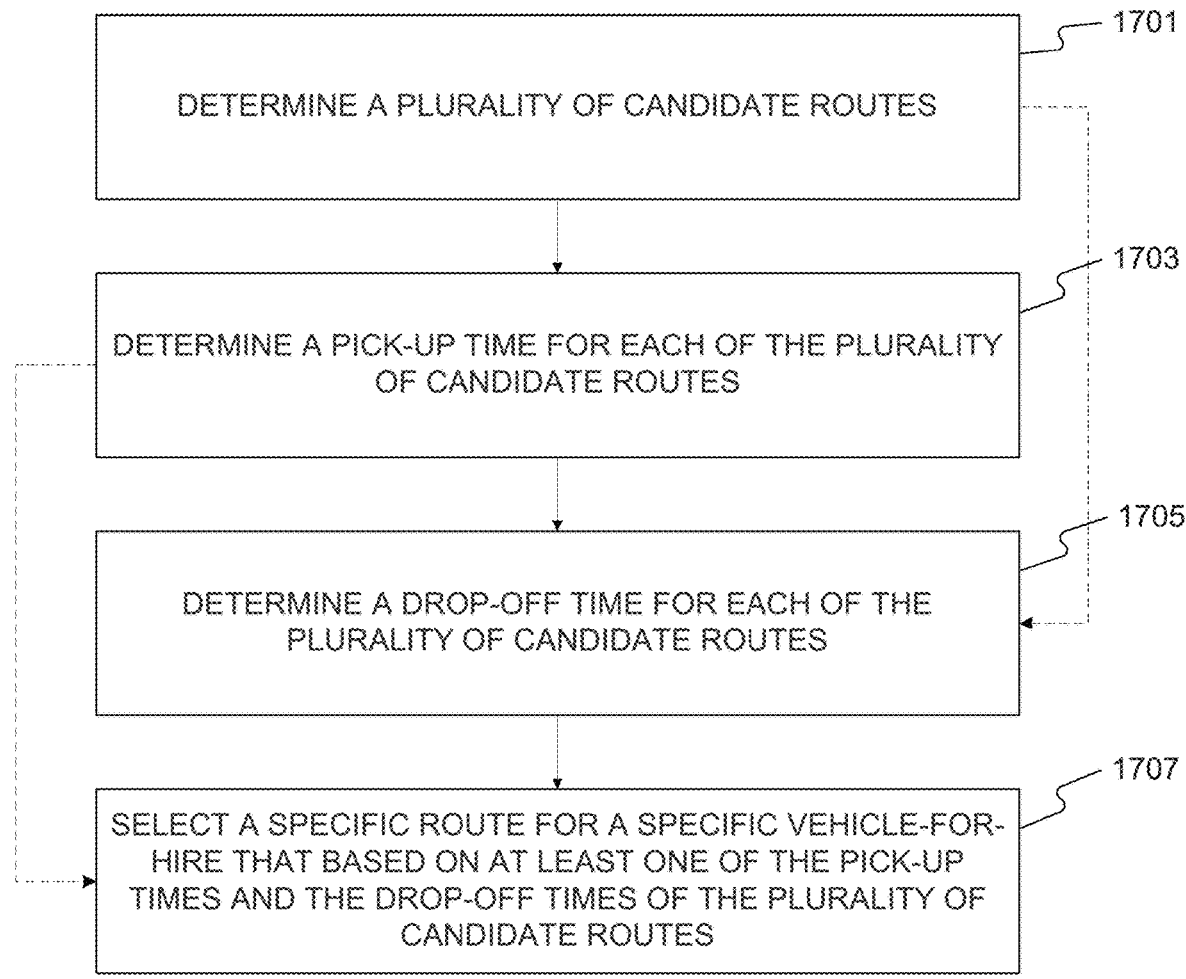
FIG. 17 is a flowchart of an exemplary process for selecting a specific route for a specific vehicle-for-hire, in accordance with some embodiments of the present disclosure.

FIG. 17 is a flowchart showing an exemplary process 1700 for selecting a specific route for a specific vehicle-for-hire, in accordance with some embodiments of the present disclosure. In some embodiments, step 1609 of process 1600 illustrated in FIG. 16 may be performed according to process 1700. In some embodiments, the determination of a mode-specific route for a selected vehicle performed in step 1605 of process 1600 illustrated in FIG. 16 when ride request module 1502 determines a specific vehicle-for-hire to be electronically assigned to a prospective passenger may be performed according to process 1700.

At step 1701, route module 1505 may determine a plurality of candidate routes for a vehicle. The vehicle may be a specific vehicle-for-hire assigned to a prospective passenger or a selected vehicle when ride request module 1502 determines a specific vehicle-for-hire to be electronically assigned to a prospective passenger. The candidate routes may be mode-specific to the driving mode of the vehicle (e.g., being autonomous or manually-drivable). Each of the candidate routes may include a first segment starting from the current location of the vehicle to the pick-up location for the prospective passenger and/or a second segment starting from the pick-up location to the drop-off location for the prospective passenger.

At step 1703, route module 1505 may determine a pick-up time for each of the candidate routes. The pick-up time may be an estimated time for the vehicle driving from its current location to the pick-up location (i.e., along the first segment of the route).

At step 1705, route module 1505 may determine a drop-off time for each of the candidate routes. The drop-off time may be an estimated time for the vehicle driving from its current location to the drop-off location (i.e., along the first and second segments of the route). Alternatively, the drop-off time may be an estimated time for the vehicle driving from the pick-up location to the drop-off location (i.e., along the second segment of the route).

At step 1707, route module 1505 may select a specific route from the plurality of candidate routes for the vehicle based on at least one of the pick-up times and the drop-off times of the candidate routes. For example, route module 1505 may select a specific route from the candidate routes that has a faster (or the fastest) pick-up time. As another example, route module 1505 may select a specific route from the candidate routes that has a faster (or the fastest) drop-off time.

In some embodiments, process 1700 may skip step 1703 after performing step 1701, where route module 1505 determines a drop-off time for each of the candidate routes. At 1703, route module 1505 may select a specific route from the candidate routes that has a faster (or the fastest) drop-off time. Alternatively, after performing steps 1701 and 1703, process 1700 may skip step 1705 and proceed to step 1707, where route module 1505 selects a specific route from the candidate routes that has a faster (or the fastest) pick-up time.

Automatically Adjusting Locations Based on Safety Constraints

In some embodiments, a ridesharing vehicle (e.g., autonomous vehicle 130F) may receive a ride request from a user, for example, user 130A sent through user device 120A. The ride request may be processed by a ridesharing server (such as ridesharing management server 150) and assigned a pick-up location and/or a drop-off location. The ridesharing vehicle may the pick up the user at the assigned pick-up location and drop off the user at the assigned drop-off location. However, existing systems do not adjust these locations to ensure safety of the user. For example, a pick-up location or drop-off location may be located in an area experiencing heavy traffic, may lack a sidewalk, may lack a parking lane or other lane in which the ridesharing vehicle may safely stop, or the like. This lack in existing systems provides a subpar experience for both users and drivers. Presently disclosed embodiments, on the other hand, address this technical problem by automatically adjusting pick-up locations and/or drop-off locations to improve the experience of users and drivers. Presently disclosed embodiments use networking technology and particular hardware sensors to affect the automatic adjustments.

Figure 18:
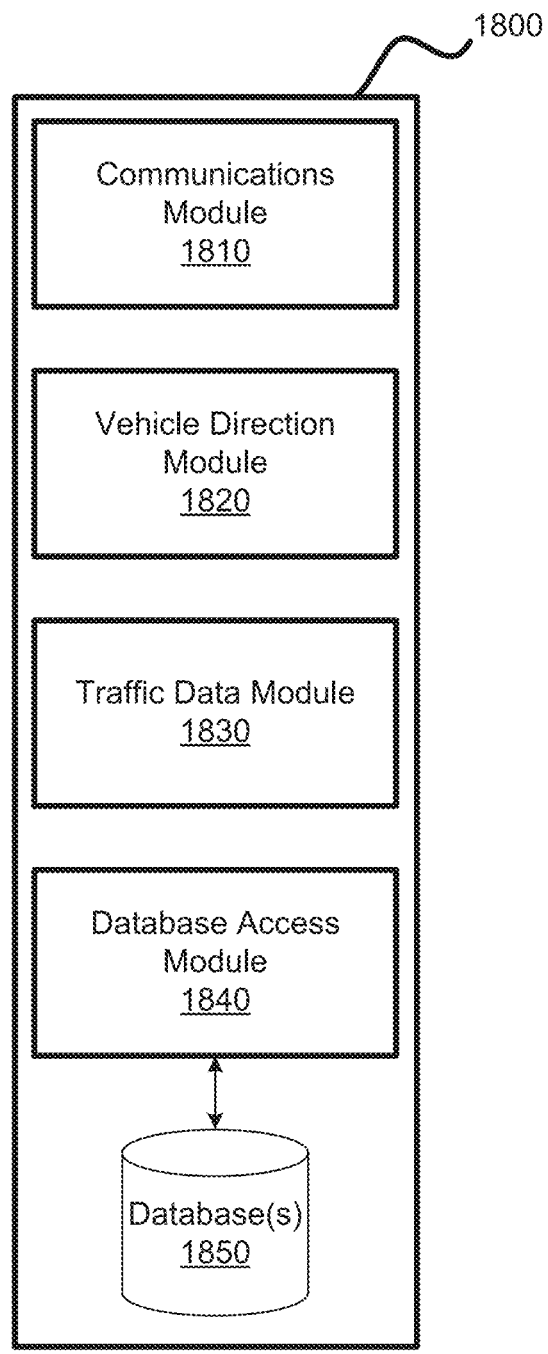
FIG. 18 is a diagram of an example memory module for dropping off passengers at a safe location, in accordance with some embodiments of the present disclosure.

FIG. 18 illustrates an exemplary embodiment of a memory 1800 containing software modules consistent with the present disclosure. In particular, as shown, memory 1800 may include a communications module 1810, a vehicle direction module 1820, a traffic data module 1830, a database access module 1840, and a database 1850. Modules 1810-1840 may contain software instructions for execution by at least one processing device, e.g., processor 204, included with a mobile communications device 200 associated with a vehicle, or a processor included in the vehicle. Communications module 1810, vehicle direction module 1820, traffic data module 1830, database access module 1840, and database 1850 may cooperate to perform multiple operations. For example, communications module 1810 may receive data identifying a pick-up location of a specific passenger and data identifying a drop-off location for the specific passenger from a remote server and may receive, from at least one sensor traffic data associated with the drop-off location, when an autonomous vehicle-for-hire is in a vicinity of the drop-off location. Vehicle direction module 1820 may electronically direct the autonomous vehicle-for-hire to pick up the specific passenger at the pick-up location, electronically direct the autonomous vehicle-for-hire to drop off the specific passenger at the drop-off location after picking up the specific passenger, and direct the vehicle-for-hire to the alternative location, to drop off the specific passenger at the alternative location. Traffic data module 1830 may enable a comparison of the traffic data obtained from the at least one sensor with safety data to determine whether dropping off the specific passenger at the drop-off location complies with a safety threshold and, when it is determined that a drop off at the drop-off location fails to meet the safety threshold, enable analysis of the traffic data obtained from the at least one sensor to identify an alternative location, in a vicinity of the drop-off location, that complies the safety threshold. Database access module 1840 may interact with database 1850 which may store any information associated with the functions of modules 1810-1830.

In some embodiments, memory 1800 may be included in, for example, memory 250 storing programs including, for example, operating system 252 and communication instructions 254, discussed above. Alternatively or additionally, the components of memory 1810 may be distributed between a mobile communications device 200 associated with a vehicle and one or more ridesharing management servers 150.

In some embodiments, communications module 1810 may receive from the remote server data identifying a pick-up location of a specific passenger and data identifying a drop-off location for the specific passenger. A pick-up location may refer to a location at which the specific passenger is intended to enter a vehicle-for-hire, either as input by the specific passenger through an input device of an associated user device (e.g., a mobile communications device 200), determined by a location service application installed on the user device, or determined by a remote server (e.g., ridesharing management server 150) in response to a ride request from the specific passenger. A drop-off location may refer to a location where the specific passenger requests to be taken to, including for example, a drop off-point located at or near a particular destination point (e.g., an entrance of a different building) or a location determined by the remote server (e.g., ridesharing management server 150) in response to a ride request from the specific passenger.

In some embodiments, communications module 1810 may also receive from the at least one sensor traffic data associated with the drop-off location, when the autonomous vehicle-for-hire is in a vicinity of the drop-off location. For example, the at least one sensor may include a camera, a radar, a Lidar, or any combination thereof, as discussed below with respect to FIG. 19. In such embodiments, communications module 1810 may receive the traffic data including image data from the camera and/or distance data from the radar and/or the Lidar. This traffic data may then be analyzed, as described below with respect to traffic data module 1830.

Additionally or alternatively, the at least one sensor may include a microphone, a compass, an anemometer, a speedometer, an accelerometer, or the like. In such embodiments, communications module 1810 may receive the traffic data including measurements from the at least one sensor. This traffic data may then be analyzed, as described below with respect to traffic data module 1830.

Communications module 1810 may additionally or alternatively receive from the at least one sensor configured to sense traffic conditions in a vicinity of the vehicle-for-hire traffic data associated with the pick-up location. For example, communications module 1810 may receive the traffic data before picking up the specific passenger at the pick-up location.

In any of the embodiments described above, communications module 1810 may request and receive information over a computer network to supplement the traffic data received from the at least one sensor. For example, communications module 1810 may receive weather information, traffic information, road maintenance information, or the like from the remote server and/or from one or more additional servers using, for example, the Internet. This supplemental information may be used in the analysis performed by traffic data module 1830, as described below.

Communications module 1810 may also transmit data. For example, in embodiments where the pick-up location is adjusted, communications module 1810 may cause a message including a description of the alternative pick-up location to be transmitted to the specific passenger. Similarly, in embodiments where the drop-off location is adjusted, communications module 1810 may provide an indication to the specific passenger about a change in a drop-off location.

Communications module 1810 may transmit the message and/or indication over one or more computer networks (e.g., the Internet or the like) to a user device (e.g., a mobile communications device 200) associated with the specific passenger. Alternatively, if the user device is directly paired with the vehicle-for-hire (e.g., via a wired or wireless connection), communications module 1810 may transmit the message and/or indication directly to the user device. Alternatively, communications module 1810 may transmit the message and/or indication to the remote server over one or more computer networks (e.g., the Internet or the like). The remote server may then relay the message and/or indication to the user device, e.g., by using one or more computer networks.

The message and/or indication may include coordinates the alternative pick-up or drop-off location (e.g., GPS coordinates, a physical address, or the like), a verbal description of the alternative pick-up or drop-off location (e.g., 100 meters down the street, next to the Starbucks®, or the like), an image of the alternative pick-up or drop-off location (e.g., retrieved from local or remote databases of street-level images), or the like. Moreover, the message and/or indication may comprise a push notification, a text message, an indication sent to an app running on the user device for displaying to the user, or the like.

Vehicle direction module 1820 may electronically direct the autonomous vehicle to pick up the specific passenger at the pick-up location. For example, vehicle direction module 1820 may send commands to a driving-control device 120F associated with the vehicle-for-hire. Alternatively, vehicle direction module 1820 may operate using a memory and/or a processor of driving-control device 120F.

Vehicle direction module 1820 may therefore control one or more components of the vehicle-for-hire. For example, vehicle direction module 1820 may control an accelerator, brake, steering mechanism, or the like of the vehicle-for-hire. Additionally, vehicle direction module 1820 may control signaling components such as turn signals, a horn, or the like of the vehicle-for-hire.

In alternative embodiments, vehicle direction module 1820 may send commands to a human driver of the vehicle-for-hire rather than autonomously controlling the vehicle-for-hire. Accordingly, vehicle direction module 1820 may send directions for display to the driver to a driver device (e.g., driver device 120D-F) associated with the vehicle-for-hire. The directions may be sent using communications module 1810.

In embodiments where the pick-up location is adjusted, vehicle direction module 1820 may direct the vehicle-for-hire to the alternative pick-up location to pick up the specific passenger at the alternative pick-up location. Furthermore, vehicle direction module 1820 may, after picking up the specific passenger, electronically direct the autonomous vehicle-for-hire to drop off the specific passenger at the drop-off location. In embodiments where the drop-off location is adjusted, vehicle direction module 1820 may direct the vehicle-for-hire to the alternative location to drop off the specific passenger at the alternative location.

Traffic data module 1830 may enable a comparison of the traffic data obtained from the at least one sensor with safety data to determine whether dropping off the specific passenger at the drop-off location complies with a safety threshold. For example, as explained above, the at least one sensor may include a camera, a radar, a Lidar, or any combination thereof. In such embodiments, traffic data module 1830 may use image data from the camera and/or distance data from the radar and/or the Lidar to perform the comparison.

In one example, traffic data module 1830 may use one or more classifiers, neural networks, or other object discriminators on the image data to detect and identify objects such as vehicles (whether parked or driving behind, in front of, and/or next to the vehicle-for-hire), pedestrians, sidewalks, medians, traffic lights, or the like. In embodiments where the at least one sensor includes radar and/or Lidar, traffic data module 1830 may first construct a point cloud or other three-dimensional image based on the distance data received from the radar and/or Lidar and use one or more classifiers, neural networks, or other object discriminators on the point cloud. Although these analyses may be separate, they may be combined. For example, traffic data module 1830 may use one or more classifiers, neural networks, or other object discriminators on a three-dimensional representation of the vicinity of the vehicle-for-hire derived from combining the point cloud with the image data.

In some embodiments, the image data and/or distance data may be derived from a plurality of sensors. For example, a plurality of cameras may capture a plurality of images that may be assembled together for a more detailed imaging of the vicinity of the vehicle-for-hire. Additionally or alternatively, a plurality of radars and/or Lidars may capture distance measurements over a plurality of fields of view that may be assembled together for a more detailed point cloud of the vicinity of the vehicle-for-hire.

In some embodiments, the image data and/or distance data may have been captured over time. For example, the image data and/or distance data may correspond to the current vicinity of the vehicle-for-hire as well as previous vicinities, such as those from when the vehicle-for-hire was within a threshold distance of the pick-up location and/or the drop-off location.

Accordingly, the safety threshold may relate to the detected objects in the image data and/or the point cloud. For example, the safety threshold may take into account at least one of: parked vehicles obstructing the drop-off or pickup location, traffic obstructions, and road maintenance. Parked vehicles may be detected using the object detection described above, as may traffic obstructions (e.g., by detecting other vehicles on the road and not parked) and indications of road maintenance (e.g., by detecting construction workers, cones or other barriers, constructions vehicles such as trucks, cement mixers, or the like, or other objects indicative of maintenance).

In some embodiments, the safety threshold may be a combination of weighted parameters determined to ensure that passengers are not picked up or dropped off at a hazardous location. In such embodiments, the weighted parameters may be associated with at least two of: parked vehicles obstructing the drop-off location, traffic obstructions, road maintenance, weather conditions, and a distance from a sidewalk. As explained above, parked vehicle, traffic obstructions, and road maintenance may be detected using object detection. Moreover, weather conditions may be detected using object detection (e.g., by determining the slickness of a sidewalk or road based on image data and/or reflectivity data from the radar and/or Lidar or by detecting rain, snow, or the like in the image data) as may sidewalk distances (e.g., by detecting a sidewalk in the point cloud, by detecting a sidewalk in the image data and performing triangulation or other distance estimation, or the like).

Additionally or alternatively, the at least one sensor may include a microphone, a compass, an anemometer, a speedometer, an accelerometer, or the like, may be used. In such embodiments, traffic data module 1830 may use measurements from the at least one sensor to perform the comparison. For example, traffic data module 1830 may analyze sound data from the microphone to determine traffic obstructions (e.g., by detecting horn honking, lots of vehicle engines, or the like) or road maintenance (e.g., by detecting construction noises or the like). Additionally or alternatively, traffic data module 1830 may analyze data from the anemometer or other similar sensor to determine weather conditions. Additionally or alternatively, traffic data module 1830 may analyze data from the speedometer, accelerometer, or the like to determine traffic obstructions (e.g., by detecting frequent accelerations and decelerations, by detection speeds below a speed limit associated with a road on which the vehicle-for-hire is traveling, or the like).

In some embodiments, at least one camera, radar, and/or Lidar may be combined with one or more of a microphone, a compass, an anemometer, a speedometer, an accelerometer, or the like. For example, detection of traffic obstructions may depend on a combination of detecting vehicles in the image data and/or point cloud and detecting traffic noises or patterns of acceleration and/or speed consistent with traffic obstructions. In another example, detection of road maintenance may depend on a combination of detecting construction workers, construction vehicles, or the like in the image data and/or point cloud and detecting noises consistent with construction activity. In another example, detection of weather conditions may depend on a combination of detecting rain, snow, or the like in the image data and/or point cloud and detecting meteorological data from an anemometer or other similar sensor consistent with the detected weather.

Traffic data module 1830 may use information received over a computer network to supplement the traffic data received from the at least one sensor. For example, traffic data module 1830 may use weather information, traffic information, road maintenance information, or the like from the remote server and/or from one or more additional servers. Accordingly, this information may supplement the traffic data from the at least one sensor. For example, the traffic data may be analyzed to confirm weather, traffic, road maintenance, or the like expected at the drop-off location based on the information received over the computer network.

When it is determined that a drop off at the drop-off location fails to meet the safety threshold, traffic data module 1830 may enable analysis of the traffic data obtained from the at least one sensor to identify an alternative location, in a vicinity of the drop-off location, that complies the safety threshold. For example, as explained above, the at least one sensor may include a camera, a radar, a Lidar, or any combination thereof. In such embodiments, traffic data module 1830 may use image data from the camera and/or distance data from the radar and/or the Lidar to perform the analysis.

In one example, traffic data module 1830 may use one or more classifiers, neural networks, or other object discriminators on the image data to detect and identify objects such as vehicles (whether parked or driving behind, in front of, and/or next to the vehicle-for-hire), pedestrians, sidewalks, medians, traffic lights, or the like. In embodiments where the at least one sensor includes radar and/or Lidar, traffic data module 1830 may first construct a point cloud or other three-dimensional image based on the distance data received from the radar and/or Lidar and use one or more classifiers, neural networks, or other object discriminators on the point cloud. Although these analyses may be separate, they may be combined. For example, traffic data module 1830 may use one or more classifiers, neural networks, or other object discriminators on a three-dimensional representation of the vicinity of the vehicle-for-hire derived from combining the point cloud with the image data.

As explained above, the object detection may be assessed against the safety threshold. Accordingly, traffic data module 1830 may identify alternative locations in the image data and/or distance data and assess those locations against the safety threshold similarly to the assessment of the drop-off location described above. Traffic data module 1830 may randomly or sequentially assess possible alternative locations or may use one or more algorithms to identify optimal alternative locations. For example, traffic data module 1830 may prioritize assessment of street corners, curbside locations near building entrances, or the like over other possible alternative locations.

Additionally or alternatively, the at least one sensor may include a microphone, a compass, an anemometer, a speedometer, an accelerometer, or the like. In such embodiments, traffic data module 1830 may use measurements from the at least one sensor to perform the analysis. For example, traffic data module 1830 may analyze sound data captured by the microphone near a possible alternative location to determine traffic obstructions (e.g., by detecting horn honking, lots of vehicle engines, or the like) or road maintenance (e.g., by detecting construction noises or the like). Additionally or alternatively, traffic data module 1830 may analyze data from the anemometer or other similar sensor captured near a possible alternative location to determine weather conditions. Additionally or alternatively, traffic data module 1830 may analyze data captured by the speedometer, accelerometer, or the like near a possible alternative location to determine traffic obstructions (e.g., by detecting frequent accelerations and decelerations, by detection speeds below a speed limit associated with a road on which the vehicle-for-hire is traveling, or the like).

In some embodiments, at least one camera, radar, and/or Lidar may be combined with one or more of a microphone, a compass, an anemometer, a speedometer, an accelerometer, or the like. For example, detection of traffic obstructions, road maintenance, weather conditions, or the like may depend on combinations as explained above.

Traffic data module 1830 may use information received over a computer network to supplement the traffic data received from the at least one sensor. For example, traffic data module 1830 may use weather information, traffic information, road maintenance information, or the like from the remote server and/or from one or more additional servers. Accordingly, this information may supplement the traffic data from the at least one sensor. For example, the traffic data may be analyzed to confirm weather, traffic, road maintenance, or the like expected at possible alternative locations based on the information received over the computer network.

In some embodiments, traffic data module 1830 may identify a plurality of possible alternative locations and select one as the alternative location. The selection may be based, for example, on a ranking of the alternative locations based on the safety threshold. For example, each possible alternative location may be assessed and scored (e.g., using a score out of a maximum, using a percentage score, using a letter grade, or the like) against the safety threshold. The possible alternative locations may then be ranked and the top scoring one selected. Additionally or alternatively, the ranking may account for the scoring and the distance from the drop-off location such that safety is balanced with inconvenience. In such an embodiment, a threshold may be applied to the scorings such that very close alternative locations are not selected if an associated score is too low.

Additionally or alternatively, traffic data module 1830 may enable a comparison of the traffic data obtained from the at least one sensor with safety data to determine whether picking up the specific passenger at the pick-up location complies with a safety threshold and determine that a pick up at the pick-up location fails to meet the safety threshold. Accordingly, traffic data module 1830 may analyze the traffic data obtained from the at least one sensor to identify an alternative pick-up location, in a vicinity of the pick-up location, that complies the safety threshold. For example, the analyses for the pick-up location may be similar to those described above for the drop-off location.

In any of the embodiments described above, the safety threshold may be dynamic rather than static. For example, traffic data module 1830 may receive from the remote server (e.g., using communications module 1810) data characterizing the specific passenger and determine a value of the safety threshold based on the received data. In such an example, if the characterizing data indicates that the specific passenger is small child (e.g., below a certain age) or intoxicated, the traffic data module 1830 may increase the safety threshold. In embodiments where the safety threshold is a combination of weighted parameters, the increase may be affected by adjusting one or more of the weighted parameters, e.g., by reducing a thresholding number of parked vehicles, reducing a threshold of traffic obstructions, increasing a sensitivity to inclement weather such as rain or snow, decreasing a threshold distance to the sidewalk, or the like. Additionally or alternatively, the weights may be adjusted to prioritize particular parameters based on the characterizing data. For example, characterizing data indicating that the specific passenger is intoxicated may result in an adjustment of one or more weights towards a distance to the sidewalk. In another example, characterizing data indicating that the specific passenger is below an age threshold may result in an adjustment of one or more weights towards traffic obstructions.

Database access module 1840 may cooperate with database 1850 to retrieve map information, traffic data, environmental condition data, and/or any associated stored data or metadata. For example, database access module 1840 may send a database query to database 1850. Database 1850 may include a map vector-based database or a map raster-based database, and database access module 1840 may be configured to extract a map image from a larger pre-assembled map image, which may be delivered to, for example, user device 120A-C or driver device 120D-F for display, and/or to driving-control device 120F for use in navigation. In some embodiments, instead of a vector-based or raster-based system, a tile-based system may be implemented from database 1950. For example, database access module 1840 may instruct processor 204 to send a request for map data to an external map tile server, and mobile devices 120A-F may receive a set of map tiles corresponding to a ride request. In other embodiments, database access module 1840 may instruct a tile maker program module to divide raster images into a plurality of discrete map tiles from a painter library or rich map engine library that is commercially available. Database access module 1840 may instruct processor 204 to compile a received set of cut map tiles in a grid, position the tile grid with respect to a clipping shape, and may output the grid as a single map as part of a user or driver side ridesharing application displayed within a GUI or web browser of mobile devices 120A-F. Database access module 1840 may select map information in accordance with GPS data and the pick-up and drop-off locations specified by the specific user, a location of the autonomous vehicle-for-hire, and identified locations of traffic obstructions.

Database 1850 may be configured to store any type of information of use to modules 1810-1830, depending on implementation-specific considerations. For example, in embodiments in which traffic data module 1830 is configured to analyze weather information, traffic information, road maintenance information, or the like, database 1850 may also retrieve this information if stored. In another example, in embodiments in which vehicle direction module 1820 uses map information to direct the autonomous vehicle-for-hire, database 1850 may retrieve this information.

In some embodiments, database 1850 may include separate databases, including, for example, a vector database, raster database, tile database, viewport database, and/or a user input database, configured to store data. The data stored in database 1850 may be received from modules 1810-1830, ridesharing management server 150, from user devices 120A-F and/or may be provided as input using data entry, data transfer, or data uploading. The data stored in the database 1850 may represent multiple data forms including, for example, general mapping and geographic information, latitude and longitude (Lat/Lon) values, world coordinates, tile coordinates, pixel coordinates, Mercator and/or other map projection data, user identifier data, driver identifier data, vehicle identifier data, device type data, viewport data, device orientation data, user input data, geographical scale data, and a variety of other electronic data. Database 1850 may also include, for example, street, city, state, and country data including landmark identifiers and other related information. Database 1850 may also include search logs, cookies, web pages, and/or social network content, etc.

Modules 1810-1840 may be implemented in software, hardware, firmware, a mix of any of those, or the like. For example, if the modules are implemented in software, the modules may be stored in a vehicle or in a driver device, such as 120D and 120E, associated with the vehicle. Additionally or alternatively, any one or more of modules 1810-1840 and data associated with database 1812, may, for example, be stored in processor 310 and/or located on ridesharing management server 150, which may include one or more processing devices. In some embodiments, aspects of modules 1810-1840 may include software, hardware, or firmware instructions (or a combination thereof) executable by one or more processors, alone or in various combinations with each other. For example, modules 1810-1840 may be configured to interact with each other to perform functions consistent with disclosed embodiments.

Figure 19:
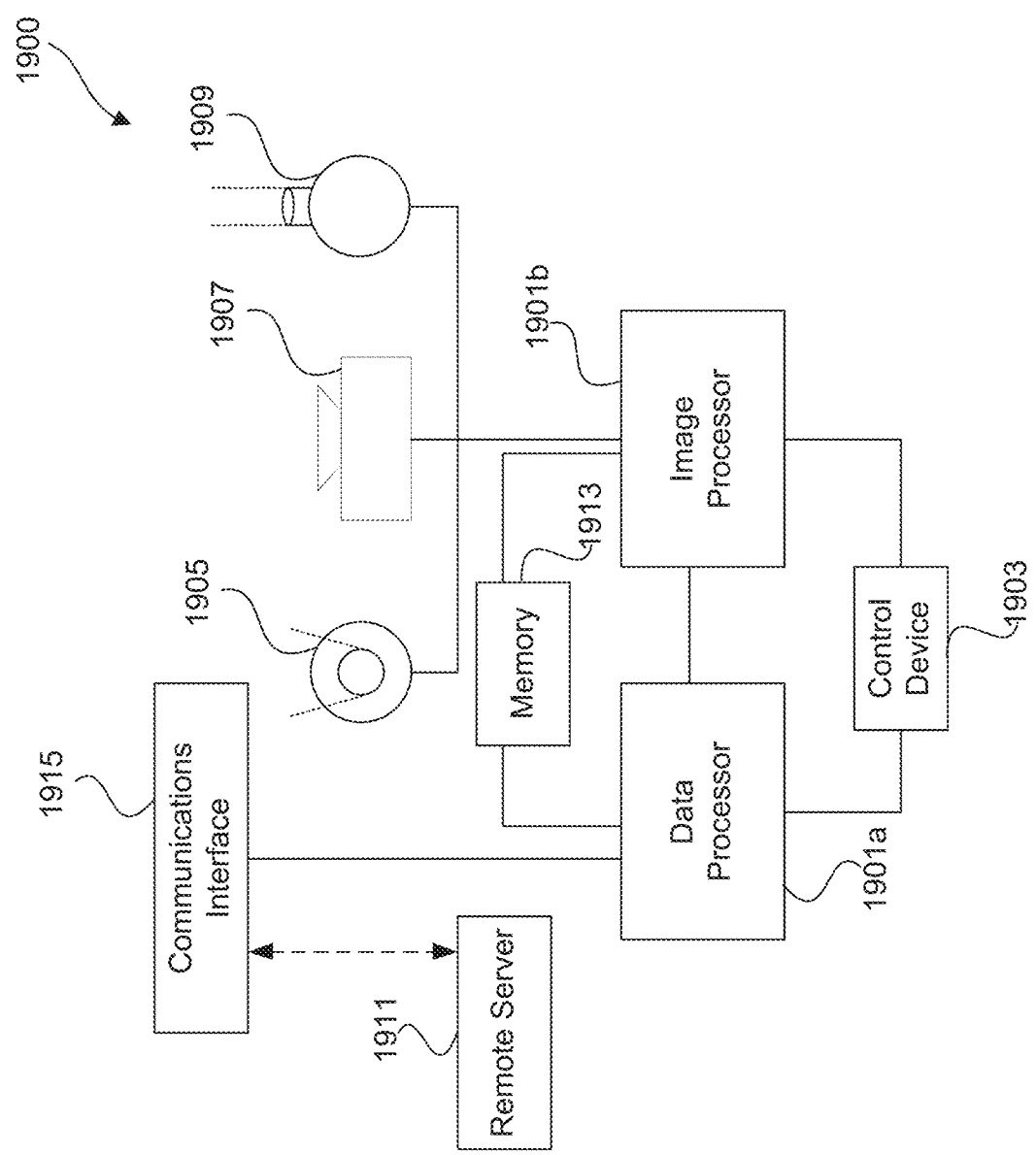
FIG. 19 is a diagram illustrating hardware of an exemplary autonomous vehicle-for-hire, in accordance with some embodiments of the present disclosure.

FIG. 19 is a block diagram representation of a vehicle 1900 for adjusting pick-up and/or drop-off locations, consistent with the exemplary disclosed embodiments. Vehicle 1900 may include various components depending on the requirements of a particular implementation. Alternatively, FIG. 19 may represent a driver device, such as 120D and 120E, paired to the vehicle. In some embodiments, vehicle 1900 may include one or more processors, such as a data processor 1901a, an image processor 1901b, and/or any other suitable processing device; a control device 1903; a radar 1905; one or more image acquisition devices, such as a camera 1907; a Lidar 1909; one or more memories, such as memory 1913; and a communications interface 1915 configured to communication with remote server 1911.

Similar to processors 204 of mobile communications device 200, both data processor 1901a and image processor 1901b may include various types of hardware-based processing devices. For example, either or both of applications processor 1901a and image processor 1901b may include a microprocessor, preprocessors (such as an image preprocessor), graphics processors, a central processing unit (CPU), support circuits, digital signal processors, integrated circuits, memory, or any other types of devices suitable for running applications and for image processing and analysis. In some embodiments, applications processor 1901a and/or image processor 1901b may include any type of single or multi-core processor, mobile device microcontroller, central processing unit, etc. Various processing devices may be used, including, for example, processors available from manufacturers such as Intel®, AMD®, etc. and may include various architectures (e.g., x86 processor, ARM®, etc.). Although FIG. 19 depicts two separate processing devices, more or fewer processing devices may be used. For example, in some embodiments, a single processing device may be used to accomplish the tasks of data processor 1901a and image processor 1901b. In other embodiments, these tasks may be performed by more than two processing devices.

Similar to driving-control device 120F of vehicle 130F, control device 1903 may include any type of device suitable for controlling vehicle 1900, which may render vehicle 1900 partially or fully autonomous. Control device 1903 may control one or more navigational devices of vehicle 1900 (not shown), such as a steering component, an accelerator, a brake, or the like.

Radar 1905 may include any type of device suitable for using radio waves to determine the range, angle, velocity, or the like of target objects. Similarly, Lidar 1909 may include any type of device suitable for using light waves to determine the range, angle, velocity, or the like of target objects.

Camera 1907 may include any type of device suitable for capturing at least one image from an environment. Moreover, although depicted in FIG. 19 as a single camera, any number of image capture devices may be used to acquire images for input to the image processor. Some embodiments may include only a single image capture device, while other embodiments may include two, three, or even four or more image capture devices.

Although depicted as including radar 1905, camera 1907, and Lidar 1909, system 1900 may use more or fewer sensing devices. For example, in some embodiments, system 1900 may use camera 1907 paired with Lidar 1909, radar 1905 paired with camera 1907, or the like. In other embodiments, additional sensors such as microphones, a compass, an anemometer, a speedometer, an accelerometer, or the like, may be used.

Memory 1913 may include software instructions that when executed by a processor (e.g., data processor 1901*a* and/or image processor 1901*b*), may control operation of various aspects of system 1900. These memory units may include various databases and image processing software, as well as a trained system, such as a neural network, or a deep neural network, for example. In another example, memory 1913 may include instructions for performing method 2010 of FIG. 20A and/or method 2050 of FIG. 20B, described below. Memory 1913 may include random access memory, read only memory, flash memory, disk drives, optical storage, tape storage, removable storage and/or any other types of storage. In some embodiments, memory 1913 may be a single memory. In other embodiments, memory 1913 may comprise a plurality of memories. In some embodiments, memory 1913 may be separate from data processor 1901*a* and/or image processor 1901*b*. In other embodiments, memory 1913 may be integrated, at least in part, into data processor 1901*a* and/or image processor 1901*b*.

Remote server 1911 may comprise, for example, ridesharing management server 150. Accordingly, remote server 1911 may assign ride requests to vehicle 1900. In some embodiments, remote server 1911 may additionally receive sensor data from vehicle 1900 for analysis, as described below.

Similar to communication subsystems 224, communications interface 1915 may include one or more devices configured to exchange transmissions over an air interface to the one or more computer networks (e.g., cellular, the Internet, etc.) by use of a radio frequency, infrared frequency, magnetic field, or an electric field. Communications interface 1915 may use any known standard to transmit and/or receive data (e.g., Wi-Fi, Bluetooth®, Bluetooth Smart, 802.15.4, ZigBee, etc.). Such transmissions may include communications from vehicle 1900 to one or more remotely located servers, e.g., remote server 1911. As explained above, remote server 1911 may transmit ride requests to vehicle 1900 using communications interface 1915. Additionally, vehicle 1900 may transmit data from radar 1905, camera 1907, Lidar 1909, or any other sensors to remote server 1911 for comparison against safety thresholds, and remote server 1911 may, in response, transmit alternative locations (e.g., for pick up or drop off) to vehicle 1900.

Figure 20A:
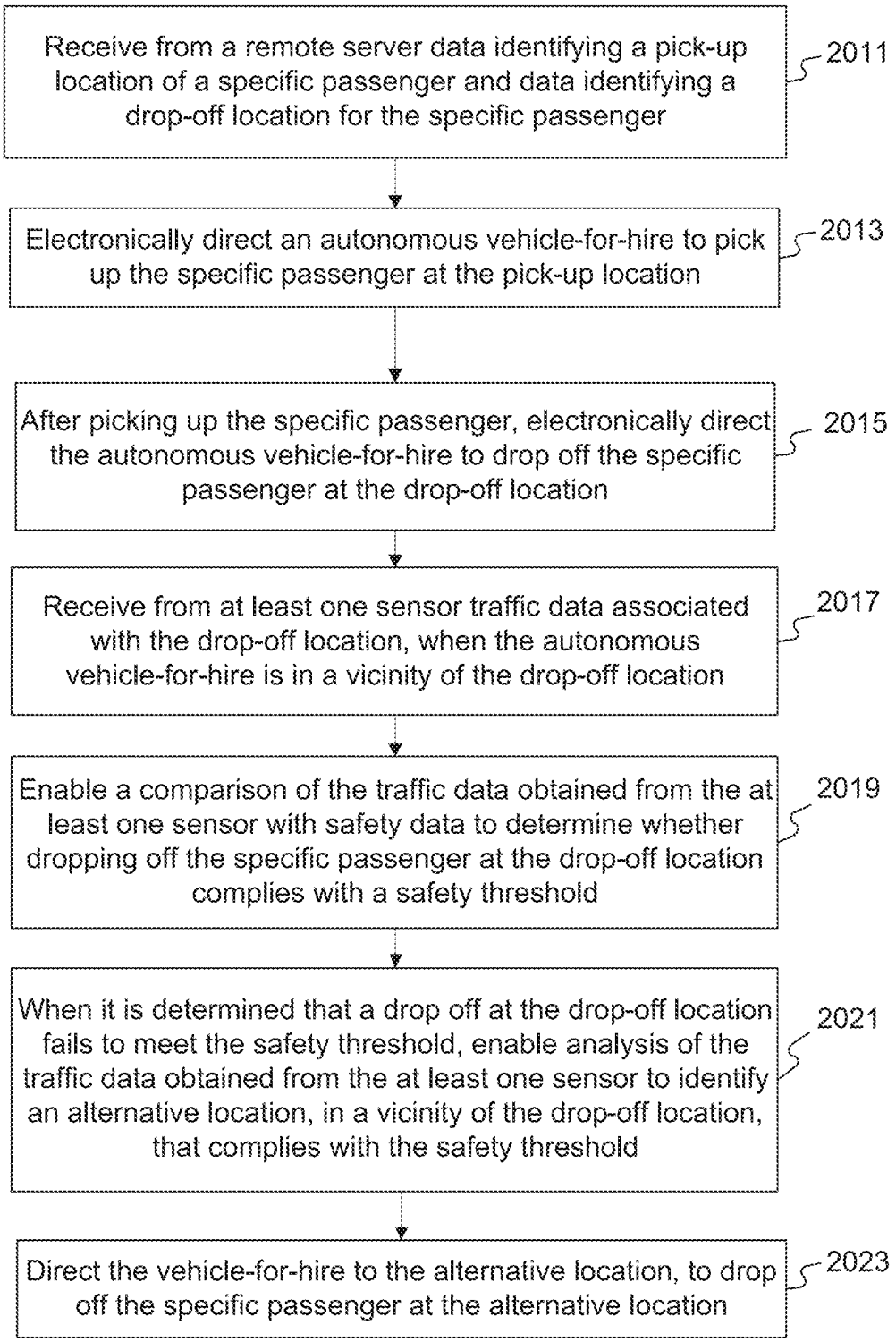
FIG. 20A is a diagram illustrating an example process for automatically adjusting a drop-off location, in accordance with some embodiments of the present disclosure.

FIG. 20A is a flowchart of an example of a method 2010 for dropping off passengers at a safe location. Steps of method 2100 may be performed by modules 1810-1840 described above implemented one or more processors and/or memory 250 of mobile communications device 200 and/or by one or more processors and/or memory 320 of server 150.

At step 2011, communications module 1810 may receive from a remote server (e.g., ridesharing management server 150) data identifying a pick-up location of a specific passenger and data identifying a drop-off location for the specific passenger. For example, communications module 1810 may include software instructions for communicating with the remote server configured to electronically receive ride requests from prospective passengers using a communications interface (e.g., a communications interface of communication subsystems 224).

At step 2013, vehicle direction module 1820 may electronically direct an autonomous vehicle-for-hire to pick up the specific passenger at the pick-up location. For example, vehicle direction module 1820 may control one or more components (e.g., an accelerator, a brake, a steering mechanism, or the like) of the vehicle (e.g., using driving-control device 120F).

At step 2015, after picking up the specific passenger, vehicle direction module 1820 may electronically direct the autonomous vehicle-for-hire to drop off the specific passenger at the drop-off location. For example, vehicle direction module 1820 may control one or more components (e.g., an accelerator, a brake, a steering mechanism, or the like) of the vehicle (e.g., using driving-control device 120F).

At step 2017, communications module 1810 may receive from at least one sensor traffic data associated with the drop-off location, when the autonomous vehicle-for-hire is in a vicinity of the drop-off location. For example, as described above with respect to FIG. 19, the at least one sensor may include at least one of an image sensor, a lidar sensor, a radar sensor.

At step 2019, traffic data module 1830 may enable a comparison of the traffic data obtained from the at least one sensor with safety data to determine whether dropping off the specific passenger at the drop-off location complies with a safety threshold. For example, as explained above with respect to traffic data module 1830, images or other data from the at least one sensor may be analyzed to identify objects (such as sidewalks, parked vehicles, or the like) which are then assessed against the safety threshold. In some embodiments, data received using communications module 1810, such as weather updates, road maintenance updates, or the like, may be used in combination with the image analysis.

In some embodiments, enabling a comparison of the traffic data obtained from the at least one sensor with the safety data to determine whether dropping off the specific passenger at the drop-off location complies with the safety threshold may include wireless transmission of information derived from the traffic data to the at least one remote server. In such embodiments, enabling a comparison may further include receiving, in response, information indicative whether the safety threshold is met.

Additionally or alternatively, enabling a comparison of the traffic data obtained from the at least one sensor with the safety data to determine whether dropping off the specific passenger at the drop-off location complies with the safety threshold may include accessing memory, within the vehicle-for-hire (e.g., memory 250 of a mobile communications device 200 associated with the vehicle-for-hire), containing information indicative of the safety threshold, and determining, within the vehicle-for-hire, whether the safety threshold is met.

At step 2021, when it is determined that a drop off at the drop-off location fails to meet the safety threshold, traffic data module 1830 may enable analysis of the traffic data obtained from the at least one sensor to identify an alternative location, in a vicinity of the drop-off location, that complies the safety threshold. For example, traffic data module 1830 may assess images or other data from the at least one sensor may be analyzed to identify objects (such as sidewalks, parked vehicles, or the like) which are then scanned to identify one or more locations satisfying the safety threshold. In some embodiments, data received using communications module 1810, such as weather updates, road maintenance updates, or the like, may be used in combination with the image analysis to identify the locations.

In some embodiments, traffic data module 1830 may analyze the traffic data obtained from the at least one sensor to identify an alternative location, in a vicinity of the drop-off location, that complies the safety threshold. For example, traffic data module 1830 may identify a plurality of possible alternative locations and select one as the alternative location. The selection may be based, for example, on a ranking of the alternative locations based on the safety threshold.

As explained above, the safety threshold may be a combination of weighted parameters determined to ensure that passengers are not picked up or dropped off at a hazardous location. In such embodiments, the weighted parameters may be associated with at least two of: parked vehicles obstructing the drop-off location, traffic obstructions, road maintenance, weather conditions, and a distance from a sidewalk.

Accordingly, the alternative location may be an available curbside location in a vicinity of the drop-off location. Additionally or alternatively, the drop-off location associated with the specific passenger may also be a pick-up location of a prospective passenger. Accordingly, method 2010 may further include identifying the prospective passenger waiting at a location in the vicinity of the drop-off location, the waiting location complying with the safety threshold, and directing the vehicle-for-hire to the waiting location to drop off the specific passenger and to pick up the prospective passenger.

At step 2023, vehicle direction module 1820 may direct the vehicle-for-hire to the alternative location, to drop off the specific passenger at the alternative location. For example, vehicle direction module 1820 may control one or more components (e.g., an accelerator, a brake, a steering mechanism, or the like) of the vehicle (e.g., using driving-control device 120F).

In some embodiments, method 2010 may further include additional steps. For example, method 2010 may further include receiving from the remote server data characterizing the specific passenger and determining a value of the safety threshold based on the received data. For example, if the characterizing data indicates that the specific passenger is elderly (e.g., above a certain age) or disabled, the traffic data module 1830 may increase the safety threshold. In such an example, the increase may be affected by adjusting one or more of the weighted parameters, e.g., by reducing a thresholding number of parked vehicles, reducing a threshold of traffic obstructions, increasing a sensitivity to inclement weather such as rain or snow, decreasing a threshold distance to the sidewalk, or the like. Additionally or alternatively, the weights may be adjusted to prioritize particular parameters based on the characterizing data. For example, characterizing data indicating that the specific passenger is in a wheelchair may result in an adjustment of one or more weights towards a distance to the sidewalk. In another example, characterizing data indicating that the specific passenger is above an age threshold may result in an adjustment of one or more weights towards traffic obstructions.

In an additional or alternative example, method 2010 may further include, before picking up the specific passenger at the pick-up location, receiving from the at least one sensor traffic data associated with the pick-up location when the vehicle-for-hire is in a vicinity of the pick-up location and enabling a comparison of the traffic data obtained from the at least one sensor with safety data to determine whether picking up the specific passenger at the pick-up location complies with a safety threshold. In such embodiments, method 2010 may further include determining that a pick up at the pick-up location fails to meet the safety threshold and analyzing the traffic data obtained from the at least one sensor to identify an alternative pick-up location, in a vicinity of the pick-up location, that complies the safety threshold. Additionally, method 2010 may further include directing the vehicle-for-hire to the alternative pick-up location, to pick up the specific passenger at the alternative pick-up location. Accordingly, method 2010 may include automatically adjusting the pick-up location based on a safety threshold in addition to automatically adjusting the drop-off location. The safety threshold applied to the pick-up location may be the same threshold or a different threshold than that applied to the drop-off location.

In any of the embodiments described above, method 2010 may further include providing an indication to the specific passenger about a change in a drop-off location. For example, communications module 1810 may send an alert (e.g., via the remote server using a communications interface of communication subsystems 224) to a user device associated with the specific passenger. For example, the alert may comprise a push notification, a text message, an indication sent to an app running on the user device for displaying to the user, or the like. In embodiments where the pick-up location is also adjusted, method 2010 may further include causing a message including a description of the alternative pick-up location to be transmitted to the specific passenger.

Figure 20B:
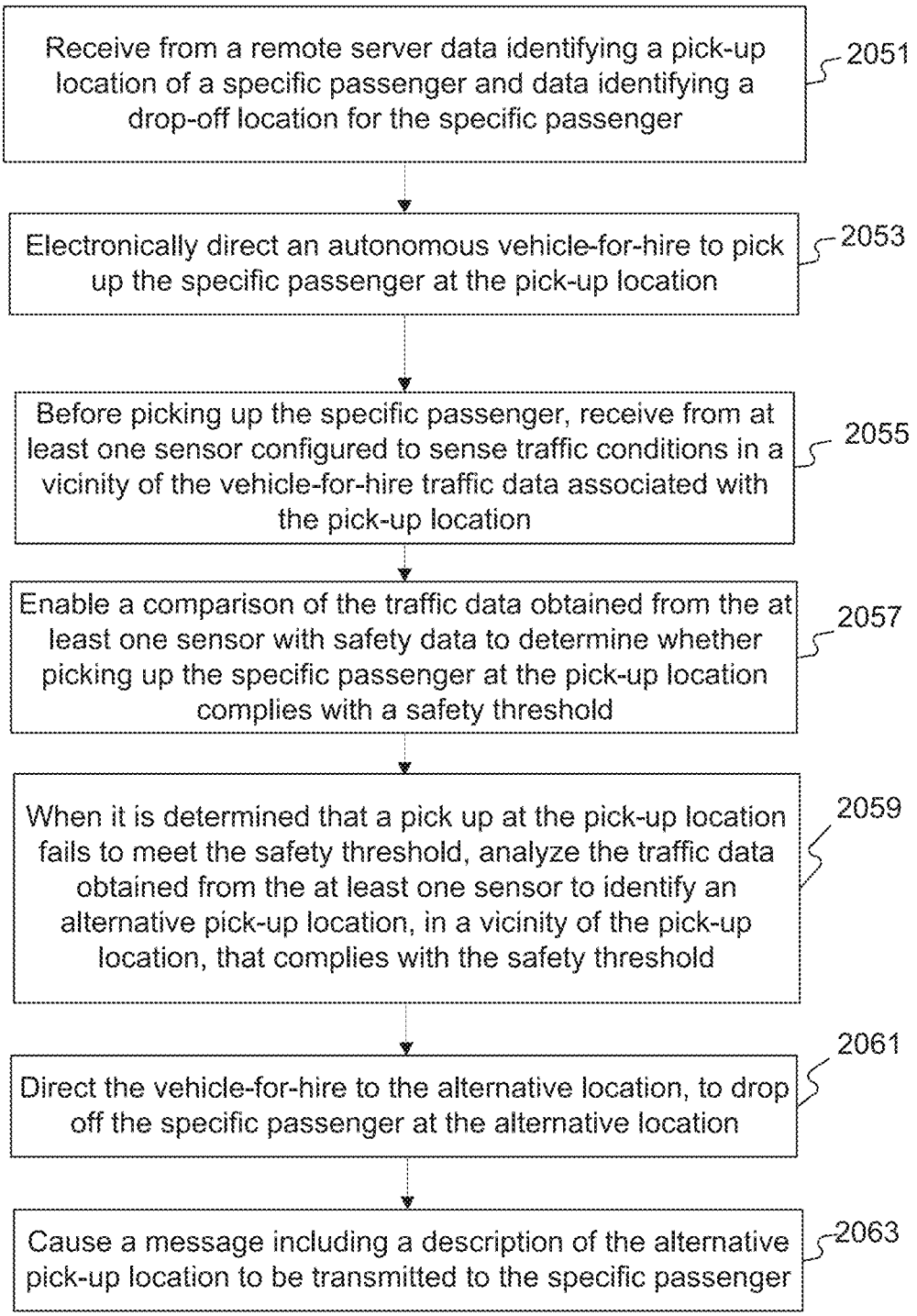
FIG. 20B is a diagram illustrating an example process for automatically adjusting a pick-up location, in accordance with some embodiments of the present disclosure.

FIG. 20B is a flowchart of an example of another method 2050 for picking up passengers at a safe location. Steps of method 2000 may be performed by modules 1810-1840 described above implemented one or more processors and/or memory 250 of mobile communications device 200 and/or by one or more processors and/or memory 320 of server 150.

In some embodiments, communications module 1810 may communicate with a remote server (e.g., ridesharing management server 150) configured to electronically receive ride requests from prospective passengers. Accordingly, at step 2051, communications module 1810 may receive from the remote server data identifying a pick-up location of a specific passenger and data identifying a drop-off location for the specific passenger. For example, communications module 1810 may include software instructions for communicating with the remote server configured to electronically receive ride requests from prospective passengers using a communications interface (e.g., a communications interface of communication subsystems 224).

At step 2053, vehicle direction module 1820 may electronically direct an autonomous vehicle to pick up the specific passenger at the pick-up location. For example, vehicle direction module 1820 may control one or more components (e.g., an accelerator, a brake, a steering mechanism, or the like) of the vehicle (e.g., using driving-control device 120F).

At step 2055, before picking up the specific passenger at the pick-up location, communications module 1810 may receive from at least one sensor configured to sense traffic conditions in a vicinity of the vehicle-for-hire traffic data associated with the pick-up location. For example, as described above with respect to FIG. 19, the at least one sensor may include at least one of an image sensor, a lidar sensor, a radar sensor.

At step 2057, traffic data module 1830 may enable a comparison of the traffic data obtained from the at least one sensor with safety data to determine whether picking up the specific passenger at the pick-up location complies with a safety threshold. For example, as explained above with respect to traffic data module 1830, images or other data from the at least one sensor may be analyzed to identify objects (such as sidewalks, parked vehicles, or the like) which are then assessed against the safety threshold. In some embodiments, data received using communications module 1810, such as weather updates, road maintenance updates, or the like, may be used in combination with the image analysis.

In some embodiments, enabling a comparison of the traffic data obtained from the at least one sensor with the safety data to determine whether picking up the specific passenger at the pick-up location complies with the safety threshold may include wireless transmission of information derived from the traffic data to the at least one remote server. In such embodiments, enabling a comparison may further include receiving, in response, information indicative whether the safety threshold is met.

Additionally or alternatively, enabling a comparison of the traffic data obtained from the at least one sensor with the safety data to determine whether picking up the specific passenger at the pick-up location complies with the safety threshold may include accessing memory, within the vehicle-for-hire (e.g., memory 250 of a mobile communications device 200 associated with the vehicle-for-hire), containing information indicative of the safety threshold, and determining, within the vehicle-for-hire, whether the safety threshold is met.

At step 2059, traffic data module 1830 may determine that a pick up at the pick-up location fails to meet the safety threshold and analyze the traffic data obtained from the at least one sensor to identify an alternative pick-up location, in a vicinity of the pick-up location, that complies the safety threshold.

In some embodiments, traffic data module 1830 may analyze the traffic data obtained from the at least one sensor to identify an alternative location, in a vicinity of the drop-off location, that complies the safety threshold. For example, traffic data module 1830 may identify a plurality of possible alternative locations and select one as the alternative location. The selection may be based, for example, on a ranking of the alternative locations based on the safety threshold.

As explained above, the safety threshold may be a combination of weighted parameters determined to ensure that passengers are not picked up or dropped off at a hazardous location. In such embodiments, the weighted parameters may be associated with at least two of: parked vehicles obstructing the drop-off location, traffic obstructions, road maintenance, weather conditions, and a distance from a sidewalk.

At step 2061, vehicle direction module 1820 may direct the vehicle-for-hire to the alternative pick-up location, to pick up the specific passenger at the alternative pick-up location. For example, vehicle direction module 1820 may control one or more components (e.g., an accelerator, a brake, a steering mechanism, or the like) of the vehicle (e.g., using driving-control device 120F).

At step 2063, communications module 1810 may cause a message including a description of the alternative pick-up location to be transmitted to the specific passenger. For example, communications module 1810 may send an alert (e.g., via the remote server using a communications interface of communication subsystems 224) to a user device associated with the specific passenger. For example, the alert may comprise a push notification, a text message, an indication sent to an app running on the user device for displaying to the user, or the like.

In some embodiments, method 2050 may further include additional steps. For example, method 2050 may further include receiving from the remote server data characterizing the specific passenger and determining a value of the safety threshold based on the received data. For example, if the characterizing data indicates that the specific passenger is elderly (e.g., above a certain age) or disabled, the traffic data module 1830 may increase the safety threshold. In such an example, the increase may be affected by adjusting one or more of the weighted parameters, e.g., by reducing a thresholding number of parked vehicles, reducing a threshold of traffic obstructions, increasing a sensitivity to inclement weather such as rain or snow, decreasing a threshold distance to the sidewalk, or the like. Additionally or alternatively, the weights may be adjusted to prioritize particular parameters based on the characterizing data. For example, characterizing data indicating that the specific passenger is in a wheelchair may result in an adjustment of one or more weights towards a distance to the sidewalk. In another example, characterizing data indicating that the specific passenger is above an age threshold may result in an adjustment of one or more weights towards traffic obstructions.

In an additional or alternative example, method 2050 may further include receiving from the at least one sensor traffic data associated with the drop-off location, when the autonomous vehicle-for-hire is in a vicinity of the drop-off location, and enabling a comparison of the traffic data obtained from the at least one sensor with safety data to determine whether dropping off the specific passenger at the drop-off location complies with a safety threshold. In such embodiments, method 2050 may further include, when it is determined that a drop off at the drop-off location fails to meet the safety threshold, enabling analysis of the traffic data obtained from the at least one sensor to identify an alternative location, in a vicinity of the drop-off location, that complies the safety threshold. Additionally, method 2050 may further include directing the vehicle-for-hire to the alternative location, to drop off the specific passenger at the alternative location. Accordingly, method 2050 may include automatically adjusting the drop-off location based on a safety threshold in addition to automatically adjusting the pick-up location. The safety threshold applied to the drop-off location may be the same threshold or a different threshold than that applied to the pick-up location.

In embodiments where the drop-off location is also adjusted, method 2050 may further include providing an indication to the specific passenger about a change in a drop-off location.

Prescheduling a Rideshare with an Unknown Pick-Up Location

Consistent with the following embodiments, a system (e.g., automated ridesharing dispatch system 300) may be configured to direct ridesharing vehicles to provide transportation services to on-demand users and to prescheduling users. On-demand users are individuals interested in a ride in the immediate future, e.g., within one minute, within 5 minutes, within 10 minutes, or within 30 minutes. After receiving a request from an on-demand user, the system is configured to find an available ridesharing vehicle and direct both the ridesharing vehicle and the on-demand user to meet up at a virtual bus stop. Typically, the time duration from when an on-demand user requests the ride until the on-demand user is picked up by a ridesharing vehicle is less than 45 minutes, less than 30 minutes, or less than 15 minutes. In contrast, prescheduling users are individuals interested in a ride in the non-immediate future, e.g., in the next hour, in the next 2 hours, in the next 4 hours, in the next 24 hours, or after 24 hours. After receiving a request from a prescheduling user, the system may store the request for future processing. At a certain time, prior to the requested pick-up time, the system may find an available ridesharing vehicle and direct both the ridesharing vehicle and the prescheduling user to meet up at a virtual bus stop. Typically, the time duration from when the prescheduling user requests the ride until the prescheduling user is picked up by a ridesharing vehicle may be greater than one hour, 2 hours, 4 hours, 24 hours, or great than 24 hours. While the general concept of prescheduling a ride is known, existing prescheduling services are inflexible and inefficiently use the resources of their fleet of vehicles. A classic example for the inefficiently of existing prescheduling services is when a user stays at a hotel and wants to share a ride to the airport. Existing prescheduling service may offer to pick up the user from the hotel, but only at predetermined times that fit the service's pick-up schedule. In most cases, the vehicle assigned to pick up the user from the hotel is a vehicle dedicated for transporting hotel guests to the airport, and it cannot tolerate real-time changes (e.g., unexpected passengers). Also, it is very common for an almost full vehicle to undertake a substantial detour to pick up a single passenger from a remote hotel, or for a fourteen-seater van to transport a single passenger to the airport. In contrast, as described in greater detail below, the system may store requests from prescheduling users and dynamically assign an available ridesharing vehicle considering real-time conditions. Moreover, the system can integrate prescheduling service with on-demand service to improve fleet management technology and to increase productivity.

Figure 21:
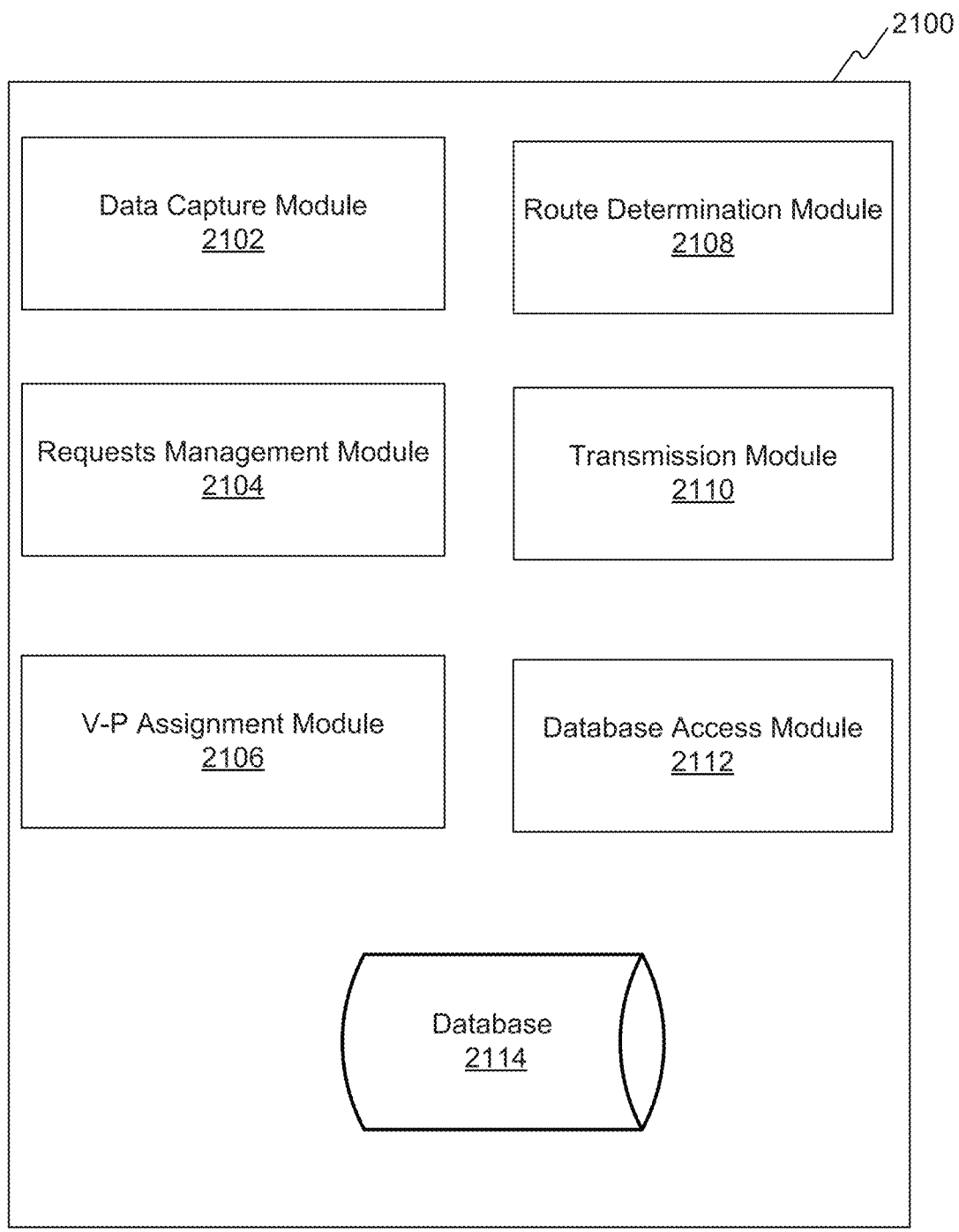
FIG. 21 is an exemplary embodiment of a memory containing software modules consistent with the present disclosure.

FIG. 21 illustrates an exemplary embodiment of a memory 2100 containing software modules consistent with the present disclosure. In particular, as shown, memory 2100 may include a data capture module 2102, a requests management module 2104, a vehicle-passenger (V-P) assignment module 2106, a route determination module 2108, a transmission module 2110, a database access module 2112, and a database 2114. Modules 2102, 2104, 2106, 2108, 2110, and 2112 may contain software instructions for execution by at least one processing device, e.g., processor 310, included with the suggested system. Data capture module 2102, requests management module 2104, V-P assignment module 2106, route determination module 2108, transmission module 2110, database access module 2112, and database 2114 may cooperate to perform multiple operations. For example, data capture module 2102 may receive ride requests from a plurality of users (e.g., prescheduling and on-demand users) and receive indications of current locations of the plurality of ridesharing vehicles. Requests management module 2104 may store at database 2114 requests from the prescheduling users and manage the requests from the prescheduling users and the on-demand users. In one implementation, requests management module 2104 may forward to V-P assignment module 2106 a request from a prescheduling user at least 30 minutes before the requested pick-up time. V-P assignment module 2106 may use information from data capture module 2102 and requests management module 2104 to assign a ridesharing vehicle to a plurality of users. For example, V-P assignment module 2106 may select a single ridesharing vehicle for transporting together prescheduling users and on-demand users based on the starting points and desired destinations of the prescheduling users and the on-demand users. Route determination module 2108 may determine a route for the selected ridesharing vehicle. For example, route determination module 2108 may determine a single shared pick-up location for one of the prescheduling users and one of the on-demand users. Transmission module 2110 may use a communications interface for sending, to a plurality of users, information about the pick-up location and for sending to the selected ridesharing vehicle driving directions based on the determined route. Database access module 2112 may interact with database 2114 which may store requests from prescheduling users and any other information associated with the functions of modules 2102-2112.

In some embodiments, memory 2100 may be included in, for example, memory 320. Alternatively or additionally, memory 2100 may be stored in an external database 170 (which may also be internal to ridesharing management server 150) or external storage communicatively coupled with ridesharing management server 150, such as one or more databases or memories accessible over network 140. Further, in other embodiments, the components of memory 2100 may be distributed in more than one server.

In some embodiments, data capture module 2102 may receive ride requests from a plurality of prescheduling users and on-demand users; each ride request may include information indicative of a starting point, a desired destination, and a requested pick-up time. The information indicative of the starting point may include a current location of the user, as inputted by each user through an input device of an associated user device or as determined by a location service application installed on the user device. The information indicative of the desired destination may refer to a location and/or address where the user desires to be taken to, for example, an entrance of a shopping center, or a stored location (e.g., home, work, etc.). The information indicative of the requested pick-up time may include a requested time to depart from the starting point and start walking toward the pick-up location, a requested time to be picked up by the ridesharing vehicle, or a requested time to reach the desired destination. In one embodiment, the system may determine when to pick up prescheduling users based on the requested times to reach their desired destinations. For example, the system may take into account the time to walk to the pick-up location from the starting point, predicted traffic conditions, the time to walk from the drop-off location to the desired destination, and more. For on-demand users the requested pick-up time may be assigned as ASAP (as soon as possible) according to, for example, a default setting. In some embodiments, data capture module 2102 may also receive from a plurality of communication devices associated with a plurality of ridesharing vehicles indications of current locations of the plurality of ridesharing vehicles. The current locations of the plurality of ridesharing vehicles may be determined by a location service application installed on a driver device, a driving-control device, or by a location determination component in the ridesharing management system 100, which may be a part of or separate from ridesharing management server 150. For example, the indications of current locations of the plurality of ridesharing vehicles may include global positioning system (GPS) data generated by at least one GPS component associated with each ridesharing vehicle.

In some embodiments, requests management module 2104 may include instructions configured to determine if the ridesharing requests originate from on-demand users or from prescheduling users, determine preference parameters for each ridesharing request, and timely forward the ridesharing requests to V-P assignment module 2106. In some embodiments, requests management module 2104 may include instructions configured to determine user preference parameters for each ridesharing request by accessing users' profiles stored in database 2114. For example, user preference parameters may include: a maximum walking distance from a starting point to a pick-up location, a maximum walking distance from a drop-off location to a desired destination, a total maximum walking distance involved in a ride, a maximum number of subsequent pick-ups, a maximum delay of arrival/detour incurred by subsequent pick-ups during a ride, and a selection whether to permit toll road usage during the ride, etc. The user preference parameters may be taken into account when ridesharing management server 150 selects a ridesharing vehicle to pick up the users. In some embodiments, requests management module 2104 may include instructions configured to forward the ridesharing requests to V-P assignment module 2106 based on the information indicative of the requested pick-up time in the requests. For example, the ridesharing pre-scheduled requests may be forwarded to V-P assignment module 2106 at least 15 minutes before the requested time to be picked up, at least 20 minutes before the requested time to be picked up, or at least 30 minutes before the requested time to be picked up. Additionally, ridesharing requests by on-demand users may be forwarded to V-P assignment module 2106 at a FCFS (first come first serve) basis.

Figure 22A:
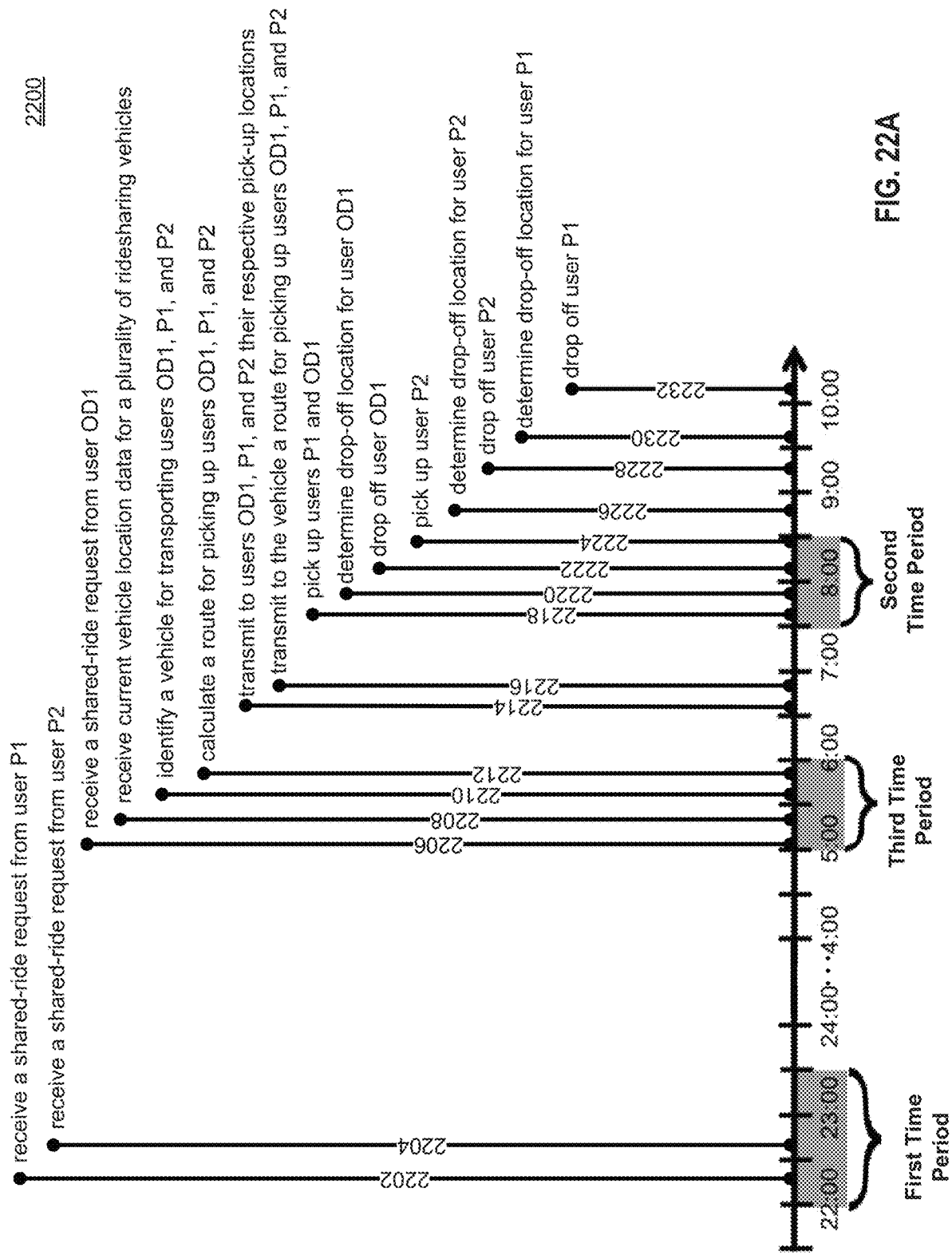
FIG. 22A is a diagram of an example timeline illustrating how the ridesharing management system provides transportation services to on-demand users and to prescheduling users consistent with the present disclosure.
Figure 22B:
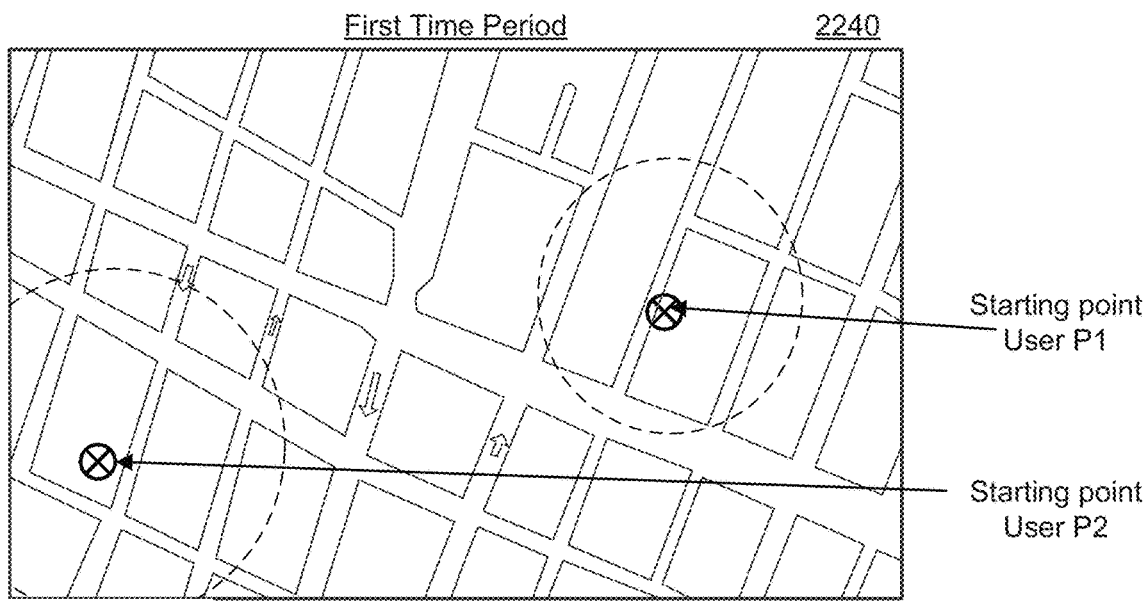
FIG. 22B and FIG. 22C are schematic illustrations of an example map illustrating some of the events included in the example timeline of FIG. 22A, according to disclosed embodiments.
Figure 22C:
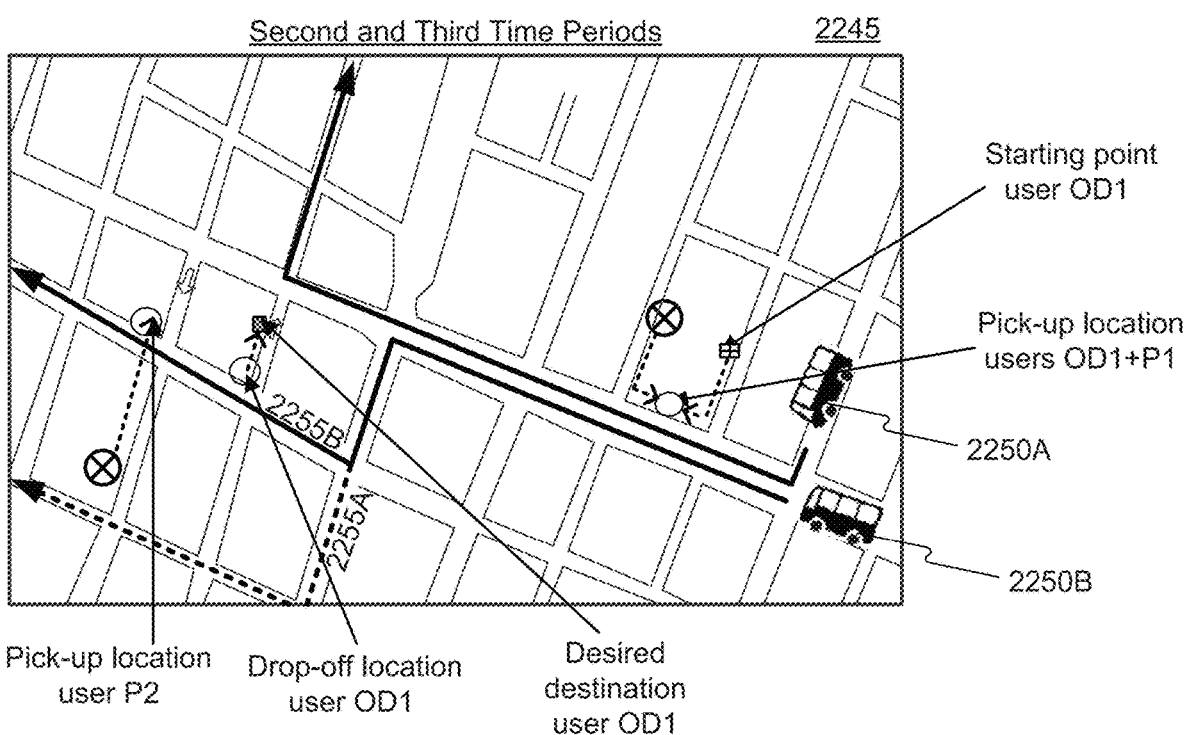

In some embodiments and as illustrated in FIGS. 22A-22C, V-P assignment module 2106 may assign a single ridesharing vehicle to a plurality of users that includes at least two prescheduling users and at least one of on-demand user. In other words, V-P assignment module 2106 may assign a plurality of users of different types to a common ridesharing vehicle. In one embodiment, V-P assignment module 2106 may avoid assigning additional on-demand users to a specific ridesharing vehicle carrying a prescheduling user when it is estimated that the assignment may cause the prescheduling user to arrive at the desired destination after the requested time. In another embodiment, V-P assignment module 2106 may assign users to a ridesharing vehicle based on user preference parameters received from requests management module 2104. Ridesharing management server 150 may further be configured to receive user input from user devices (e.g., user devices 120A-120C) as to various ride service parameters and may assign a ridesharing vehicle to pick up the users accordingly.

In some embodiments, route determination module 2108 may determine a route for the selected ridesharing vehicle. The determined route may include a plurality of pick-up and drop-off locations associated with the starting points and desired destinations of the plurality of users. Consistent with the present disclosure, determining the driving route may include selecting pick-up locations and drop-off locations for each of the plurality of users (commonly referred to as "virtual bus stops"), and determining the path between the virtual bus stops. The determined route may pass between all the determined pick-up points. When selecting a virtual bus stop, route determination module 2108 may confirm that the pick-up location is within a maximum walking distance (e.g., 300 meters or less) from the starting point, and that the drop-off location is within a maximum walking distance (e.g., 300 meters or less) from the desired destination. The virtual bus stops for the plurality of users and the driving route may be determined to minimize at least one of: a time duration each user spends in the ridesharing vehicle, a time duration each user spends waiting at the pick-up location, a distance each user needs to walk from the starting point to the pick-up location, a distance each user needs to walk from the drop-off location to the desired destination, and the number of empty seats in the ridesharing vehicle. When determining the route for the selected ridesharing vehicle, route determination module 2108 may determine a route that will allow the prescheduling user to arrive at the desired destination by the requested time or will allow the prescheduling user to be picked up by the requested time.

In some embodiments, transmission module 2110 may communicate, based on instructions from V-P assignment module 2106, with ridesharing management server 150 to send to the selected ridesharing vehicle, via the communications interface, driving directions according to the determined route. As discussed above, communications interface 360 may include a modem, Ethernet card, or any other interface configured to exchange data with a network, such as network 140 in FIG. 1. For example, ridesharing management server 150 may include software that, when executed by a processor, provides communications with network 140 through communications interface 360 to one or more mobile communications devices 120A-F. In some embodiments, transmission module 2110 may further send to the user, via the communications interface, information that causes a display of walking directions from the starting point to the pick-up location and from drop-off location to the desired destination. Transmission module 2110 may further send via communications interface messages to prescheduling users when a ridesharing vehicle is assigned to pick them up. The messages may appear in different formats, for example, a text message, an audio message, or a graphical image, which may include text. In one embodiment, transmission module 2110 may receive confirmation from the prescheduling users before transmitting an updated route to the selected ridesharing vehicle that includes the respective pick-up locations of the prescheduling users.

In some embodiments, database access module 2112 may cooperate with database 2114 to retrieve pending requests of prescheduling users, map information, traffic data, environmental condition data, and/or any associated stored data or metadata. For example, database access module 2112 may send a database query to database 2114 which may be associated with database 170. Database 2114 may be configured to store any type of information of use to modules 2102-2112, depending on implementation-specific considerations. For example, requests management module 2104 may be configured to store requests of prescheduling users in database 2114 and forward them to V-P assignment module 2106 a predetermined period of time before the requested time to be picked up. In some embodiments, database 2114 may store indications of locations of plurality of ridesharing vehicles received from data capture module 2102 and information providing a description of the nature, time, and/or date of any traffic conditions and/or environmental conditions received from a third party entity. Additionally, as discussed above, database 2114 may store general information collected from the users (e.g., user preference parameters).

In some embodiments, database 2114 may include separate databases, including, for example, a vector database, raster database, tile database, viewport database, and/or a user input database, configured to store data. The data stored in database 2114 may be received from modules 2102-2112, from ridesharing management server 150, from user devices 120A-F, and/or may be provided as input using data entry, data transfer, or data uploading. The data stored in database 2114 may represent multiple data forms including, for example, general mapping and geographic information, latitude and longitude (Lat/Lon) values, world coordinates, tile coordinates, pixel coordinates, Mercator and/or other map projection data, user identifier data, driver identifier data, vehicle identifier data, device type data, viewport data, device orientation data, user input data, geographical scale data, and a variety of other electronic data. Database 2114 may also include, for example, street, city, state, and country data including landmark identifiers and other related information. Database 2114 may also include search logs, cookies, web pages, and/or social network content, etc.

Modules 2102-2112 may be implemented in software, hardware, firmware, a mix of any of those, or the like. For example, if the modules are implemented in software, the modules may be stored in a server (e.g., ridesharing management server 150) or distributed over a plurality of servers. In some embodiments, any one or more of modules 2102-2112 and data associated with database 2114 may, for example, be stored in processor 310 and/or located on ridesharing management server 150, which may include one or more processing devices. Processing devices of ridesharing management server 150 may be configured to execute the instructions of modules 2102-2112. In some embodiments, aspects of modules 2102-2112 may include software, hardware, or firmware instructions (or a combination thereof) executable by one or more processors, alone or in various combinations with each other. For example, modules 2102-2112 may be configured to interact with each other and/or other modules of ridesharing management server 150 to perform functions consistent with disclosed embodiments.

FIG. 22A is a diagram showing an example timeline 2200 illustrating how ridesharing management server 150 may assign two prescheduling users and an on-demand user to a same ridesharing vehicle, according to disclosed embodiments. Timeline 2200 includes three time periods: a first time period, a second time period, and a third time period. Consistent with the present disclosure, in one embodiment, the second time period may be more than one hour, two hours, four hours, twenty hours, after the first time period, and the third time period may be between the first time period and the second time period. For example, the third time period may start more than one hour after the first time period and may end 15 minutes before the second time period. Consistent with the present disclosure, the first time period, the second time period, and the third time period are time periods that do not overlap and that are smaller than two hours, smaller than one hour, or smaller than half an hour. In timeline 2200, the first time period starts at 22:00 and ends at 23:30, the third time period starts at 5:00 and ends at 6:00, and the second time period starts at 7:30 and ends at 8:30. The manner and order in which events are shown in timeline 2200 is chosen for convenience and clarity of presentation and is not intended to limit the disclosed embodiments. Instead, the proper chronological relationship between events shown in timeline 2200 is defined by the appended claims. In particular, the third time period may be a short time interval of only a few minutes.

During the first time period, at step 2202, ridesharing management server 150 may receive a shared-ride request from a first prescheduling user (hereinafter "user P1"). The shared-ride request from user P1 may include a first requested pick-up time during the second time period and a first starting point. For example, at 22:15, user P1 may request to be picked up at 7:45 from near his/her current location. Also during the first time period, at step 2204, ridesharing management server 150 may receive a shared-ride request from a second prescheduling user (hereinafter "user P2"). The shared-ride request from user P2 may also include a second requested pick-up time during the second time period and second differing starting point. For example, at 22:45, user P2 may request to be picked up at 8:15 from near his/her home (which may be different from his/her current location). Ridesharing management server 150 may store the first and second requests for processing during the third time period.

During the third time period, at step 2206, ridesharing management server 150 may receive a third shared-ride request from a first on-demand user (hereinafter "user OD1"). The third shared-ride request from user OD1 may include a third starting point that is close to but different from the first starting point of user P1. Thereafter, at step 2208, ridesharing management server 150 may receive current vehicle location data for a plurality of ridesharing vehicles. As discussed above, the current vehicle location data may include global positioning system (GPS) data generated by at least one GPS component associated with each of the plurality of ridesharing vehicles. Consistent with the present disclosure, at step 2210 ridesharing management server 150 may process the first request, the second request, the third request, and the vehicle location data to identify and assign a specific ridesharing vehicle for transporting users OD1, P1, and P2. Then, at step 2212, ridesharing management server 150 may calculate a ridesharing route for picking up the assigned users. The ridesharing route may include pick-up locations for users OD1, P1, and P2 that are different from their respective starting points. In this example, since the first starting point of user P1 and the third starting point of user OD1 are close to each other, ridesharing management server 150 may determine a single pick-up location for users OD1 and P1. The determination of the pick-up location for users OD1 and P1 may be based on the first starting point of user P1 and the third starting point of user OD1. In addition, during the third time period, when ridesharing management server 150 is processing the first, second, and third shared-ride requests, the specific ridesharing vehicle may be on route to pick up a second on-demand user (hereinafter "user OD2") that also requested the shared ride during the third time period (user OD2 is not shown in timeline 2200). In one embodiment, ridesharing management server 150 may determine the pick-up location for users OD1 and P1 based on the determined drop-off location of user OD2. In another embodiment, ridesharing management server 150 may determine the drop-off location of user OD2 based on the pick-up location for users OD1 and P1.

After the third time period and before the second time period, at step 2214, ridesharing management server 150 may wirelessly transmit to users OD1, P1, and P2 their respective pick-up locations. At step 2216, ridesharing management server 150 may wirelessly transmit to the specific ridesharing vehicle the calculated route for picking up users OD1, P1, and P2 during the second time period. As depicted in timeline 2220, ridesharing management server 150 may wirelessly transmit to users OD1, P1, and P2 their respective pick-up locations at a time closer to the second time period than the first time period. In one embodiment, after wirelessly transmitting to users OD1, P1, and P2 the respective pick-up locations, ridesharing management server 150 is configured to wait for receiving confirmation from users P1 and P2 before transmitting the calculated route to the specific ridesharing vehicle. Ridesharing management server 150 may not wait for receiving confirmation from user OD1 since user OD1 is an on-demand user. Alternatively, Ridesharing management server 150 may receive an immediate confirmation from user OD1.

During the second time period, at step 2218, the specific ridesharing vehicle may pick up users OD1 and P1 from the same pick-up location. After picking up users OD1 and P1, at step 2220, ridesharing management server 150 may determine the drop-off location for user OD1. The determination of the drop-off location for user OD1 may be based on the pick-up location of user P2. At step 2222, the specific ridesharing vehicle may drop off user OD1 at the determined drop-off location and continue driving to pick up user P2 (step 2224).

After the second time period, at step 2226, ridesharing management server 150 may determine the drop-off location of user P2. Similar to timeline 520 illustrated in FIG. 5, ridesharing management server 150 may determine a drop-off location for user P2 that is after the pick-up location of user P1 and before the drop-off location of user P1. In one embodiment, ridesharing management server 150 may determine the drop-off location of user P2 based on a current location of the specific ridesharing vehicle and the requested time of user P2 to reach the desired destination. For example, when (for any reason) the specific ridesharing vehicle is running late, ridesharing management server 150 may decide to drop off user P2 closer to the desired destination to prevent user P2 from walking a long distance. At step 2228, the specific ridesharing vehicle may drop off user P2 at a location that is different from the desired destination of user P2. Consistent with the present disclosure, ridesharing management server 150 may determine a drop-off location for user P1 after determining the drop-off location of user P2, and even after dropping off user P2. Specifically, as depicted in timeline 2200, ridesharing management server 150 may determine the drop-off location of user P1 at step 2230 and the specific ridesharing vehicle may drop off user P1 at step 2232.

FIG. 22B and FIG. 22C are schematic diagrams of examples of maps illustrating some of the events shown in timeline 2200. Map 2240, illustrated in FIG. 22B, depicts representation of events that took place during the first time period. Specifically, map 2240 depicts the first starting point of user P1 as indicated in the first shared-ride request, and the second starting point of user P2 as indicated in the second shared-ride request. Around each starting point there is a dashed circle that represents the individual (or globally defined) maximum walking distance from a starting point to a pick-up location. As described above, the system may determine the maximum walking distance based on user preference parameters derived from the users' profiles stored in database 2114. During the first period of time, neither ridesharing management server 150 nor users P1 and P2 have knowledge of the exact location for pick-up location, only an estimation based on their starting points specified in the shared-ride request and the determined maximum walking distances.

Map 2245, illustrated in FIG. 22C, depicts representations of some of the events that took place during the first and second time period. Specifically, map 2245 depicts the third starting point of user OD1 as indicated in the third shared-ride request. Based on the received current vehicle location data, the system may identify two ridesharing vehicles (namely, ridesharing vehicle 2250A and ridesharing vehicle 2250B) in the area of users OD1 and P1. In one embodiment, ridesharing management server 150 may select the specific ridesharing vehicle based on the desired destination of passengers currently riding the identified ridesharing vehicles. For example, if the desired destination of user P1 is somewhere downtown and ridesharing vehicle 2250A is heading uptown, ridesharing management server 150 may select ridesharing vehicle 2250B. Map 2245 also depicts the pick-up locations of users OD1, P1, and P2, and the walking paths from the users' starting points to their assigned pick-up locations. In the scenario described in timeline 2200, ridesharing management system 100 had received the third shared-ride request before determining the pick-up location for user P1, therefore the pick-up location was determined at a location between the starting points of users OD1 and P1. In a similar scenario, if user OD1 had requested the rideshare after the pick-up location was transmitted to user P1 (e.g., after 7:00), user OD1 may be directed to a different pick-up location. In one embodiment, user OD1 may request a ride-share after picking up user P1 or even after dropping off user P1.

FIG. 22C also depicts two possible routes (namely, route 2255A and route 2255B) for directing the selected ridesharing vehicle. As shown, route 2255A passes closer to the second starting point of user P2 than route 2255B, but route 2255B passes closer to the desired destination of user OD1. If the system had calculated the ridesharing route for picking up assigned users during the first period of time, route 2255A may have been selected. But, since the system calculates the ridesharing route for picking up assigned users during the third period of time (after receiving the third request), the system may select route 2255B. In other words, the pick-up location of a prescheduling user may be determined based on a desired destination of an on-demand user that requested the ride hours after the prescheduling user requested the ride.

In one embodiment, a system may direct a ridesharing vehicle. The system may include a communications interface and at least one processor. The communications interface may be configured to receive requests for shared-rides from a plurality of users. The at least one processor may be configured to receive during a first time period, via the communications interface, a first request for a shared-ride from a first user (e.g., user P1). The first request including information indicative of a first starting point, a first desired destination, and a first requested pick-up time, wherein the first requested pick-up time is during a second time period more than a first time interval after the first time period, where the first time interval can be e.g. 10 minutes, 30 minutes, two hours, 24 hours, etc. The at least one processor may also be configured to receive during a third time period, via the communications interface, a second request for a shared ride from a second user (e.g., user OD1), where the third time period is after the first time period but before the second time period. The second request may include information indicative of a second starting point different from the first starting point, and a second desired destination different from the first desired destination. During the third time period, the at least one processor may be configured to receive current vehicle location data for a plurality of ridesharing vehicles, wherein the current vehicle location data includes global positioning system (GPS) data generated by at least one GPS component associated with each of the plurality of ridesharing vehicles; process the first request, the second request, and the vehicle location data to identify a specific ridesharing vehicle for transporting both the first user and the second user; and calculate a ridesharing route for picking up the first user and the second user, wherein calculating the ridesharing route includes determining pick-up locations for the first user and the second user that differ from the first starting point and the second starting point. After the third time period and before the second time period, the at least one processor may be configured to wirelessly transmit to the first user and the second user the respective pick-up locations; and wireless transmit to the specific ridesharing vehicle, the calculated route for picking up the first and second user.

Figure 23:
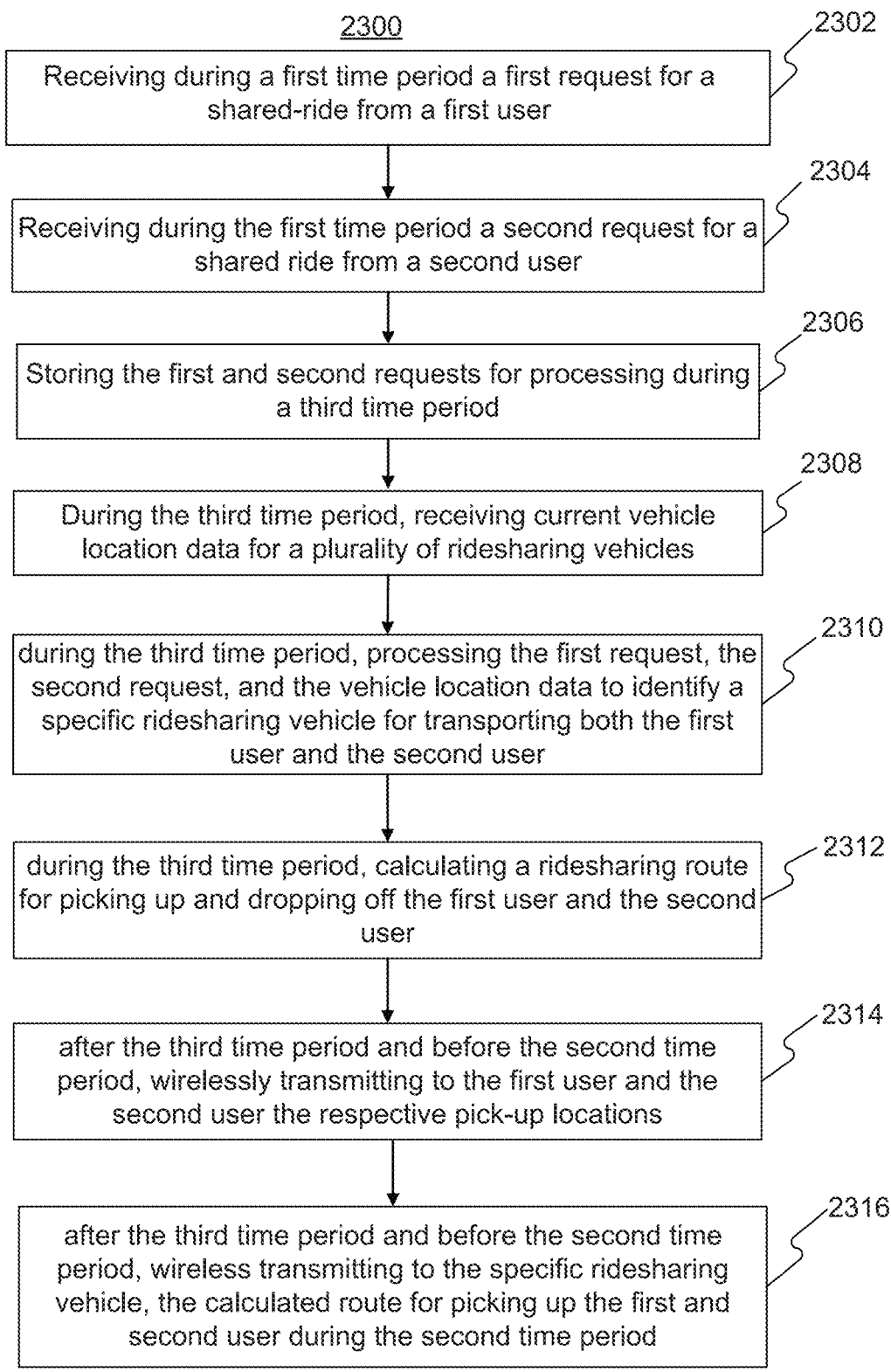
FIG. 23 is a flowchart of an example process used by a ridesharing management system to direct a ridesharing vehicle to pick up users that prescheduled a rideshare.

Reference is now made to FIG. 23, which depicts an exemplary method 2300 for directing ridesharing vehicles consistent with the present disclosure. In one embodiment, the steps of method 2300 may be performed by ridesharing management system 100 or automated ridesharing dispatch system 300. In the following description, reference is made to certain components of ridesharing management server 150 for purposes of illustration. It will be appreciated, however, that other implementations are possible and that other components may be utilized to implement the exemplary method. It will be readily appreciated that the illustrated method can be altered to modify the order of steps, delete steps, or further include additional steps.

At step 2302, during a first time period, a communications interface (e.g., communications interface 360) may receive a first request for a shared-ride from a first user, the first request including information indicative of a first starting point, a first desired destination, and a first requested pick-up time. The first requested pick-up time may be during a second time period more than two hours after the first time period. At step 2304, during the first time period, the communications interface may receive a second request for a shared ride from a second user, the second request including information indicative of a second starting point different from the first starting point, a second desired destination different from the first desired destination, and a second requested pick-up time during the second time period. As described above, the starting point may refer to a current location of the first and second users, as inputted by the first and second users through an associated user device, or as determined by a location service application installed on the associated user device. In some embodiments, a starting point may be a location different from the current location of a user, for example, a location the user is scheduled to be in about the requested pick-up time. A desired destination may refer to a location a user requests to be taken to. A requested pick-up time may be associated with or calculated from the time a user wants to reach the desired destination. Also, each ride request may include additional information, for example, information identifying the user, a selection of a type of ridesharing service, an indication of a maximum walking distance, and more.

At step 2306, during the first time period, a processing device (e.g., processor 310) may store the first and second requests for processing during a third time period. The third time period for processing is more than one hour after the first time period but before the second time period. The first and second requests may be stored in a memory device (e.g., memory 320 or database 2114). In one embodiment, the processing device is configured to determine a time for processing the first and second requests and to record a future event in the system (e.g., in requests management module 2104) at the determined time. For example, the processing device may store more than a hundred requests for future processing, and each of the more than a hundred requests may be associated with a different time for processing.

At step 2308, during the third time period, the communications interface may receive current vehicle location data for a plurality of ridesharing vehicles, wherein the current vehicle location data includes global positioning system (GPS) data generated by at least one GPS component associated with each of the plurality of ridesharing vehicles. In one example, the plurality of communication devices may include mobile devices such as tablets or smartphones that belong to the drivers of the ridesharing vehicles. In another example, the plurality of ridesharing vehicles may include multiple smart vehicles and each communication device may be a component of a smart vehicle. The term "smart vehicles" refers to vehicles (e.g., autonomously and/or manually-driven) with computing resources, location determination components, and communication devices. A smart vehicle may communicate with ridesharing management system 100 independently to the driver or to a driver's communication device.

At step 2310, during the third time period, the processing device may process the first request, the second request, and the vehicle location data to identify a specific ridesharing vehicle for transporting both the first user and the second user. Consistent with the present disclosure, the processing device may be further configured to select the specific ridesharing vehicle for transporting both the first user and the second user based on at least some of the following parameters: the location of the ridesharing vehicle, the driving direction of the ridesharing vehicle, the driving route of the ridesharing vehicle, the number of passengers riding the ridesharing vehicle, the number of users assigned to the ridesharing vehicle and scheduled to be picked up, the virtual bus stops that the ridesharing vehicle is scheduled to stop at, the desired destinations of all the users assigned to the ridesharing vehicle, the real time traffic data, the user's starting point, the user's desired destination, the user's personal preferences, and the type of service the user selected.

At step 2312, during the third time period, the processing device may calculate a ridesharing route for picking up the first user and the second user. The calculated route may include a plurality of pick-up and drop-off locations associated with the starting points and desired destinations of the plurality of users. Consistent with the present disclosure, calculating the ridesharing route may include determining pick-up locations for the first user and the second user that differ from the first starting point and the second starting point. Consistent with some embodiments, the processing device may calculate the route for picking up the first user and the second user based on shared-ride requests of on-demand users. In one example, the pick-up locations of the first user and the second user may be determined based on a starting point (or a desired destination) of an on-demand user requesting a ride at the third-period of time (or after the third-period of time). In another example, the drop-off locations of the first user and the second user may be determined based on a starting point (or a desired destination) of an on-demand user requesting a ride while the first user and the second user are riding the specific ridesharing vehicle.

At step 2314, after the third time period and before the second time period, the processing device may wirelessly transmit to the first user and the second user the respective pick-up locations, and at step 2316 the processing device may wirelessly transmit to the specific ridesharing vehicle the calculated route for picking up the first and second user during the second time period. Consistent with the present disclosure, the processing device may wirelessly transmit to the first user and the second user the respective pick-up locations at a time closer to the second time period than the first time period.

The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer readable media, such as secondary storage devices, e.g., hard disks or CD ROM, or other forms of RAM or ROM, USB media, DVD, Blu-ray, Ultra HD Blu-ray, or other optical drive media.

Computer programs based on the written description and disclosed methods are within the skills of an experienced developer. The various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The examples are to be construed as non-exclusive. Furthermore, the steps of the disclosed methods may be modified in any manner, including by reordering steps and/or inserting or deleting steps. It is intended, therefore, that the specification and examples be considered as illustrative only.

What is claimed is:

1. A system for directing manually-drivable vehicles and autonomous vehicles, the system comprising:
    at least one communications interface for receiving ride requests from a plurality of users and for communicating with a plurality of vehicles-for-hire including manually-drivable vehicles and autonomous vehicles;
    memory storing information identifying a driving mode of each vehicle-for-hire as either a manually-drivable vehicle or an autonomous vehicle, and information identifying roads restricted to at least one of manually-drivable vehicles and autonomous vehicles;
    at least one processor programmed to:
        receive, via the communications interface, a ride request from a prospective passenger, the ride request including information related to a pick-up location and a drop-off location of the prospective passenger;
        receive current vehicle location data for the plurality of vehicles-for-hire, wherein the current vehicle location data includes global positioning system (GPS) data generated by at least one GPS component associated with each vehicle-for-hire;
        electronically assign a specific vehicle-for-hire with capacity to fulfill the ride request to pick up the prospective passenger based on the current vehicle location data;
        access the stored information to determine the driving mode of the specific vehicle-for-hire;
        select a mode-specific route for the specific vehicle-for-hire that avoids roads restricted to the specific vehicle-for-hire based on the driving mode of the specific vehicle-for-hire; and
        wirelessly transmit the selected mode-specific route to the specific vehicle-for-hire.

2. The system of claim 1, wherein, in response to the ride request, the at least one processor is further programmed to select a manually-drivable vehicle and an autonomous vehicle each capable of fulfilling the ride request, calculate a route for each selected vehicle based on the driving mode of each selected vehicle, compare each route to current traffic data, and electronically assign the specific vehicle-for-hire route resulting in a fastest pick-up time for the prospective passenger.

3. The system of claim 1, wherein, in response to the ride request, the at least one processor is further programmed to select a manually-drivable vehicle and an autonomous vehicle each capable of fulfilling the ride request, calculate a route for each selected vehicle based on the driving mode of each selected vehicle, compare each route to current traffic data, and electronically assign the specific vehicle-for-hire route resulting in a fastest drop-off time for the prospective passenger.

4. The system of claim 1, wherein the at least one processor is further programmed to process the ride request from the prospective passenger to determine if the prospective passenger prefers avoiding riding an autonomous vehicle.

5. The system of claim 4, wherein the at least one processor is further programmed to electronically assign a manually-drivable vehicle-for-hire to the prospective passenger despite that assigning an autonomous vehicle-for-hire would result in a faster drop off time for the prospective passenger.

6. The system of claim 1, wherein, after electronically assigning an autonomous vehicle-for-hire to the prospective passenger, the at least one processor is further programmed to provide an indication to the prospective passenger that an autonomous vehicle-for-hire is en route.

7. The system of claim 6, wherein the at least one processor is further programmed to receive a pick-up confirmation from the autonomous vehicle-for-hire after picking up the prospective passenger.

8. The system of claim 7, wherein the at least one processor is further programmed to receive a second pick-up confirmation from the prospective passenger.

9. The system of claim 1, wherein the at least one processor is further programmed to identify a specific vehicle-for-hire with capacity to fulfill the ride request to pick up the prospective passenger based on a number of passengers currently assigned to the specific vehicle-for-hire.

10. The system of claim 1, wherein the memory stores map data defining roadways that are restricted to autonomous vehicles.

11. The system of claim 1, wherein the memory stores map data defining roadways that are restricted to manually-drivable vehicles.

12. The system of claim 1, wherein the memory further stores information identifying a powering mode of each vehicle-for-hire as either an electrically-powered vehicle or a petrol-powered vehicle.

13. The system of claim 3, wherein the at least one processor is further programmed to access the memory to determine that the specific vehicle-for-hire is electrically-powered, identify at least two mode-specific routes to pick up the prospective passenger; and select a driving route that includes less elevation changes and avoids roads restricted to the specific vehicle-for-hire.

14. A method for directing manually-drivable vehicles and autonomous vehicles, the method comprising:
communicating with a plurality of vehicles-for-hire including manually-drivable vehicles and autonomous vehicles;
accessing stored information identifying a driving mode of each vehicle-for-hire as either a manually-drivable vehicle or an autonomous vehicle, and information identifying roads restricted to at least one of manually-drivable vehicles and autonomous vehicles;
receiving a ride request from a prospective passenger, the ride request including information related to a pick-up location and a drop-off location of the prospective passenger;
receiving current vehicle location data for the plurality of vehicles-for-hire, wherein the current vehicle location data includes global positioning system (GPS) data generated by at least one GPS component associated with each vehicle-for-hire;
electronically assigning a specific vehicle-for-hire with capacity to fulfill the ride request to pick up the prospective passenger based on the current vehicle location data;
accessing the stored information to determine the driving mode of the specific vehicle-for-hire;
selecting a mode-specific route for the specific vehicle-for-hire that avoids roads restricted to the specific vehicle-for-hire based on the driving mode of the specific vehicle-for-hire; and
wirelessly transmitting the selected mode-specific route to the specific vehicle-for-hire.

15. The method of claim 14, further comprising:
selecting a manually-drivable vehicle and an autonomous vehicle each capable of fulfilling the ride request, calculating a route for each selected vehicle based on the driving mode of each selected vehicle, and electronically assigning the specific vehicle-for-hire route resulting in at least one of: a fastest pick-up time for the prospective passenger, a fastest drop-off time for the prospective passenger, and a fastest average drop-off time for the prospective passenger and additional passengers currently riding each selected vehicle.

16. The method of claim 14, further comprising:
processing the ride request from the prospective passenger to determine if the prospective passenger prefers avoiding riding an autonomous vehicle.

17. The method of claim 16, further comprising:
electronically assigning a manually-drivable vehicle-for-hire to the prospective passenger despite that assigning an autonomous vehicle-for-hire would result in a faster drop off time for the prospective passenger.

18. The method of claim 14, wherein identifying a specific vehicle-for-hire with capacity to fulfill the ride request to pick up the prospective passenger is based on a number of passengers currently assigned to specific vehicle-for-hire.

19. A non-transitory computer-readable storage medium storing instructions that, when executed by at least one processor, cause the at least one processor to perform a method for directing manually-drivable vehicles and autonomous vehicles, the method comprising:
communicating with a plurality of vehicles-for-hire including manually-drivable vehicles and autonomous vehicles;
accessing stored information identifying a driving mode of each vehicle-for-hire as either a manually-drivable vehicle or an autonomous vehicle, and information identifying roads restricted to at least one of manually-drivable vehicles and autonomous vehicles;
receiving a ride request from a prospective passenger, the ride request including information related to a pick-up location and a drop-off location of the prospective passenger;
receiving current vehicle location data for the plurality of vehicles-for-hire, wherein the current vehicle location data includes global positioning system (GPS) data generated by at least one GPS component associated with each vehicle-for-hire;
electronically assigning a specific vehicle-for-hire with capacity to fulfill the ride request to pick up the prospective passenger based on the current vehicle location data;
accessing the stored information to determine the driving mode of the specific vehicle-for-hire;
selecting a mode-specific route for the specific vehicle-for-hire that avoids roads restricted to the specific vehicle-for-hire based on the driving mode of the specific vehicle-for-hire; and
wirelessly transmitting the selected mode-specific route to the specific vehicle-for-hire.

* * * * *